US012698153B2

(12) United States Patent
Yang et al.

(10) Patent No.: US 12,698,153 B2
(45) Date of Patent: Aug. 4, 2026

(54) RECEPTACLES WITH INTERIOR LINER DISPENSERS

(71) Applicant: simplehuman, LLC, Torrance, CA (US)

(72) Inventors: Frank Yang, Ranchos Palos Verdes, CA (US); Adam Wade, Rancho Santo Margarita, CA (US)

(73) Assignee: simplehuman, LLC, Torrance, CA (US)

( * ) Notice: Subject to any disclaimer, the term of this patent is extended or adjusted under 35 U.S.C. 154(b) by 37 days.

(21) Appl. No.: 18/592,366

(22) Filed: Feb. 29, 2024

(65) Prior Publication Data

US 2024/0294326 A1 Sep. 5, 2024

Related U.S. Application Data

(60) Provisional application No. 63/507,716, filed on Jun. 12, 2023, provisional application No. 63/488,258, filed on Mar. 3, 2023.

(51) Int. Cl.

*B65F 1/06* (2006.01)
*B65F 1/08* (2006.01)
*B65F 1/16* (2006.01)

(52) U.S. Cl.

CPC ................ *B65F 1/062* (2013.01); *B65F 1/08* (2013.01); *B65F 1/163* (2013.01); *B65F 1/1646* (2013.01)

(58) Field of Classification Search

CPC ............ B65D 2583/00; B65D 2590/04; B65D 90/04; B65D 90/041; B65F 1/062; B65F 1/08; B65F 1/163; B65F 1/1646

See application file for complete search history.

(56) References Cited

U.S. PATENT DOCUMENTS

| | | | |
|---|---|---|---|
| 830,182 | A | 9/1906 | Skov |
| 1,379,677 | A | 5/1921 | Edward |
| 1,426,211 | A | 8/1922 | Pausin |
| 1,461,253 | A | 7/1923 | Owen |
| 1,754,802 | A | 4/1930 | Raster |

(Continued)

FOREIGN PATENT DOCUMENTS

| | | |
|---|---|---|
| AU | 622536 | 4/1992 |
| BR | 202013004348-1 | 2/2013 |

(Continued)

OTHER PUBLICATIONS

Trento Corner 23 Trash Can, Hailo product webpage, May 2008, http://www.hailo.de/html/default.asp?site=12_71_107&lang=en.

(Continued)

*Primary Examiner* — Kareen K Thomas

(74) *Attorney, Agent, or Firm* — Knobbe, Martens, Olson & Bear, LLP

(57) ABSTRACT

A receptacle assembly may include a body, a lid, and a liner dispenser positioned in an interior space of the body, such as on or near the inside surface of a rear wall of the body. In some embodiments, the liner dispenser has a first opening and a second opening. The interior liner dispenser can be configured to receive a package of liners from the interior space through the first opening and to dispense the liners (e.g., one at a time) into the interior space through the second opening. With the lid closed, the liner dispenser may be hidden from a user's view.

22 Claims, 24 Drawing Sheets

(56) References Cited

U.S. PATENT DOCUMENTS

| | | | | |
|---|---|---|---|---|
| 1,820,555 | A | | 8/1931 | Buschman |
| 1,891,651 | A | | 12/1932 | Padelford et al. |
| 1,922,729 | A | | 8/1933 | Geibel |
| 1,980,938 | A | | 11/1934 | Geibel |
| 2,308,326 | A | | 1/1943 | Ambrose |
| D148,825 | S | | 2/1948 | Snider |
| 2,457,274 | A | | 12/1948 | Rifken |
| 2,591,104 | A | | 4/1952 | Stone |
| 2,593,455 | A | | 4/1952 | James |
| 2,699,368 | A | | 1/1955 | Alois |
| 2,759,625 | A | | 8/1956 | Ritter |
| 2,796,309 | A | | 6/1957 | Taylor |
| 2,888,307 | A | | 5/1959 | Graves et al. |
| 2,946,474 | A | | 7/1960 | Knapp |
| 3,008,604 | A | | 11/1961 | Garner |
| 3,023,922 | A | | 3/1962 | Arrington et al. |
| 3,137,408 | A | | 6/1964 | Taylor |
| 3,180,384 | A | | 4/1965 | Seifert |
| 3,261,545 | A | | 7/1966 | Frazier |
| 3,300,082 | A | | 1/1967 | Patterson |
| 3,392,825 | A | | 7/1968 | Gale et al. |
| 3,450,297 | A | | 6/1969 | Clerk |
| 3,451,453 | A | | 6/1969 | Heck |
| 3,618,814 | A | | 11/1971 | Nagroski |
| 3,654,534 | A | | 4/1972 | Fischer |
| 3,800,503 | A | | 4/1974 | Maki |
| 3,820,200 | A | | 6/1974 | Myers |
| 3,825,150 | A | | 7/1974 | Taylor |
| 3,825,215 | A | | 7/1974 | Borglum |
| 3,870,261 | A | | 3/1975 | McSwain |
| 3,886,425 | A | | 5/1975 | Weiss |
| 3,888,406 | A | | 6/1975 | Nippes |
| 3,891,115 | A | | 6/1975 | Ono |
| 3,893,615 | A | | 7/1975 | Johnson |
| 3,964,630 | A | | 6/1976 | Getz |
| 4,014,457 | A | | 3/1977 | Hodge |
| 4,027,774 | A | | 6/1977 | Cote |
| 4,081,105 | A | | 3/1978 | Dagonnet et al. |
| 4,189,808 | A | | 2/1980 | Brown |
| 4,200,197 | A | | 4/1980 | Meyer et al. |
| 4,217,616 | A | | 8/1980 | Jessup |
| 4,223,858 | A | | 9/1980 | De Salazar |
| 4,303,174 | A | | 12/1981 | Anderson |
| 4,320,851 | A | | 3/1982 | Montoya |
| 4,349,123 | A | | 9/1982 | Yang |
| 4,357,740 | A | | 11/1982 | Brown |
| 4,416,197 | A | | 11/1983 | Kehl |
| 4,417,669 | A | | 11/1983 | Knowles et al. |
| 4,457,483 | A | | 7/1984 | Gagne |
| 4,535,911 | A | | 8/1985 | Goulter |
| 4,570,304 | A | | 2/1986 | Montreuil et al. |
| 4,576,310 | A | | 3/1986 | Isgar et al. |
| D284,320 | S | | 6/1986 | Kubic et al. |
| 4,609,117 | A | | 9/1986 | Pamment |
| 4,630,332 | A | | 12/1986 | Bisbing |
| 4,630,752 | A | | 12/1986 | DeMars |
| 4,664,347 | A | | 5/1987 | Brown et al. |
| 4,697,312 | A | | 10/1987 | Freyer |
| 4,711,161 | A | | 12/1987 | Swin et al. |
| 4,729,490 | A | | 3/1988 | Ziegenbein |
| 4,753,367 | A | | 6/1988 | Miller et al. |
| 4,763,808 | A | | 8/1988 | Guhl et al. |
| 4,765,548 | A | | 8/1988 | Sing |
| 4,765,579 | A | | 8/1988 | Robbins, III et al. |
| 4,785,964 | A | | 11/1988 | Miller et al. |
| 4,792,039 | A | | 12/1988 | Dayton |
| 4,794,973 | A | | 1/1989 | Perisic |
| 4,813,592 | A | | 3/1989 | Stolzman |
| 4,823,979 | A | * | 4/1989 | Clark, Jr. ................ B65F 1/062 220/495.07 |
| 4,834,260 | A | | 5/1989 | Auten |
| 4,863,053 | A | | 9/1989 | Oberg |
| 4,867,339 | A | | 9/1989 | Hahn |
| 4,869,391 | A | | 9/1989 | Farrington |
| 4,884,717 | A | | 12/1989 | Bussard et al. |
| 4,888,532 | A | | 12/1989 | Josson |
| 4,892,223 | A | | 1/1990 | DeMent |
| 4,892,224 | A | | 1/1990 | Graham |
| D307,344 | S | | 4/1990 | Massonnet |
| 4,913,308 | A | | 4/1990 | Culbertson |
| 4,915,347 | A | | 4/1990 | Iqbal et al. |
| 4,918,568 | A | | 4/1990 | Stone et al. |
| D308,272 | S | | 5/1990 | Koepsell |
| 4,923,087 | A | | 5/1990 | Burrows |
| 4,944,419 | A | | 7/1990 | Chandler |
| 4,948,004 | A | | 8/1990 | Chich |
| 4,953,740 | A | | 9/1990 | Koda |
| 4,964,523 | A | | 10/1990 | Bieltvedt et al. |
| 4,972,966 | A | | 11/1990 | Craft, Jr. |
| 4,996,467 | A | | 2/1991 | Day |
| 5,031,793 | A | | 7/1991 | Chen et al. |
| 5,048,903 | A | | 9/1991 | Loblein |
| 5,054,724 | A | | 10/1991 | Hutcheson |
| 5,065,272 | A | | 11/1991 | Owen et al. |
| 5,065,891 | A | | 11/1991 | Casey |
| D322,350 | S | | 12/1991 | Craft, Jr. et al. |
| 5,072,852 | A | | 12/1991 | Smith et al. |
| 5,076,462 | A | | 12/1991 | Perrone |
| D323,573 | S | | 1/1992 | Schneider |
| 5,090,585 | A | | 2/1992 | Power |
| 5,090,785 | A | | 2/1992 | Stamp |
| 5,100,087 | A | | 3/1992 | Ashby |
| 5,111,958 | A | * | 5/1992 | Witthoeft .............. B65F 1/0073 220/23.88 |
| 5,125,526 | A | * | 6/1992 | Sumanis ................... B65F 1/06 220/264 |
| D327,760 | S | | 7/1992 | Donnelly |
| D329,929 | S | | 9/1992 | Knoedler et al. |
| 5,147,055 | A | | 9/1992 | Samson et al. |
| 5,156,290 | A | | 10/1992 | Rodrigues |
| D331,097 | S | | 11/1992 | Sieren |
| 5,170,904 | A | | 12/1992 | Neuhaus |
| 5,174,462 | A | | 12/1992 | Hames |
| D332,852 | S | | 1/1993 | Delmerico |
| 5,199,571 | A | | 4/1993 | Wolff et al. |
| D335,562 | S | | 5/1993 | Evans |
| 5,213,272 | A | | 5/1993 | Gallagher et al. |
| 5,222,704 | A | | 6/1993 | Light |
| D337,181 | S | | 7/1993 | Warman |
| 5,226,558 | A | | 7/1993 | Whitney et al. |
| 5,230,525 | A | | 7/1993 | Delmerico et al. |
| 5,242,074 | A | | 9/1993 | Conaway et al. |
| D340,333 | S | | 10/1993 | Duran et al. |
| 5,249,693 | A | | 10/1993 | Gillispie et al. |
| 5,261,553 | A | | 11/1993 | Mueller et al. |
| 5,265,511 | A | | 11/1993 | Itzov |
| 5,295,607 | A | * | 3/1994 | Chang ................... B65F 1/1607 220/264 |
| 5,305,916 | A | | 4/1994 | Suzuki et al. |
| 5,314,151 | A | | 5/1994 | Carter-Mann |
| 5,322,179 | A | | 6/1994 | Ting |
| 5,329,212 | A | | 7/1994 | Feigleson |
| 5,337,581 | A | | 8/1994 | Lott |
| 5,348,222 | A | | 9/1994 | Patey |
| 5,353,950 | A | | 10/1994 | Taylor et al. |
| 5,372,272 | A | | 12/1994 | Jennings |
| 5,381,588 | A | | 1/1995 | Nelson |
| 5,385,258 | A | | 1/1995 | Sutherlin |
| 5,390,818 | A | | 2/1995 | LaBuda |
| 5,391,423 | A | * | 2/1995 | Wnuk ............... A61F 13/15252 428/424.8 |
| 5,404,621 | A | | 4/1995 | Heinke |
| 5,407,089 | A | | 4/1995 | Bird et al. |
| 5,419,452 | A | | 5/1995 | Mueller et al. |
| 5,471,708 | A | | 12/1995 | Lynch |
| 5,474,201 | A | | 12/1995 | Liu |
| 5,476,187 | A | | 12/1995 | Marisco |
| 5,501,358 | A | | 3/1996 | Hobday |
| D368,563 | S | | 4/1996 | Brightbill et al. |
| 5,520,067 | A | | 5/1996 | Gaba |
| 5,520,303 | A | | 5/1996 | Bernstein et al. |
| 5,531,348 | A | | 7/1996 | Baker et al. |
| 5,535,913 | A | | 7/1996 | Asbach et al. |

(56) References Cited

U.S. PATENT DOCUMENTS

| | | | | |
|---|---|---|---|---|
| 5,558,254 | A * | 9/1996 | Anderson | B65F 1/06 220/495.11 |
| 5,560,283 | A | 10/1996 | Hannig | |
| 5,584,412 | A | 12/1996 | Wang | |
| D377,554 | S | 1/1997 | Adriaansen | |
| 5,611,507 | A | 3/1997 | Smith | |
| 5,628,424 | A | 5/1997 | Gola | |
| 5,632,401 | A | 5/1997 | Hurd | |
| 5,636,416 | A | 6/1997 | Anderson | |
| 5,636,761 | A | 6/1997 | Diamond et al. | |
| 5,641,090 | A | 6/1997 | Kowalski et al. | |
| 5,644,111 | A | 7/1997 | Cerny et al. | |
| 5,645,186 | A | 7/1997 | Powers et al. | |
| 5,650,680 | A | 7/1997 | Chula | |
| D383,277 | S | 9/1997 | Peters | |
| 5,662,235 | A | 9/1997 | Nieto | |
| 5,671,847 | A | 9/1997 | Pedersen et al. | |
| 5,690,247 | A | 11/1997 | Boover | |
| 5,695,088 | A | 12/1997 | Kasbohm | |
| 5,699,929 | A | 12/1997 | Ouno | |
| D388,922 | S | 1/1998 | Peters | |
| D389,631 | S | 1/1998 | Peters | |
| 5,704,511 | A | 1/1998 | Kellams | |
| 5,724,837 | A | 3/1998 | Shin | |
| 5,730,312 | A | 3/1998 | Hung | |
| 5,732,845 | A | 3/1998 | Armaly, Jr. | |
| 5,735,495 | A | 4/1998 | Kubota | |
| 5,738,239 | A | 4/1998 | Triglia | |
| 5,770,935 | A | 6/1998 | Smith et al. | |
| 5,799,909 | A | 9/1998 | Ziegler | |
| 5,816,431 | A | 10/1998 | Giannopoulos | |
| 5,816,640 | A | 10/1998 | Nishimura | |
| D401,028 | S | 11/1998 | Ahern, Jr. et al. | |
| D401,383 | S | 11/1998 | Gish | |
| D401,719 | S | 11/1998 | Van Leeuwen et al. | |
| 5,873,643 | A | 2/1999 | Burgess, Jr. et al. | |
| 5,881,896 | A | 3/1999 | Presnell et al. | |
| 5,881,901 | A | 3/1999 | Hampton | |
| 5,884,237 | A | 3/1999 | Kanki et al. | |
| 5,887,748 | A | 3/1999 | Nguyen | |
| D412,552 | S | 8/1999 | Burrows | |
| 5,961,105 | A | 10/1999 | Ehrnsberger et al. | |
| 5,967,355 | A | 10/1999 | Ragot | |
| 5,967,392 | A | 10/1999 | Niemi et al. | |
| 5,987,708 | A | 11/1999 | Newton | |
| 6,000,569 | A | 12/1999 | Liu | |
| 6,010,024 | A | 1/2000 | Wang | |
| D420,182 | S | 2/2000 | Roudebush | |
| 6,024,238 | A | 2/2000 | Jaros | |
| D422,123 | S | 3/2000 | Roudebush | |
| 6,036,050 | A | 3/2000 | Ruane | |
| 6,062,389 | A | 5/2000 | Kent | |
| 6,079,645 | A | 6/2000 | Henreckson et al. | |
| 6,091,064 | A | 7/2000 | Eaton et al. | |
| 6,102,239 | A | 8/2000 | Wien | |
| 6,105,859 | A | 8/2000 | Stafford | |
| 6,123,215 | A | 9/2000 | Windle | |
| D431,700 | S | 10/2000 | Roudebush | |
| D431,888 | S | 10/2000 | Roudebush | |
| 6,126,031 | A | 10/2000 | Reason | |
| 6,129,233 | A | 10/2000 | Schiller | |
| 6,131,861 | A | 10/2000 | Fortier, Jr. et al. | |
| D435,951 | S | 1/2001 | Yang et al. | |
| 6,176,455 | B1 | 1/2001 | Ma | |
| 6,209,744 | B1 | 4/2001 | Gill | |
| 6,211,637 | B1 | 4/2001 | Studer | |
| 6,234,339 | B1 | 5/2001 | Thomas | |
| 6,250,492 | B1 | 6/2001 | Verbeek | |
| D445,980 | S | 7/2001 | Tjugum | |
| 6,286,706 | B1 | 9/2001 | Tucker | |
| 6,328,320 | B1 | 12/2001 | Walski et al. | |
| 6,345,725 | B1 | 2/2002 | Lin | |
| 6,364,147 | B1 | 4/2002 | Meinzinger et al. | |
| 6,386,386 | B1 | 5/2002 | George | |
| 6,390,321 | B1 | 5/2002 | Wang | |
| 6,401,958 | B1 | 6/2002 | Foss et al. | |
| D466,667 | S | 12/2002 | Lin | |
| 6,519,130 | B1 | 2/2003 | Breslow | |
| 6,557,716 | B1 | 5/2003 | Chan | |
| D476,456 | S | 6/2003 | Englert et al. | |
| D476,457 | S | 6/2003 | Verbeek | |
| 6,581,796 | B1 | 6/2003 | Pilkinton | |
| 6,596,983 | B2 | 7/2003 | Brent | |
| D480,193 | S | 9/2003 | Wang | |
| 6,612,099 | B2 | 9/2003 | Stravitz | |
| 6,626,316 | B2 | 9/2003 | Yang | |
| 6,626,317 | B2 | 9/2003 | Pfiefer et al. | |
| D481,508 | S | 10/2003 | Wang | |
| 6,632,064 | B1 | 10/2003 | Walker et al. | |
| D481,846 | S | 11/2003 | Lin | |
| D482,169 | S | 11/2003 | Lin | |
| 6,659,407 | B2 | 12/2003 | Asaro | |
| 6,681,950 | B2 | 1/2004 | Miller, Jr. et al. | |
| 6,701,832 | B1 | 3/2004 | Hawkins | |
| D488,604 | S | 4/2004 | Yang et al. | |
| D488,903 | S | 4/2004 | Yang et al. | |
| D489,503 | S | 5/2004 | Lin | |
| D489,855 | S | 5/2004 | Tseng | |
| D489,857 | S | 5/2004 | Yang et al. | |
| D490,583 | S | 5/2004 | Yang et al. | |
| 6,739,474 | B1 | 5/2004 | Wang | |
| D490,954 | S | 6/2004 | Brand | |
| D491,706 | S | 6/2004 | Yang et al. | |
| 6,758,366 | B2 | 7/2004 | Bourgund et al. | |
| D493,930 | S | 8/2004 | Wang | |
| D494,723 | S | 8/2004 | Lin | |
| 6,774,586 | B1 | 8/2004 | Shih | |
| 6,785,912 | B1 | 9/2004 | Julio | |
| 6,812,655 | B1 | 11/2004 | Wang et al. | |
| 6,814,249 | B2 | 11/2004 | Lin | |
| D499,450 | S | 12/2004 | Goodman et al. | |
| 6,837,393 | B1 | 1/2005 | Kuo | |
| 6,857,538 | B2 | 2/2005 | Lin | |
| 6,859,005 | B2 | 2/2005 | Boliver | |
| D503,021 | S | 3/2005 | Yang et al. | |
| D503,022 | S | 3/2005 | Lai | |
| D503,502 | S | 3/2005 | Lai | |
| 6,866,826 | B2 | 3/2005 | Moore et al. | |
| 6,883,676 | B2 | 4/2005 | Lin | |
| D507,090 | S | 7/2005 | Yang et al. | |
| 6,920,994 | B2 | 7/2005 | Lin | |
| D509,339 | S | 9/2005 | Lin | |
| 6,974,948 | B1 | 12/2005 | Brent | |
| D513,445 | S | 1/2006 | Lin | |
| 6,981,606 | B2 | 1/2006 | Yang et al. | |
| D517,763 | S | 3/2006 | Daams | |
| D517,764 | S | 3/2006 | Wang | |
| D517,767 | S | 3/2006 | Yang et al. | |
| D518,266 | S | 3/2006 | Yang et al. | |
| 7,017,773 | B2 | 3/2006 | Gruber et al. | |
| 7,033,039 | B2 | 4/2006 | Lin | |
| D522,203 | S | 5/2006 | Lin | |
| D522,204 | S | 5/2006 | Lin | |
| 7,044,323 | B2 | 5/2006 | Yang | |
| D522,704 | S | 6/2006 | Lin | |
| D524,504 | S | 7/2006 | Lin | |
| D525,756 | S | 7/2006 | Yang et al. | |
| 7,073,677 | B2 | 7/2006 | Richardson et al. | |
| 7,077,283 | B2 | 7/2006 | Yang et al. | |
| 7,080,750 | B2 | 7/2006 | Wein et al. | |
| D526,457 | S | 8/2006 | Lin | |
| D526,458 | S | 8/2006 | Lin | |
| D526,756 | S | 8/2006 | Lin | |
| 7,086,550 | B2 | 8/2006 | Yang et al. | |
| D528,726 | S | 9/2006 | Lin | |
| D530,476 | S | 10/2006 | Lin | |
| D530,874 | S | 10/2006 | Lin | |
| 7,121,421 | B2 | 10/2006 | Yang et al. | |
| D531,499 | S | 11/2006 | Zaidman | |
| D535,450 | S | 1/2007 | Chen | |
| D535,799 | S | 1/2007 | Epps | |
| D535,800 | S | 1/2007 | Yang et al. | |
| 7,163,591 | B2 | 1/2007 | Kim et al. | |
| 7,168,591 | B1 | 1/2007 | Miller | |

(56) References Cited

U.S. PATENT DOCUMENTS

D537,223 S 2/2007 Lin
D537,597 S 2/2007 Bolden
D537,599 S 2/2007 Lin
D537,601 S 2/2007 Lin
D537,999 S 3/2007 Lin
D538,995 S 3/2007 Lin
D539,498 S 3/2007 Yang et al.
D539,499 S 3/2007 Yang et al.
D540,001 S 4/2007 Zimmerman
7,204,441 B1 4/2007 Hartnett et al.
D542,001 S 5/2007 Yang et al.
D542,995 S 5/2007 Lin
D543,673 S 5/2007 Yang et al.
D544,170 S 6/2007 Lin
D544,171 S 6/2007 Lin
D544,671 S 6/2007 Saunders et al.
D545,024 S 6/2007 Liao
7,225,943 B2 6/2007 Yang et al.
D547,020 S 7/2007 Chen
7,243,811 B1 7/2007 Ramsey
D550,918 S 9/2007 Wang et al.
D552,319 S 10/2007 Gusdorf
D552,321 S 10/2007 Yang et al.
D552,823 S 10/2007 Yang et al.
D552,824 S 10/2007 Zimmerman
D552,825 S 10/2007 Yang et al.
D555,320 S 11/2007 Yang et al.
D557,869 S 12/2007 Hawker et al.
D559,494 S 1/2008 Yang et al.
D559,495 S 1/2008 Yang et al.
D562,522 S 2/2008 Daams
7,328,842 B2 2/2008 Wagner et al.
D564,169 S 3/2008 Wang
D564,723 S 3/2008 Yang et al.
D566,367 S 4/2008 Lin
D566,369 S 4/2008 Shek
D566,923 S 4/2008 Lin
D567,468 S 4/2008 Yang et al.
D568,570 S 5/2008 Lin
D568,572 S 5/2008 Yang et al.
D569,720 S 5/2008 Lablaine
7,370,919 B2 5/2008 Rapier, III
7,374,060 B2 5/2008 Yang et al.
D571,520 S 6/2008 Lin
D574,119 S 7/2008 Sofy
7,395,990 B1 7/2008 Stevens
7,398,913 B2 7/2008 McClure
7,404,499 B1 7/2008 Ramsey
D574,569 S 8/2008 Yang et al.
D575,860 S 8/2008 Wu
7,416,093 B2 8/2008 Lin et al.
D576,371 S 9/2008 Zimmerman
D578,265 S 10/2008 Presnell
D578,266 S 10/2008 Yang et al.
D578,268 S 10/2008 Yang et al.
D578,722 S 10/2008 Yang et al.
7,438,199 B1 10/2008 Tidrick
D580,120 S 11/2008 Lin
D580,613 S 11/2008 Yang et al.
D580,615 S 11/2008 Yang et al.
D581,622 S 11/2008 Presnell et al.
D582,121 S 12/2008 Wang et al.
D584,470 S 1/2009 Bizzell et al.
D585,171 S 1/2009 Bizzell et al.
D585,172 S 1/2009 Lin
D585,618 S 1/2009 Yang et al.
D586,065 S 2/2009 Lin
D586,066 S 2/2009 Lin
D586,069 S 2/2009 Lin
D586,070 S 2/2009 Lin
7,494,021 B2 2/2009 Yang et al.
D587,874 S 3/2009 Lin
D588,321 S 3/2009 Schoofs
D589,670 S 3/2009 Smeets
D593,271 S 5/2009 Yang et al.
7,530,578 B2 5/2009 Niemeyer et al.
7,540,396 B2 6/2009 Yang et al.
7,543,716 B2 6/2009 Lin
D596,820 S 7/2009 Yang et al.
7,559,433 B2 7/2009 Yang et al.
D599,074 S 8/2009 Bizzell et al.
D599,971 S 9/2009 Lin
D603,119 S 10/2009 Yang et al.
7,602,135 B2 10/2009 Huber et al.
7,607,552 B2 10/2009 Efstathiou
D604,472 S 11/2009 Blanks et al.
7,614,519 B2 11/2009 Krauth et al.
7,621,420 B2 11/2009 Bandoh et al.
7,633,258 B2 12/2009 Huber et al.
D608,069 S 1/2010 Schoofs
7,656,109 B2 2/2010 Yang et al.
D611,216 S 3/2010 Yang et al.
D611,217 S 3/2010 Bizzell et al.
D611,671 S 3/2010 Yang et al.
7,694,838 B2 4/2010 Yang et al.
7,703,622 B1 4/2010 Bynoe
D615,270 S 5/2010 Yang et al.
D615,722 S 5/2010 Yang et al.
7,712,285 B2 5/2010 Stravitz et al.
7,731,112 B2 6/2010 Matlin et al.
7,741,801 B2 6/2010 Fukuizumi
7,748,556 B2 * 7/2010 Yang ........................ B65F 7/00
220/DIG. 13
7,774,202 B2 8/2010 Spengler et al.
7,781,995 B2 8/2010 Yang et al.
D623,817 S 9/2010 Yang et al.
D625,068 S 10/2010 Shannon
7,806,285 B2 10/2010 Yang et al.
D627,533 S 11/2010 Yang et al.
D627,944 S 11/2010 Wang et al.
D629,172 S 12/2010 Liao
D629,579 S 12/2010 Lin
D630,404 S 1/2011 Yang et al.
D631,221 S 1/2011 Yang et al.
D632,039 S 2/2011 Yang et al.
D632,864 S 2/2011 Yang et al.
7,888,898 B2 2/2011 Wilkerson
D634,911 S 3/2011 Yang et al.
D635,319 S 3/2011 Meyerhoffer
7,896,187 B2 3/2011 Haibel
7,906,921 B2 3/2011 Wang et al.
7,922,024 B2 4/2011 Yang et al.
7,950,543 B2 5/2011 Yang et al.
D639,520 S 6/2011 Lin
D644,390 S 8/2011 Smeets et al.
7,992,742 B1 8/2011 Kim
8,006,857 B2 8/2011 Lin
D644,806 S 9/2011 Yang et al.
D644,807 S 9/2011 Yang et al.
D649,728 S 11/2011 Campbell
8,074,833 B2 12/2011 Yang et al.
8,096,445 B2 1/2012 Yang et al.
D655,061 S 2/2012 Scaturro
8,136,688 B2 3/2012 Lee et al.
D657,108 S 4/2012 Yang et al.
D657,109 S 4/2012 Liao
D658,753 S 5/2012 Zhang et al.
8,297,470 B2 10/2012 Yang et al.
8,317,055 B2 * 11/2012 Zawrotny ............... B65F 1/062
220/495.07
D672,520 S 12/2012 Yang et al.
D673,750 S 1/2013 Quan
D675,802 S 2/2013 Yang et al.
D675,803 S 2/2013 Yang et al.
8,393,489 B1 3/2013 Stravitz
8,418,869 B2 4/2013 Yang et al.
D684,741 S 6/2013 Harris
8,456,120 B2 6/2013 Wang
D689,255 S 9/2013 Sun Ting Kung et al.
8,567,630 B2 10/2013 Yang et al.
8,569,980 B2 10/2013 Yang et al.
D694,382 S 11/2013 Brandenburg et al.
8,575,537 B2 11/2013 Yao et al.
8,607,932 B2 12/2013 Cooper et al.

(56) References Cited

U.S. PATENT DOCUMENTS

| | | | |
|---|---|---|---|
| 8,672,171 | B2 | 3/2014 | Wynn et al. |
| 8,678,219 | B1 | 3/2014 | Wang et al. |
| 8,686,676 | B2 | 4/2014 | Yang et al. |
| D704,406 | S | 5/2014 | Kern |
| 8,716,969 | B2 | 5/2014 | Yang et al. |
| 8,720,728 | B2 | 5/2014 | Yang et al. |
| D709,172 | S | 7/2014 | Brandenburg et al. |
| D709,662 | S | 7/2014 | Yang et al. |
| 8,766,582 | B2 | 7/2014 | Yang et al. |
| 8,807,378 | B2 | 8/2014 | Kaberna |
| 8,807,379 | B1 | 8/2014 | Hammond |
| D714,510 | S | 9/2014 | Yang et al. |
| D715,575 | S | 10/2014 | Williams et al. |
| D716,015 | S | 10/2014 | van de Leest |
| 8,851,316 | B2 | 10/2014 | Barrett et al. |
| 8,872,459 | B2 | 10/2014 | Yang et al. |
| D717,012 | S | 11/2014 | Han |
| D717,013 | S | 11/2014 | Han |
| D717,014 | S | 11/2014 | Han |
| D717,015 | S | 11/2014 | Han |
| D719,313 | S | 12/2014 | Kao |
| 8,910,821 | B1 | 12/2014 | Stravitz |
| D725,860 | S | 3/2015 | Spivey et al. |
| D725,861 | S | 3/2015 | Yang et al. |
| D729,367 | S | 5/2015 | Markwick et al. |
| D729,368 | S | 5/2015 | Markwick et al. |
| D729,485 | S | 5/2015 | Yang et al. |
| D730,008 | S | 5/2015 | Yang et al. |
| 9,051,093 | B2 | 6/2015 | Yang et al. |
| 9,284,766 | B2 | 3/2016 | Wenzel |
| D755,461 | S | 5/2016 | Wall |
| D758,686 | S | 6/2016 | Beumer |
| D759,934 | S | 6/2016 | Yang et al. |
| D762,037 | S | 7/2016 | Chen |
| D765,937 | S | 9/2016 | Chen |
| D766,998 | S | 9/2016 | Kao et al. |
| 9,434,538 | B2 | 9/2016 | Yang et al. |
| D770,121 | S | 10/2016 | Chen |
| D771,344 | S | 11/2016 | Yang et al. |
| D773,145 | S | 11/2016 | Yang et al. |
| 9,481,515 | B2 | 11/2016 | Yang et al. |
| D773,769 | S | 12/2016 | Chen |
| 9,573,759 | B2 | 2/2017 | Yang et al. |
| 9,586,755 | B1 | 3/2017 | Yang et al. |
| D787,828 | S | 5/2017 | Thoma et al. |
| D790,145 | S | 6/2017 | Chen |
| D792,673 | S | 7/2017 | Lloyd et al. |
| D793,642 | S | 8/2017 | Yang et al. |
| D794,765 | S | 8/2017 | Brandenburg et al. |
| D798,016 | S | 9/2017 | Yang et al. |
| 9,751,692 | B2 | 9/2017 | Yang et al. |
| 9,790,025 | B2 | 10/2017 | Yang et al. |
| D804,133 | S | 11/2017 | Yang et al. |
| 9,850,064 | B2 * | 12/2017 | Egan ....................... B65F 1/062 |
| 9,856,080 | B2 | 1/2018 | Yang et al. |
| D809,729 | S | 2/2018 | Chen |
| D820,544 | S | 6/2018 | Joseph |
| D825,876 | S | 8/2018 | Chen |
| D827,968 | S | 9/2018 | Chen |
| D829,400 | S | 9/2018 | Yang et al. |
| D830,029 | S | 10/2018 | Greenspoon et al. |
| D835,374 | S | 12/2018 | Yang et al. |
| D835,376 | S | 12/2018 | Yang et al. |
| D836,278 | S | 12/2018 | Berberet et al. |
| D840,628 | S | 2/2019 | Chang |
| D841,275 | S | 2/2019 | Chen |
| D842,573 | S | 3/2019 | Smeets |
| D845,576 | S | 4/2019 | Lu |
| 10,279,996 | B2 | 5/2019 | Yang et al. |
| 10,279,997 | B2 | 5/2019 | Yang et al. |
| D851,350 | S | 6/2019 | Lu |
| D853,065 | S | 7/2019 | Liao |
| D853,067 | S | 7/2019 | Chen |
| D853,068 | S | 7/2019 | Chen |
| D855,919 | S | 8/2019 | Yang et al. |
| D858,023 | S | 8/2019 | Beumer et al. |
| D858,024 | S | 8/2019 | Yang et al. |
| D858,923 | S | 9/2019 | Yang et al. |
| D861,076 | S | 9/2019 | Chen |
| 10,413,064 | B1 | 9/2019 | Lu |
| 10,472,170 | B2 | 11/2019 | Yang et al. |
| D871,564 | S | 12/2019 | Brandenburg et al. |
| 10,494,175 | B2 | 12/2019 | Yang et al. |
| D874,776 | S | 2/2020 | Spadotto |
| D876,040 | S | 2/2020 | Chen |
| 10,654,648 | B1 | 5/2020 | Rodriguez |
| 10,683,165 | B2 | 6/2020 | Yang et al. |
| 10,723,549 | B2 | 7/2020 | Yang et al. |
| D901,815 | S | 11/2020 | Yang et al. |
| D903,217 | S | 11/2020 | Smeets |
| D905,367 | S | 12/2020 | Smeets |
| D907,320 | S | 1/2021 | Moreno |
| D911,650 | S | 2/2021 | Liao |
| D911,651 | S | 2/2021 | Liao |
| 10,906,738 | B2 | 2/2021 | Barry |
| D915,712 | S | 4/2021 | Liu |
| 11,008,163 | B2 | 5/2021 | Wang et al. |
| 11,027,916 | B2 | 6/2021 | Yang et al. |
| D925,153 | S | 7/2021 | Busch |
| D929,062 | S | 8/2021 | Chen |
| D930,933 | S | 9/2021 | Yang et al. |
| 11,136,186 | B2 | 10/2021 | Yang et al. |
| D936,927 | S | 11/2021 | Zeng |
| D938,125 | S | 12/2021 | Zhang |
| D939,174 | S | 12/2021 | Zeng |
| 11,279,555 | B2 | 3/2022 | Yang et al. |
| D951,578 | S | 5/2022 | Lu |
| D963,277 | S | 9/2022 | Yang et al. |
| D969,291 | S | 11/2022 | Yang et al. |
| 11,535,449 | B2 | 12/2022 | Yang et al. |
| D979,167 | S | 2/2023 | Liao et al. |
| D982,273 | S | 3/2023 | Chen |
| 11,603,263 | B2 | 3/2023 | Yang et al. |
| D992,231 | S | 7/2023 | Wang et al. |
| 11,801,996 | B2 | 10/2023 | Yang et al. |
| D1,004,069 | S | 11/2023 | Yang et al. |
| D1,006,373 | S | 11/2023 | Bianchi |
| D1,009,652 | S | 1/2024 | Chen |
| D1,013,997 | S | 2/2024 | Wang et al. |
| 12,043,480 | B1 | 7/2024 | Yang et al. |
| 12,139,328 | B2 | 11/2024 | Yang et al. |
| D1,071,472 | S | 4/2025 | Zhuo |
| D1,072,411 | S | 4/2025 | Yang et al. |
| D1,072,412 | S | 4/2025 | Yang et al. |
| 12,351,390 | B2 | 7/2025 | Yang et al. |
| D1,094,941 | S | 9/2025 | Yang et al. |
| 12,522,432 | B2 | 1/2026 | Yang et al. |
| 2001/0002690 | A1 | 6/2001 | Rosky |
| 2001/0013745 | A1 | 8/2001 | Fulterer et al. |
| 2001/0020619 | A1 | 9/2001 | Pfeifer et al. |
| 2001/0045512 | A1 | 11/2001 | Brent |
| 2002/0009567 | A1 | 1/2002 | Brand |
| 2002/0066736 | A1 | 6/2002 | Pyles |
| 2002/0092853 | A1 | 7/2002 | Wang |
| 2002/0096523 | A1 | 7/2002 | Pyles |
| 2002/0096524 | A1 | 7/2002 | Hardesty |
| 2002/0100758 | A1 | 8/2002 | Pyles |
| 2002/0104266 | A1 | 8/2002 | Ranaudo |
| 2002/0116924 | A1 | 8/2002 | Winkelmann et al. |
| 2003/0089719 | A1 | 5/2003 | Berger |
| 2003/0102316 | A1 | 6/2003 | Forest |
| 2003/0201265 | A1 | 10/2003 | Lin |
| 2003/0205979 | A1 | 11/2003 | Papari et al. |
| 2003/0230576 | A1 | 12/2003 | Lin |
| 2004/0016756 | A1 | 1/2004 | Lin |
| 2004/0028572 | A1 | 2/2004 | Sham et al. |
| 2004/0134924 | A1 | 7/2004 | Hansen et al. |
| 2004/0140782 | A1 | 7/2004 | Okabe et al. |
| 2004/0164077 | A1 | 8/2004 | Kuo |
| 2004/0174268 | A1 | 9/2004 | Scott et al. |
| 2004/0175303 | A1 | 9/2004 | Lin |
| 2004/0199401 | A1 | 10/2004 | Wagner |
| 2004/0200938 | A1 | 10/2004 | Forlivio |
| 2004/0206758 | A1 | 10/2004 | Lin |

(56) References Cited

U.S. PATENT DOCUMENTS

2004/0206760 A1 10/2004 Gagnebin
2004/0250711 A1 12/2004 Ernst
2004/0251746 A1 12/2004 Ichimaru et al.
2005/0017006 A1 1/2005 Kuo
2005/0017010 A1 1/2005 Siegel et al.
2005/0029281 A1 2/2005 Westermann et al.
2005/0129803 A1 6/2005 Umeda et al.
2005/0253004 A1 11/2005 Hsieh et al.
2005/0258177 A1 11/2005 Woodson
2005/0258794 A1 11/2005 Fukuizumi
2006/0027579 A1 2/2006 Yang et al.
2006/0103086 A1 5/2006 Niemeyer et al.
2006/0138149 A1 6/2006 Tracy
2006/0163257 A1 7/2006 Golbert
2006/0169697 A1* 8/2006 Koch ...................... B65F 1/062 220/495.07
2006/0175336 A1 8/2006 Wang
2006/0186121 A1 8/2006 Yang et al.
2006/0196874 A1 9/2006 Yang
2006/0237641 A1 10/2006 Moeller et al.
2006/0249510 A1 11/2006 Lin
2006/0278643 A1 12/2006 Chiou
2006/0283863 A1 12/2006 Coles
2007/0012699 A1 1/2007 Yang et al.
2007/0034334 A1 2/2007 Ramsey et al.
2007/0034723 A1 2/2007 Joachim et al.
2007/0045326 A1 3/2007 Tramontina et al.
2007/0090112 A1 4/2007 Kalman et al.
2007/0114847 A1 5/2007 Ichimaru et al.
2007/0181579 A1 8/2007 Kuo et al.
2007/0209846 A1 9/2007 Wilson
2007/0215622 A1 9/2007 Perez
2007/0241109 A1 10/2007 Lin
2007/0266637 A1 11/2007 McGowan
2007/0272691 A1 11/2007 Wang et al.
2007/0289972 A1 12/2007 Wynn et al.
2008/0011754 A1 1/2008 Ramsey
2008/0011910 A1 1/2008 Ramsey
2008/0041863 A1 2/2008 Forest
2008/0083627 A1 4/2008 Hamm
2008/0083756 A1 4/2008 Daniels
2008/0083757 A1* 4/2008 Parker ..................... B65F 1/062 220/495.07
2008/0099274 A1 5/2008 Seel
2008/0128428 A1 6/2008 Beckerman
2008/0164257 A1 7/2008 Boll et al.
2008/0173648 A1 7/2008 Escobar et al.
2008/0236275 A1 10/2008 Breed et al.
2008/0237249 A1 10/2008 McGee
2008/0245794 A1 10/2008 Escobar et al.
2008/0257889 A1 10/2008 Kovacevich et al.
2008/0257890 A1 10/2008 Kovacevich et al.
2008/0257891 A1 10/2008 Kovacevich et al.
2008/0264948 A1 10/2008 Kovacevich et al.
2008/0264950 A1 10/2008 Kovacevich et al.
2008/0272119 A1 11/2008 Efstathiou
2008/0272127 A1 11/2008 Kovacevich et al.
2009/0008888 A1 1/2009 Boulden
2009/0071959 A1 3/2009 Cheung
2009/0084788 A1 4/2009 Yang et al.
2009/0136341 A1 5/2009 Kenyon
2009/0214606 A1 8/2009 Bujard et al.
2009/0218352 A1 9/2009 Sued et al.
2009/0230131 A1 9/2009 McDuffie et al.
2009/0261104 A1* 10/2009 Cho ........................ B65F 1/062 220/495.07
2009/0261105 A1 10/2009 Cunningham et al.
2009/0266836 A1 10/2009 Mobley
2010/0006572 A1 1/2010 Chiou
2010/0084235 A1 4/2010 Lu
2010/0096894 A1 4/2010 Fukai
2010/0122985 A1 5/2010 Peters et al.
2010/0147865 A1 6/2010 Yang et al.
2010/0170904 A1 7/2010 Kalman et al.
2010/0176126 A1 7/2010 Shikano
2010/0178105 A1 7/2010 Monneret
2010/0193518 A1 8/2010 Tontarelli
2010/0206880 A1* 8/2010 Leon ....................... B65F 1/062 220/495.07
2010/0219191 A1 9/2010 Prosa
2010/0237074 A1 9/2010 Yang et al.
2010/0252557 A1 10/2010 Clements
2010/0276428 A1* 11/2010 Lord ....................... B65F 1/062 220/495.07
2010/0294766 A1 11/2010 Wang et al.
2010/0294769 A1 11/2010 Lee et al.
2011/0011871 A1* 1/2011 Licata ..................... B65F 1/062 220/495.07
2011/0017735 A1 1/2011 Wang et al.
2011/0049149 A1 3/2011 Shih
2011/0056952 A1 3/2011 Borowski et al.
2011/0139781 A1 6/2011 Jin et al.
2011/0156560 A1 6/2011 Michael
2011/0220647 A1 9/2011 Yang et al.
2011/0272409 A1 11/2011 Kasbohm
2011/0284549 A1* 11/2011 James ..................... B65F 1/004 220/495.07
2012/0000911 A1 1/2012 Wang
2012/0111895 A1 5/2012 Fitzpatrick et al.
2012/0145932 A1 6/2012 Yao et al.
2012/0234836 A1 9/2012 Barrett et al.
2012/0234849 A1 9/2012 Hughes et al.
2012/0248149 A1 10/2012 Pelfrey
2012/0261423 A1 10/2012 Zawrotny et al.
2012/0267375 A1 10/2012 Egan et al.
2013/0001342 A1 1/2013 Romanovich et al.
2013/0002100 A1 1/2013 Badri et al.
2013/0036924 A1 2/2013 Ko
2013/0048641 A1 2/2013 Romano
2013/0097809 A1 4/2013 Weber et al.
2013/0105487 A1 5/2013 Baik
2013/0105488 A1 5/2013 Quan
2013/0240592 A1 9/2013 Woodruff
2013/0248535 A1 9/2013 Wolfe et al.
2013/0300119 A1 11/2013 Anzalon et al.
2014/0183193 A1 7/2014 Hammond et al.
2014/0238989 A1 8/2014 Wang et al.
2014/0240964 A1 8/2014 Adachi et al.
2014/0305946 A1 10/2014 Han
2014/0345453 A1 11/2014 Oh et al.
2015/0028751 A1 1/2015 Dobbins
2015/0213705 A1 7/2015 Ehrman et al.
2015/0251849 A1 9/2015 Yang et al.
2015/0321841 A1 11/2015 Salas et al.
2016/0035209 A1 2/2016 Martin et al.
2016/0137411 A1 5/2016 Rogers
2016/0162832 A1 6/2016 Thompson et al.
2016/0200508 A1 7/2016 Thoma et al.
2016/0239795 A1 8/2016 Burch, V et al.
2017/0050404 A1 2/2017 Henken et al.
2017/0052613 A1 2/2017 Alameh et al.
2017/0166167 A1 6/2017 Heller et al.
2017/0176986 A1 6/2017 High et al.
2018/0044108 A1 2/2018 Ackerman
2019/0077595 A1 3/2019 Wang et al.
2019/0169930 A1 6/2019 Niemiec
2020/0148467 A1 5/2020 Yang et al.
2021/0269238 A1 9/2021 Shek
2022/0097960 A1 3/2022 Yang et al.
2022/0135318 A1 5/2022 Bing et al.
2022/0153517 A1 5/2022 Wilhelmsen et al.
2022/0160126 A1 5/2022 Yang et al.
2022/0375320 A1 11/2022 Thompson et al.
2023/0115198 A1 4/2023 Yang et al.
2023/0286740 A1 9/2023 Yang et al.
2023/0356235 A1 11/2023 Yang et al.
2024/0270487 A1 8/2024 Yang et al.
2025/0136366 A1 5/2025 Yang et al.
2025/0171225 A1 5/2025 Yang et al.

(56) References Cited

U.S. PATENT DOCUMENTS

| | | | |
|---|---|---|---|
| 2025/0242999 | A1 | 7/2025 | Yang et al. |
| 2025/0289652 | A1 | 9/2025 | Yang et al. |

FOREIGN PATENT DOCUMENTS

| | | | |
|---|---|---|---|
| CA | 2078813 | | 9/1992 |
| CA | 2182840 | | 9/1997 |
| CA | 2519295 | | 3/2007 |
| CA | 132181 | | 6/2010 |
| CA | 2695086 | | 9/2010 |
| CA | 136938 | | 5/2011 |
| CA | 141819 | | 4/2012 |
| CA | 2778535 | A1 | 8/2013 |
| CN | 2075182 | U | 4/1991 |
| CN | 2378327 | Y | 5/2000 |
| CN | 2467467 | Y | 12/2001 |
| CN | 1570196 | A | 1/2005 |
| CN | 2707695 | Y | 7/2005 |
| CN | 1918002 | A | 2/2007 |
| CN | 200964993 | Y | 10/2007 |
| CN | 101177946 | A | 5/2008 |
| CN | 201105898 | Y | 8/2008 |
| CN | 101509131 | A | 8/2009 |
| CN | 201330049 | Y | 10/2009 |
| CN | 201367221 | Y | 12/2009 |
| CN | 201372076 | Y | 12/2009 |
| CN | 201447201 | U | 5/2010 |
| CN | 201512253 | U | 6/2010 |
| CN | 201597962 | U | 10/2010 |
| CN | 201625566 | | 11/2010 |
| CN | 201907743 | U | 7/2011 |
| CN | 202213911 | U | 5/2012 |
| CN | 301947175 | S | 6/2012 |
| CN | 103072348 | A | 5/2013 |
| CN | 203006242 | U | 6/2013 |
| CN | 103207416 | A | 7/2013 |
| CN | 103300590 | A | 9/2013 |
| CN | 103303618 | A | 9/2013 |
| CN | 204587817 | U | 8/2015 |
| CN | 205169479 | U | 4/2016 |
| CN | 106690938 | A | 5/2017 |
| CN | 107032015 | A | 8/2017 |
| CN | 107495686 | A | 12/2017 |
| CN | 109775193 | A | 5/2019 |
| CN | 305634902 | | 3/2020 |
| CN | 112407663 | A | 2/2021 |
| CN | 307220540 | | 4/2022 |
| CN | 307232793 | | 4/2022 |
| CN | 307264711 | | 4/2022 |
| CN | 309146470 | | 3/2025 |
| DE | 1610087 | | 7/1950 |
| DE | 822376 | | 11/1951 |
| DE | 1283741 | | 7/1966 |
| DE | 7503716 | U | 8/1975 |
| DE | 8436939 | | 3/1985 |
| DE | 9108341 | | 10/1991 |
| DE | 4225936 | | 2/1994 |
| DE | 19525885 | | 3/1997 |
| DE | 19617823 | | 11/1997 |
| DE | 19809331 | | 5/1999 |
| DE | 19811991 | A1 | 9/1999 |
| DE | 19824941 | A1 | 12/1999 |
| DE | 29918687 | | 3/2000 |
| DE | 19933180 | | 1/2001 |
| DE | 10036259 | A1 | 11/2001 |
| DE | 10148997 | | 4/2003 |
| DE | 10155943 | A1 | 5/2003 |
| DE | 20305521 | U1 | 6/2003 |
| DE | 20217561 | | 3/2004 |
| DE | 10305311 | A1 | 8/2004 |
| DE | 10337806 | A1 | 3/2005 |
| DE | 202006016420 | U1 | 2/2007 |
| DE | 202004021206 | U1 | 4/2007 |
| DE | 202009016101 | U1 | 4/2011 |
| DE | 102017114984 | A1 | 1/2018 |
| EP | 0582240 | | 7/1993 |
| EP | 0903305 | A1 | 3/1999 |
| EP | 0906876 | A2 | 4/1999 |
| EP | 1094017 | A1 | 4/2001 |
| EP | 1162161 | | 12/2001 |
| EP | 1172307 | A1 | 1/2002 |
| EP | 1193690 | A1 | 4/2002 |
| EP | 0957046 | B1 | 8/2003 |
| EP | 1361176 | A1 | 11/2003 |
| EP | 1136393 | B1 | 4/2004 |
| EP | 1447342 | A2 | 8/2004 |
| EP | 1457438 | A1 | 9/2004 |
| EP | 1481924 | A1 | 12/2004 |
| EP | 1508537 | A1 | 2/2005 |
| EP | 1600373 | A2 | 11/2005 |
| EP | 1602599 | A2 | 12/2005 |
| EP | 1623937 | A1 | 2/2006 |
| EP | 1647503 | A1 | 4/2006 |
| EP | 1686073 | A1 | 8/2006 |
| EP | 1816090 | A1 | 8/2007 |
| EP | 1918223 | A1 | 5/2008 |
| EP | 1700799 | B1 | 8/2009 |
| EP | 001164826-0001 | | 9/2009 |
| EP | 001232904-0001 | | 10/2010 |
| EP | 2343250 | A1 | 7/2011 |
| EP | 2387911 | A1 | 11/2011 |
| EP | 2636613 | B1 | 3/2015 |
| EP | 3042864 | A1 | 7/2016 |
| EP | 3167789 | A1 | 5/2017 |
| EP | 4292955 | A2 | 12/2023 |
| ES | 1022452 | U | 4/1993 |
| ES | 2253079 | B1 | 6/2004 |
| FR | 2887152 | | 12/2006 |
| GB | 191004921 | | 6/1910 |
| GB | 968738 | A | 9/1964 |
| GB | 1555543 | A | 11/1979 |
| GB | 2046694 | A | 11/1980 |
| GB | 2384418 | | 7/2003 |
| GB | 2559346 | A | 8/2018 |
| JP | 02-152670 | | 6/1990 |
| JP | H06-56011 | | 8/1994 |
| JP | 06-272888 | | 9/1994 |
| JP | 2004-106713 | | 4/2004 |
| JP | 2004-231237 | | 8/2004 |
| JP | D1300450 | | 5/2007 |
| JP | D1300451 | | 5/2007 |
| JP | 2007-154831 | A | 6/2007 |
| JP | D1322056 | | 2/2008 |
| JP | D1398668 | | 10/2010 |
| JP | 2013-231413 | A | 11/2013 |
| JP | 2014-523329 | A | 9/2014 |
| JP | 2020-143829 | A | 9/2020 |
| KR | 20040087306 | A | 10/2004 |
| KR | 3003841370000 | | 6/2005 |
| KR | 3004095430000 | | 3/2006 |
| KR | 3004095430001 | | 7/2006 |
| NL | 6908550 | | 12/1970 |
| NL | 1005057 | C2 | 7/1998 |
| TW | 183920 | | 5/1992 |
| TW | 230977 | | 9/1994 |
| TW | 395392 | | 6/2000 |
| TW | D112733 | | 9/2006 |
| TW | D129485 | | 7/2009 |
| TW | D133382 | | 2/2010 |
| TW | D133678 | | 3/2010 |
| TW | 145989 | | 3/2012 |
| TW | D162495 | | 8/2014 |
| TW | 201720729 | | 6/2017 |
| WO | WO 92/02430 | A1 | 2/1992 |
| WO | WO 96/33671 | | 10/1996 |
| WO | WO 2005/080232 | A1 | 9/2005 |
| WO | WO 2005/097329 | A1 | 10/2005 |
| WO | WO 2006/079263 | A1 | 8/2006 |
| WO | WO 2007/139570 | | 12/2007 |
| WO | WO 2009/114495 | A1 | 9/2009 |
| WO | WO 2015/134902 | A1 | 9/2015 |
| WO | WO 2015/138625 | A1 | 9/2015 |
| WO | WO 2016/054109 | A1 | 4/2016 |
| WO | WO 2016/133407 | A1 | 8/2016 |

(56) References Cited

FOREIGN PATENT DOCUMENTS

| | | | |
|---|---|---|---|
| WO | WO 2021/180516 | A1 | 9/2021 |
| WO | WO 2023/064221 | A1 | 4/2023 |
| WO | WO 2023/215375 | | 11/2023 |

OTHER PUBLICATIONS alzashop.com, Simplehuman 45L Pedal Rectangular White Plastic Stainless Steel Trash Can, https://www.alzashop.com/simplehuman-45l-pedal-rectangular-white-plastic-stainless-steel-d5841987.htm, site visited Jul. 20, 2021, in 3 pages.

U.S. Appl. No. 15/476,285, filed Mar. 31, 2017, Yang et al.

Kohler 6-Liter step trash can, Amazon.com Listing and Kohler.com Listing, including Customer Review dated Feb. 17, 2021, in 15 pages.

Youtube.com, "Automatic trash can pull out cabinet with Arduino (DIY)", dated Oct. 9, 2019, https://www.youtube.com/watch?v=mmcgTaE45_Y, entire video, including screenshot in 1 page.

Youtube.com, "trash pullout with servo drive installed", dated Jun. 17, 2011, https://www.youtube.com/watch?v=tO1SbtllEh8, entire video, including screenshots in 3 pages.

Extended European Search Report issued in European Patent Application No. 24160964.3, dated Sep. 6, 2024, in 10 pages.

Office Action issued in European Patent Application No. 24160964.3, dated Apr. 29, 2025, in 4 pages.

Brabantia 121623 Bo Pedal Bin, available online Apr. 12, 2018, site visited Dec. 6, 2024, https://www.amazon.com/ae/dp/B07915MP85/, in 6 pages.

Brightroom, 10L Stainless Slim Step Trash Can, available online 2021, site visited Apr. 27, 2025, https://www.target.com/p/10l-stainless-slim-step-trash-can-brightroom-8482/-/A-83279889, in 9 pages.

Home Depot, 2.6 Gallons Stainless Slim Step-On Trash Can, available online Apr. 2020, site visited Apr. 27, 2025, https://www.homedepot.com/p/StyleWell-2-6-Gal-Stainless-Steel-Slim-Step-On-Trash-Can_STY-SOT-10-35/316759338, in 6 pages.

ITouchless Semi-Round SoftStep 13.2 Gallon Step Trash Can, date first available May 17, 2021, www.amazon.com/iTouchless-Fingerprint-Space-Saving-Stainless-Steel-Semi-Round/dp/B09553H6QH?source=ps-sl-shoppingads-lpcontext&ref, 8 pages.

Nine Stars, XZD-10-35 Step On Trash Can, available online Apr. 2022, site visited Apr. 27, 2025, https://www.amazon.com/NINESTARS-XZD-10-35-Trash-Small-Silver/dp/B09RTPJFMG, in 8 pages.

Simplehuman Liner Rim Dual Bucket Rectangular Recycler with Liner Pocket, Stainless Steel, 58 Liter / 15 Gallon, Item No. CW2025, www.Amazon.com, site visited Dec. 29, 2015.

Simplehuman Stainless Steel Semi Round Trash Bin, date first available Aug. 6, 2012, www.amazon.ae/Simplehuman-Stainless-Steel-Silver-Liters-CW1833/dp/B001BO76WY/, 6 pages.

Web page showing picture of Hero Bullet trash can, archived Nov. 17, 2004, downloaded from http://web.archive.org/web/20041117003115/http://www.simplehuman.com/images/hero_bullet.jpg.

* cited by examiner

RECEPTACLES WITH INTERIOR LINER DISPENSERS

CROSS REFERENCE

This application claims priority to U.S. Provisional Application No. 63/507,716, filed Jun. 12, 2023, and U.S. Provisional Application No. 63/488,258, filed Mar. 3, 2023, the disclosure of each of which is incorporated herein by reference in its entirety for all purposes. Any and all applications for which a foreign or domestic priority claim is identified in the Application Data Sheet as filed with the present application are hereby incorporated herein by reference in their entirety under 37 CFR 1.57 for all purposes.

BACKGROUND

Field

This disclosure relates generally to receptacle assemblies, and particularly in some embodiments to trash can assemblies with liners.

Certain Related Art

Receptacles for holding waste (e.g., trash, recycling, compost, etc.) often use disposable liners for containing the waste, for easily removing waste from the receptacle, and for preventing the waste from contaminating the receptacle. A liner may be a plastic bag (also called a "trash bag" or "bag") used to line an interior of the receptacle. Receptacles have been improved over the years to make them more user-friendly, sanitary, and hygienic. For example, some trash cans include an interior metal or plastic container that can be configured to hold the waste and that fits within the receptacle. This container can accept a liner and can be removed and washed.

SUMMARY OF CERTAIN FEATURES

A challenge is that liners (trash bags) are not always easily accessible at a trash can or other receptacle. For example, the liners may be stored in a location spaced away from the trash can, such as in a closet or under a sink. This can make it inconvenient to access a replacement liner and/or can increase the chance of a user forgetting to insert a replacement liner in the trash can. As a result, the trash can may be left without a liner for an extended period of time. During that time, waste may be thrown directly into the trash can, thus contaminating the trash can interior and creating a mess.

Certain aspects of the disclosure are directed toward a receptacle assembly (e.g., trash can, recycling bin, etc.) that provides easy and/or convenient access to liners. The receptacle assembly can include a body having a front wall, a rear wall, and lateral sidewalls. The receptacle assembly can include a liner dispenser that can hold and dispense liners, such as one at a time. The liner dispenser can be disposed at least partially on an interior surface of the rear wall. In some embodiments, an exterior surface of the rear wall is generally planar, is continuous, and/or does not include an opening that provides access to the liners. The bag dispenser can hold a quantity of liners and provide ready access to the liners (e.g., to facilitate replacement of a used liner).

In certain aspects, the liner dispenser can be positioned closer to an upper edge of the body than a lower edge of the body. An upper edge of the liner dispenser can be displaced from the upper edge of the body and a lower edge of the liner dispenser can be displaced from the lower edge of the body. In several implementations, the liner dispenser is positioned between the rear and front walls of the body and/or in an interior space of the body.

In certain aspects, the receptacle assembly can include a trim member extending at least partially around the upper edge of the body. The trim member can be pivotably coupled to the body. A lid can be pivotably coupled to the body and/or the trim member. The lid can be selectively opened and closed, such as with a mechanical linkage connected to a foot pedal or motor.

In certain aspects, the receptacle assembly can include a generally rigid inner body (e.g., an inner waste container or an interior container) that is receivable within the interior space of the body. The inner body can be referred-to as a "basin." The basin can have an upper lip to receive an upper edge of a liner (e.g., a trash bag) such that the liner is retained in the basin. The basin can be removable from the receptacle assembly to provide access to the liner dispenser. In certain embodiments, the basin can have an opening to provide access to the liner dispenser on an interior wall of the receptacle assembly. In some variants, with the basin installed in the body, the liner dispenser is positioned between the basin and the rear wall.

Certain aspects of the disclosure are directed toward a method of inserting a liner into a receptacle assembly having one or more of the features described herein. The method can include opening a lid of the receptacle assembly. The method can include removing a basin of the receptacle assembly from a body of the receptacle assembly. The method can include exposing a liner dispenser on an interior surface (e.g., an interior front or rear wall) of the receptacle assembly. The method can include inserting a plurality of liners into the liner dispenser. The method can include pulling a bag (e.g., a single bag) of the plurality of bags through an opening in the liner dispenser. For example, the bag can be pulled straight upward or at an upward angle. The bag can be pulled out of the receptacle assembly or into an interior of the receptacle. In various embodiments, the bag is not pulled or moved downward toward a bottom of the receptacle assembly before being removed from the receptacle assembly and/or placed in a position for use.

In several embodiments, the liner dispenser is concealed. A concealed liner dispenser provides certain advantages. For example, an outer shell of the receptacle assembly can conceal the liner dispenser from sight, which can provide a more streamlined outer shape for the receptacle assembly. Also, the outer shell can protect the liner dispenser from damage.

As another example, an interior liner dispenser may facilitate cleaning. Dust and dirt can fall on any area that protrudes from the outer shell of the receptacle assembly. This may require the user to clean the surface of the protrusion along with the edges of the protrusion. An interior liner dispenser can reduce or eliminate the need for this additional cleaning.

As a further example, an interior liner dispenser can facilitate placement of the receptacle assembly. A user may wish to place the receptacle assembly flush with another objection, such as a vertical wall, appliance, or cabinet surface. An interior liner allows for the exterior shell of the receptacle assembly to have a generally flat surface, such as a surface without an exterior protrusion to house a liner dispenser. This provides the user with the ability to place the receptacle assembly flush with another surface, such as a wall surface. In some aspects, the receptacle assembly comprises an interior liner dispenser and a generally flat outer rear wall.

Certain aspects of this disclosure are directed to a receptacle assembly that comprises an interior liner dispenser can be generally designed to have a cavity space between the outer shell (also called the exterior wall) and a basin (also called the interior container). The liner dispenser can be positioned in the cavity space. This can eliminate the need for an exterior protrusion and a displaced rear wall to house the liner dispenser. In certain implementations, the rear wall can extend at least half the vertical distance between a lid and a base of the receptacle assembly.

According to certain aspects, the liner dispenser is hidden and protected inside the outer wall of the receptacle assembly. In some implementations, a user can open the lid of the receptacle assembly and remove the basin and/or the liner installed in the basin (and any refuse in the liner). In some embodiments, removal of the basin from the receptacle assembly can provide the user with access to the liner dispenser, such as through the open lid opening. The user can extract a new liner from the liner dispenser. The user can remove the existing liner from the basin, place the new liner in the basin, and place the basin and new liner back in the receptacle assembly and/or can place the basin in the receptacle assembly and then install the liner in the basin. With the basin in the body, the liner dispenser can be hidden from view and protected. The liner dispenser can be concealed by the outer shell a side or end (such as a front side of the liner dispenser) and by the basin on another side or other end (such as a rear side of the liner dispenser). In some embodiments, the liner dispenser is not visible from a perspective outside the receptacle assembly when the lid is closed.

According to some aspects, the package of liners can be positioned within the footprint of the lid and/or base. In some embodiments, a vertical line can be drawn through the lid and/or base and intersect the package in the liner dispenser.

Any feature, structure, or step disclosed herein can be replaced with or combined with any other feature, structure, or step disclosed herein, or omitted. For purposes of summarizing the disclosure, certain aspects, advantages, and features of the inventions have been described herein. Not necessarily any or all such advantages are achieved in accordance with any particular embodiment of the inventions disclosed herein. No individual aspects of this disclosure are essential or indispensable.

In some embodiments, the techniques described herein relate to a receptacle assembly. The receptacle assembly can include a body. The body can have a front wall, a rear wall, an interior space, a base, and a lid that is coupled to the body. In some embodiments, the base can form a footprint of the body. In some embodiments, the lid can be movable between a closed position and an open position. In some embodiment, the receptacle assembly can include a basin that can be receivable in and removable from the interior space of the body when the lid is in the open position. In some embodiments, the basin can include an upper lip that can be configured to retain a liner. In some embodiments, the receptacle assembly can include an interior liner dispenser in the interior space and within the footprint. In some embodiments, the interior liner dispenser can include a first opening and a second opening. In some embodiments, with the lid in the open position and the basin removed from the interior space, the interior liner dispenser can be configured to receive a package of liners through the first opening and to dispense one of the liners of the package into the interior space through the second opening.

In some embodiments, the techniques described herein relate to a receptacle assembly, wherein, with the basin received in the interior space, the interior liner dispenser can be positioned between a rear wall of the basin and the rear wall of the body.

In some embodiments, the techniques described herein relate to a receptacle assembly, wherein, with the lid in the closed position, the interior liner dispenser is not visible to a user.

In some embodiments, the techniques described herein relate to a receptacle assembly, wherein, with the basin received in the interior space and the lid in the open position, the interior liner dispenser is not visible to a user.

In some embodiments, the techniques described herein relate to a receptacle assembly, wherein the rear wall of the body does not include an aperture configured to receive the package of liners.

In some embodiments, the techniques described herein relate to a receptacle assembly, wherein liner dispenser can further include a second side that can include a linkage opening.

In some embodiments, the techniques described herein relate to a receptacle assembly, wherein the second opening can be larger than the first opening.

In some embodiments, the techniques described herein relate to a receptacle assembly, wherein the liner dispenser can be secured directly to the base.

In some embodiments, the techniques described herein relate to a receptacle assembly, wherein the first side and the second side of the liner dispenser can be generally planar.

In some embodiments, the techniques described herein relate to a receptacle assembly, wherein the rear wall can be a generally flat surface without an exterior protrusion.

In some embodiments, the techniques described herein relate to a receptacle assembly that can include a package of liners.

In some embodiments, the techniques described herein relate to a receptacle assembly. The receptacle assembly can include a body. The body can include a front wall, a rear wall, an interior space, and a lid. In some embodiments, the lid can be coupled to the body. In some embodiments, the lid can be movable between a closed position and an open position. In some embodiments, the receptacle assembly can include an interior liner dispenser in the interior space. In some embodiments, the interior liner dispenser can include a first opening and a second opening. In some embodiments, the first and second openings can be spaced apart from each other. In some embodiments, the interior liner dispenser can be configured to receive a package of liners from the interior space through the first opening and to dispense one of the liners of the package into the interior space through the second opening. In some embodiments, with the lid in the closed position, the interior liner dispenser is not visible to a user.

In some embodiments, the techniques described herein relate to a receptacle assembly, wherein the interior liner dispenser is positioned between the front wall and the rear wall.

In some embodiments, the techniques described herein relate to a receptacle assembly that can further include a basin that can be receivable in and removable from the interior space of the body when the lid is in the open position. In some embodiments, the basin can include an upper lip that can be configured to retain a liner.

In some embodiments, the techniques described herein relate to a receptacle assembly, wherein the first opening can be above the second opening.

In some embodiments, the techniques described herein relate to a receptacle assembly, wherein the interior liner dispenser can be attached to a base of the body and to an upper end of the body.

In some embodiments, the techniques described herein relate to a receptacle assembly, wherein the interior liner dispenser is not mounted to the front wall or rear wall of the body.

In some embodiments, the techniques described herein relate to a receptacle assembly that can include a body including a front wall, a rear wall, and an interior space. The receptacle assembly can include a lid. The lid can be coupled to the body. The lid can be movable between a closed position and an open position. The receptacle assembly can also include an interior liner dispenser in the interior space. The interior liner dispenser can be spaced apart from the front and rear walls of the body. The interior liner dispenser can include a first opening and a second opening. In some embodiments, the first and second openings can be spaced apart from each other. In some embodiments, the interior liner dispenser can be configured to receive a package of liners from the interior space through the first opening and to dispense one of the liners of the package into the interior space through the second opening.

In some embodiments, the techniques described herein relate to a receptacle assembly, wherein the body can further include a right sidewall and a left sidewall that each connect the front and rear walls. In some embodiments, the interior liner dispenser can be spaced apart from the right and left sidewalls.

In some embodiments, the techniques described herein relate to a receptacle assembly that can include an interior liner dispenser. In some embodiments, the interior liner dispenser can be attached to a base of the body and to an upper end of the body.

In some embodiments, the techniques described herein relate to a method of providing a receptacle assembly. The method can include providing a body of the receptacle assembly. The body can include a front wall, a rear wall, and side walls connecting the front wall and the rear wall. The body can further include an interior container space disposed within the body. The interior container space can be surrounded by the body. In some embodiments, the method can further include providing a liner dispenser positioned in the interior container space and near the rear wall. The liner dispenser can include a first opening and a second opening, such that the first opening and the second opening can provide access from the liner dispenser to the interior container space of the body. In some embodiments, the method can further include instructing a user to insert a package including a plurality of liners into the liner dispenser. In some embodiments, the method can further include instructing the user to pull a single liner of the plurality of liners from the second opening of the liner dispenser and into the interior container space.

In some embodiments, the techniques described herein can relate to a method that can further include a step of removing a basin from the interior container space prior to instructing the user to insert the package.

In some embodiments, the techniques described herein relate to a method that can further include inserting the basin into the interior container space after the user pulls the single liner from the second opening.

In some embodiments, the techniques described herein relate to a method that can further including instructing the user to align an opening in the package with the second opening of the liner dispenser.

In some embodiments, the techniques described herein relate to a method, further including disposing a trim member at least partially around an upper edge of the body.

In some embodiments, the techniques described herein relate to a method, wherein the package can include a plurality of detached liners.

In some embodiments, the techniques described herein relate to a receptacle assembly, wherein the liner dispenser cannot receive the package of liners when the lid is in a closed position. In some implementations, the liner dispenser can receive the package of liners only when the lid is in an open position and/or when the basin is removed from the receptacle assembly.

In some embodiments, the techniques described herein relate to a receptacle assembly, wherein the receptacle assembly cannot receive the package of liners when the basin is inserted in the receptacle assembly.

In some embodiments, the techniques described herein relate to a receptacle assembly, wherein the rear wall does not include a box-like structure.

In some embodiments, the techniques described herein relate to a receptacle assembly, wherein the liner dispenser is not mounted on the rear wall.

In some embodiments, the techniques described herein relate to a receptacle assembly, wherein the liner dispenser is not visible when the lid is in a closed position.

In some embodiments, the techniques described herein relate to a receptacle assembly, wherein a bottom portion of the interior container space adjacent to the rear wall includes a cavity space.

In some embodiments, the techniques described herein relate to a receptacle assembly, wherein the cavity space does not include a liner and/or other structure(s) that can be configured to receive the liners.

In some embodiments, the techniques described herein relate to a receptacle assembly, wherein the liners do not contact an interior surface of the body in use.

In some embodiments, the techniques described herein relate to a receptacle assembly, wherein the front wall and the rear wall are generally parallel in a vertical orientation.

In some embodiments, the techniques described herein relate to a receptacle assembly, wherein the package of liners can include a plurality of liners that are folded.

In some embodiments, the techniques described herein relate to a receptacle assembly, wherein the liners are not rolled when placed in the package of liners.

In some embodiments, the techniques described herein relate to a receptacle assembly, wherein the liner dispenser is not mounted on an interior surface of the front wall, the rear wall, or the lateral side walls.

In some embodiments, the techniques described herein relate to a receptacle assembly, wherein the liner dispenser is mounted on the base and secured to the base directly.

BRIEF DESCRIPTION OF THE DRAWINGS

Various embodiments are depicted in the accompanying drawings for illustrative purposes and should in no way be interpreted as limiting the scope of the embodiments. Furthermore, various features of different disclosed embodiments can be combined to form additional embodiments, which are part of this disclosure.

DETAILED DESCRIPTION OF CERTAIN EMBODIMENTS

Various liner dispensers are described below to illustrate various examples that may be employed to achieve one or more desired improvements. These examples are only illustrative and not intended in any way to restrict the general inventions presented and the various aspects and features of these inventions. Furthermore, the phraseology and terminology used herein is for the purpose of description and should not be regarded as limiting. No features, structure, or step disclosed herein is essential or indispensable. All sizes and proportions illustrated in the accompanying figures form part of this specification and are intended to be utilized as examples and to provide support for any claims that specifically refer to such illustrated sizes or proportions, but should not be considered as limiting the scope of this specification.

Exterior Liner Dispensers

FIGS. 1-7C illustrate example receptacle assemblies with an interior liner dispenser. More information about these receptacle assemblies can be found in U.S. Publication No. 2015/0251849, filed Mar. 4, 2015, which is hereby incorporated by reference in its entirety. Any features, structure, or step disclosed and/or illustrated in the '849 application can be utilized in combination with or instead of any features, structure, or step disclosed and/or illustrated in this specification.

Figure 1A:
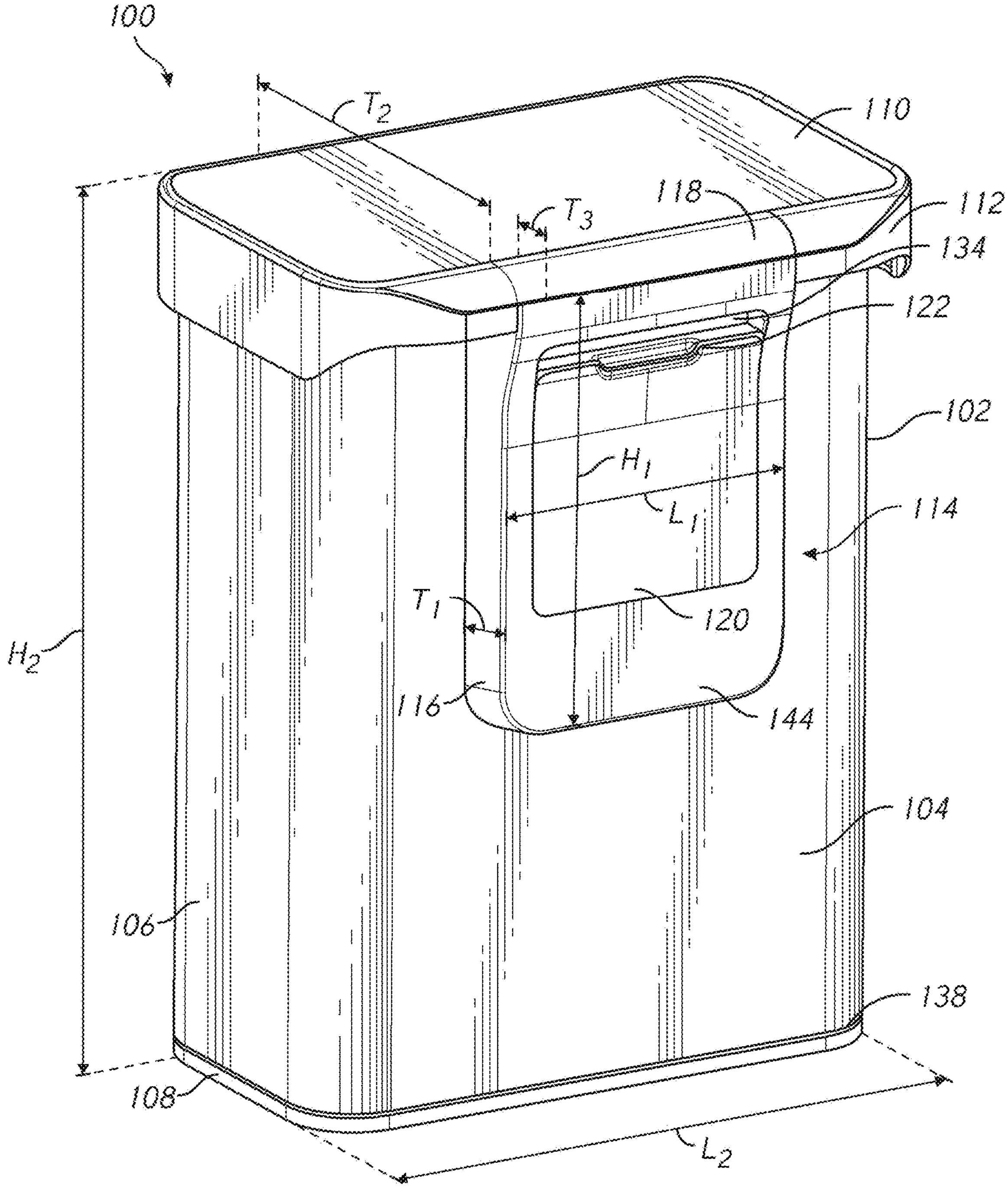
FIG. 1A illustrates a rear perspective view of an example of a receptacle assembly having an external liner dispenser.
Figure 1B:
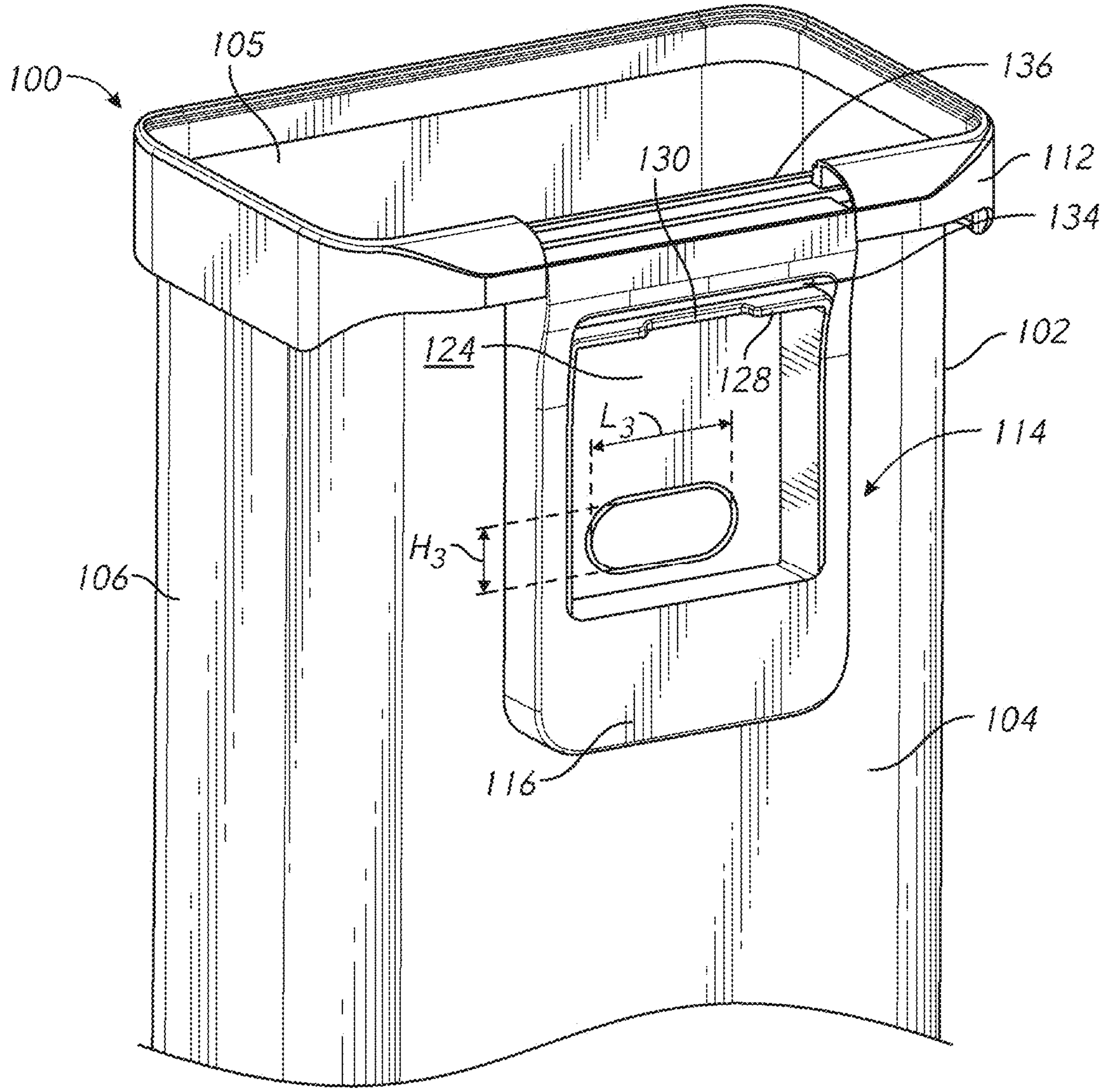
FIG. 1B illustrates an enlarged, rear perspective view of the receptacle assembly shown in FIG. 1A with a lid and a rear cover of the liner dispenser not shown for purposes of presentation.
Figure 1C:
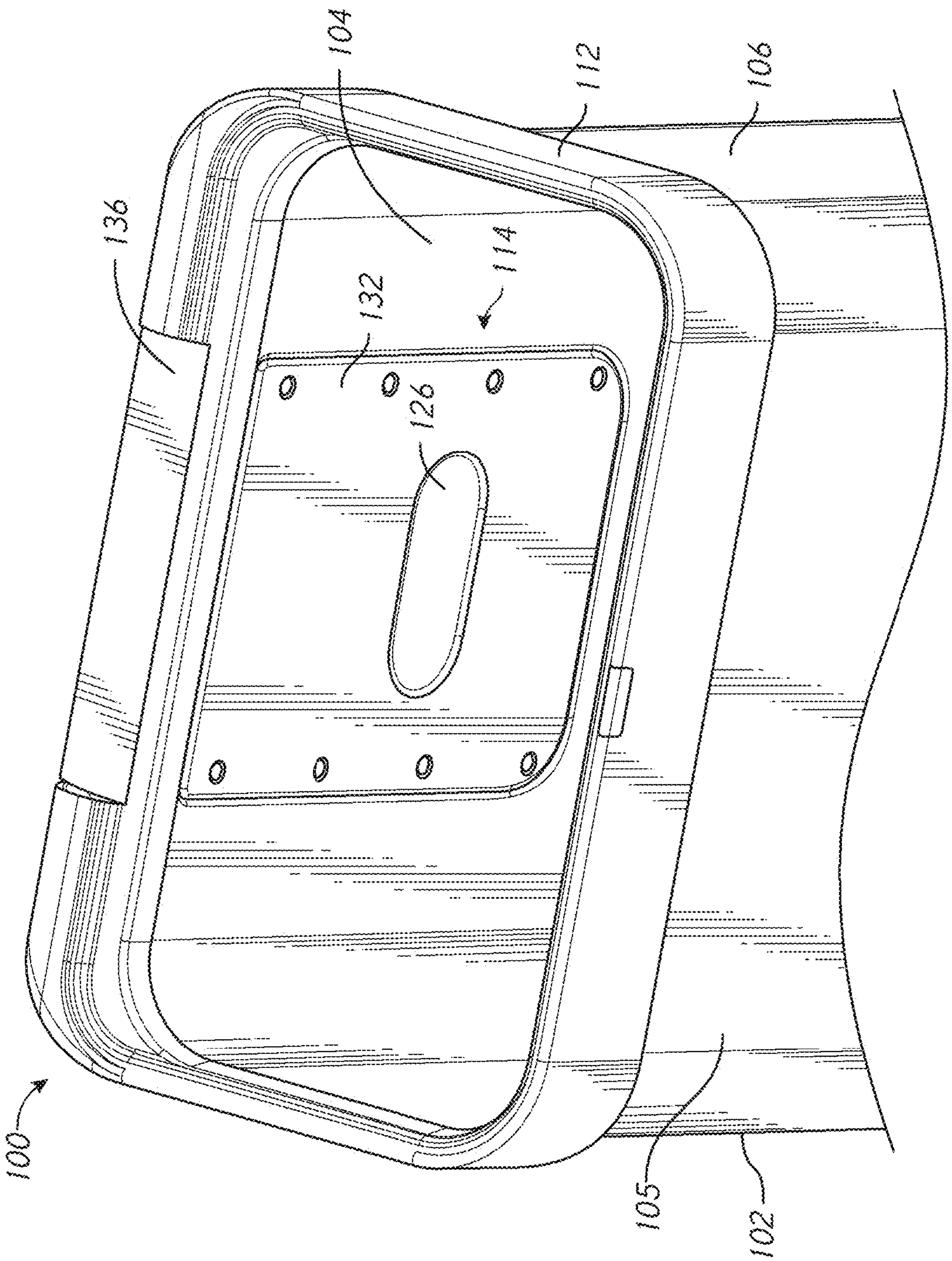
FIG. 1C illustrates an enlarged, front perspective view of the receptacle assembly shown in FIG. 1A with a lid not shown for purposes of presentation.

FIGS. 1A-1C illustrate a receptacle assembly 100 having a body 102, a base 108, and a lid 110 movable with respect to the body 102. The base 108 can support the receptacle assembly 100 in a stable, resting position when the receptacle assembly 100 rests on a surface such as a floor, and the body 102 can extend upward from the base 108. In some embodiments, the base 108 can be formed of a plastic material and/or can comprise a skirt or foundation that extends generally all of the way around the receptacle assembly 100, from the ground to the bottom of the body 102. Although not shown, the receptacle assembly 100 can include a mechanism to move the lid 110 from a closed to an open position, such as a pedal-operated mechanism or a sensor-activated mechanism. Additional information regarding sensor-activated mechanisms can be found in U.S. Publication No. 2011/0220647, filed Mar. 4, 2011, which is hereby incorporated by reference in its entirety. Any features, structure, or step disclosed and/or illustrated in the '674 application can be utilized in combination with or instead of any features, structure, or step disclosed and/or illustrated in this specification.

The body 102 can include a front wall 105, a rear wall 104, and lateral sidewalls 106 connecting the front wall 105 and the rear wall 104. If the lid 110 is pivotably connected (e.g., rotatably, hingedly, or otherwise) to the body 102, the rear wall 104 can be on the same side as the pivotable connection between the lid 110 and the body 102. The body 102 can comprise an upper edge 136 and a lower edge 138. The lid 110 can be disposed along or near the upper edge 136 of the body 102, and the base 108 can be disposed along or near the lower edge 138 of the body 102. Although FIGS. 1A-1C illustrate a generally rectangular body 102, the body 102 can be generally cylindrical or any other shape. Any of the receptacle assembly 100 components can be formed from one or more different materials, such as sheet metals (e.g., sheet stainless steel or aluminum), other metals, plastics, and/or other materials. For example, the body 102 can include a 23 to 26 gauge (i.e., a thickness between about 0.0179 inches and 0.0269 inches) stainless sheet shell.

In some embodiments, to help provide a generally open, generally unobstructed, generally even distribution of contents (e.g., waste) inside of the liner, an interior surface of the body 102 can have a generally smooth, generally continuous, and/or generally unobstructed surface that extends entirely or substantially entirely across the interior surface of the body 102 from the upper edge 136 of the body 102 to the lower edge 138 of the body 102 (see FIG. 1C). In some embodiments, the interior surface of the body 102 can be free of substantial bumps, protrusions, recesses, and/or other features that produce appreciable unevenness (e.g., greater than or equal to about 5 mm change in a dimension generally perpendicular to a plane parallel to the interior surface).

Various embodiments of the receptacle assembly 100 can include an upper trim member 112 coupled to the lid 110 (see FIGS. 1A-1C). The trim member 112 can comprise a plastic or metal edge, border region, or otherwise, generally positioned at or near a top portion of the receptacle assembly 100. The trim member 112 can be pivotably coupled (e.g., rotatably, hingedly, or otherwise) with the body 102. When the trim member 112 is in a closed position, the trim member 112 can engage the upper edge 136 of the body 102.

As discussed above, in some scenarios, liners may not be easily accessible, which may result in the receptacle assembly being without a liner for an extended period of time. During that time, waste may be thrown directly into the receptacle assembly, thus contaminating the receptacle assembly. Accordingly, it can be desirable to provide the receptacle assembly 100 with a liner dispenser 114, such that the liners are conveniently located and easily accessible. The liner dispenser 114 can be configured to receive and to dispense one or more liners (e.g., a package of liners), but the term "liner dispenser" does not require the presence of liners therein at all times. For example, the portion of a waste receptacle that can be configured to receive a package of liners can be considered a "liner dispenser" even before the product has ever received liners or ever been used to dispense liners.

FIGS. 1A-1C illustrate an embodiment of the liner dispenser 114. As shown, the dispenser 114 can be secured to the rear wall 104 of the body 102, such that multiple liners can be stored in the liner dispenser 114, disposed exterior to the rear wall 104 prior to use. In some variants, the dispenser 114 is positioned on the exterior of the front wall 105 or on one of the sidewalls 106. Such exterior configurations can maintain an interior volume of the receptacle assembly 100. Positioning the liner dispenser 114 on a front, side, or rear wall of the body 102 can avoid a reduction in a depth of the interior volume without increasing an overall height of the receptacle assembly 100. In some embodiments, positioning the liner dispenser 114 exterior to the rear wall 104 leaves the interior surface of the rear wall 104 generally smooth, generally planar (e.g., positioned generally vertically), generally continuous, and/or generally unobstructed (e.g., free of any substantial bumps, protrusions, recesses, and/or other discontinuous features). This can avoid a reduction of the interior volume of the body 102 and/or reduce the chance that a liner disposed within the receptacle assembly 100 will be torn by the liner dispenser 114. Additionally, positioning the liner dispenser 114 on a rear wall 104 of the receptacle assembly 100 keeps the liner dispenser 114 out of plain sight when the rear wall 104 is positioned against a wall (e.g., wall of a house, building, or other structure) and avoids creating an obstruction to people or pets walking past the receptacle assembly 100.

As illustrated, by providing the liner dispenser 114 in an exterior region of the trash can, and/or near the top of the trash can, such as between a middle vertical region and a top region of a wall of the trashcan (e.g., rather than inside the trash can and/or at or near the bottom of the trash can), the user can more easily access liners without having to severely stoop over and/or the user can replenish liners from the outside of the trash can, without being required to remove a liner inside the trash can or other receptacle that may be partially filled with trash in order to access and replenish the liner dispenser with additional liners.

In some embodiments, as shown in FIG. 1C, the rear wall 104 can include an opening through which an interior wall 132 of the liner dispenser 114 can be inserted. In some embodiments, a portion (e.g., the inner wall 132) of the liner dispenser 114 can be coupled to an exterior surface of the rear wall 104. In certain embodiments, at least a portion of the liner dispenser 114 can be integrally formed with the body 102, such that a wall portion of the body 102 forms a part of the liner dispenser 114 (e.g., see FIG. 6).

In some embodiments, the liner dispenser 114 can generally include a housing 116 with an interior volume 124 in which one or more liners (not shown) can be disposed. The liner dispenser 114 can include a dispenser lid 120 removably or movably (e.g., rotatably, hingedly, or otherwise) connected to the housing 116. The dispenser lid 120 can include a user-grip portion 122 (e.g., groove, handle, or otherwise), such that the dispenser lid 120 can be easily moved between an open position and a closed position. In some embodiments, as shown in FIG. 1A, the housing 116 can have an opening 134 (e.g., channel, groove, indentation, or likewise) near the user-grip portion 122 so that the user can easily grasp the user-grip portion 122. Further, as shown in FIG. 1B, the housing 116 can include a support member 128 that can engage the dispenser lid 120 when the dispenser lid 120 is in the closed position. For example, the dispenser lid 120 can form a snap connection with a groove 130 of the support member 128.

In some embodiments, the housing 116 can include a rear cover 144. In some embodiments, the rear cover 144 is separately formed from a portion of the housing 116. FIG. 1B illustrates the liner dispenser 114 with the rear cover 144 removed. As shown in FIG. 1A, the rear cover 144 can extend from a lower edge of the liner dispenser 114 to an upper edge of the liner dispenser 114. The rear cover 144 can include an upper portion 118 that extends over the upper edge 136 of the body 102. For example, as shown in FIG. 1A, the upper portion 118 can wrap around at least a portion of the upper edge 136 (see FIG. 1B) of the body 102 (or the trim member 112, lid 110, or any other component at or near the upper edge 136 of the body 102). The upper portion 118 can be disposed between the ends of the trim member 112 and can be generally aligned (e.g., substantially flush) with a rear portion of the trim member 112.

As shown in FIGS. 1B and 1C, an opening 126 can be formed in the interior wall 132 of the liner dispenser 114 and/or the rear wall 104 of the body 102 (e.g., when the liner dispenser 114 is integrally formed with the body 102). The opening 126 can provide access from an interior volume 124 of the liner dispenser 114, through the rear wall 104, to an interior space of the body 102. As shown in FIG. 1B, the opening 126 can be generally oblong. A length $L_3$ of the opening 126 can be greater than a height $H_3$ of the opening 126, such as at least two times greater or at least three times greater than the height $H_3$ of the opening 126. In some embodiments, the area of the opening 126 is substantially less than the upper main opening into the interior space of the body 102 around which the upper edge 136 extends (e.g., less than or equal to about one-tenth of the area of the main opening).

The opening 126 provides the user with easy access to the liners. For example, when the liner dispenser 114 is positioned on the rear wall 104 of the body 102 and the rear wall 104 is positioned against a wall (e.g., a wall of a house, building, or other structure), a user can, from within the receptacle, extract a liner from the dispenser 114 via the opening 126. This can avoid the need to move the receptacle assembly 100, such as if the opening was disposed along a rear surface of the liner dispenser 114.

The liner dispenser 114 and the opening 126 can be positioned closer to the upper edge 136 of the body 102 than the lower edge 138 of the body 102. For example, the opening 126 can be formed in the upper half or upper quarter of the rear wall 104. This can put the liners in a convenient location. For example, in this configuration, the user can easily access a first bag of the plurality of bags and each subsequent bag without having to bend over and/or extend their arm too far into the receptacle assembly 100. In some embodiments that include an interior rigid waste container (not shown), the opening 126 can be located vertically above the level of the top of the waste container so as not to block the opening 126 by the inner waste container. In some embodiments, an opening in the inner waste container can permit access to the dispenser 114 through both the opening in the outer surface of the receptacle assembly 100 and the opening in the waste container.

In certain implementations, it can be desirable to minimize the overall size occupied by the receptacle assembly 100 during operation. For example, it can be desirable for the receptacle assembly 100 to be able to operate generally flush against a wall (e.g., the wall in a house). In some embodiments, as shown in FIGS. 1A and 1B, a rear surface of the liner dispenser 114 (e.g., the rear cover 144 and/or housing 116) does not extend in a rearward direction beyond a rear edge of the trim member 112 (or a rear edge of the lid 110 or other rear edge of an upper portion of the receptacle assembly 100). To provide a generally low-profile receptacle assembly 100, the length $L_1$ and/or the height $H_1$ of the liner dispenser 114 can be substantially greater than the thickness $T_1$ of the liner dispenser 114. For example, the thickness $T_1$ can be less than or equal to about 50% of the length $L_1$ of the liner dispenser 114, preferably less than or equal to about 25% of the length $L_1$ of the liner dispenser 114, such as less than or equal to about 15% of the length $L_1$ of the liner dispenser 114. As another example, the thickness $T_1$ can be less than or equal to about 50% of the height $H_1$ of the liner dispenser 114, preferably less than or equal to about 25% of the height $H_1$ of the liner dispenser 114, such as less than or equal to about 15% of the height $H_1$ of the liner dispenser 114, or less than or equal to about 10% of the height $H_1$ of the liner dispenser 114.

In some embodiments, a thickness $T_1$ of the liner dispenser 114 can be less than or equal to a thickness $T_3$ of the trim member 112 (see FIG. 1A). In some embodiments, the thickness $T_1$ of the liner dispenser 114 can be less than or equal to about one-half the thickness $T_2$ of the body 102, such as less than or equal to about one-third the thickness $T_2$ of the body 102, preferably less than or equal to about one-fifth the thickness $T_2$ of the body 102. In some embodiments, the length $L_1$ of the liner dispenser 114 can be less than or equal to about 75% of the length $L_2$ of the body 102, preferably less than or equal to about 50% the length $L_2$ of the body 102. In some embodiments, the height $H_1$ of the liner dispenser 114 can be less than or equal to about 75% of the height $H_2$ of the body 102, such as less than or equal to about 50% the height $H_2$ of the body 102, preferably less than or equal to about 40% the height $H_2$ of the body 102.

Figure 2:
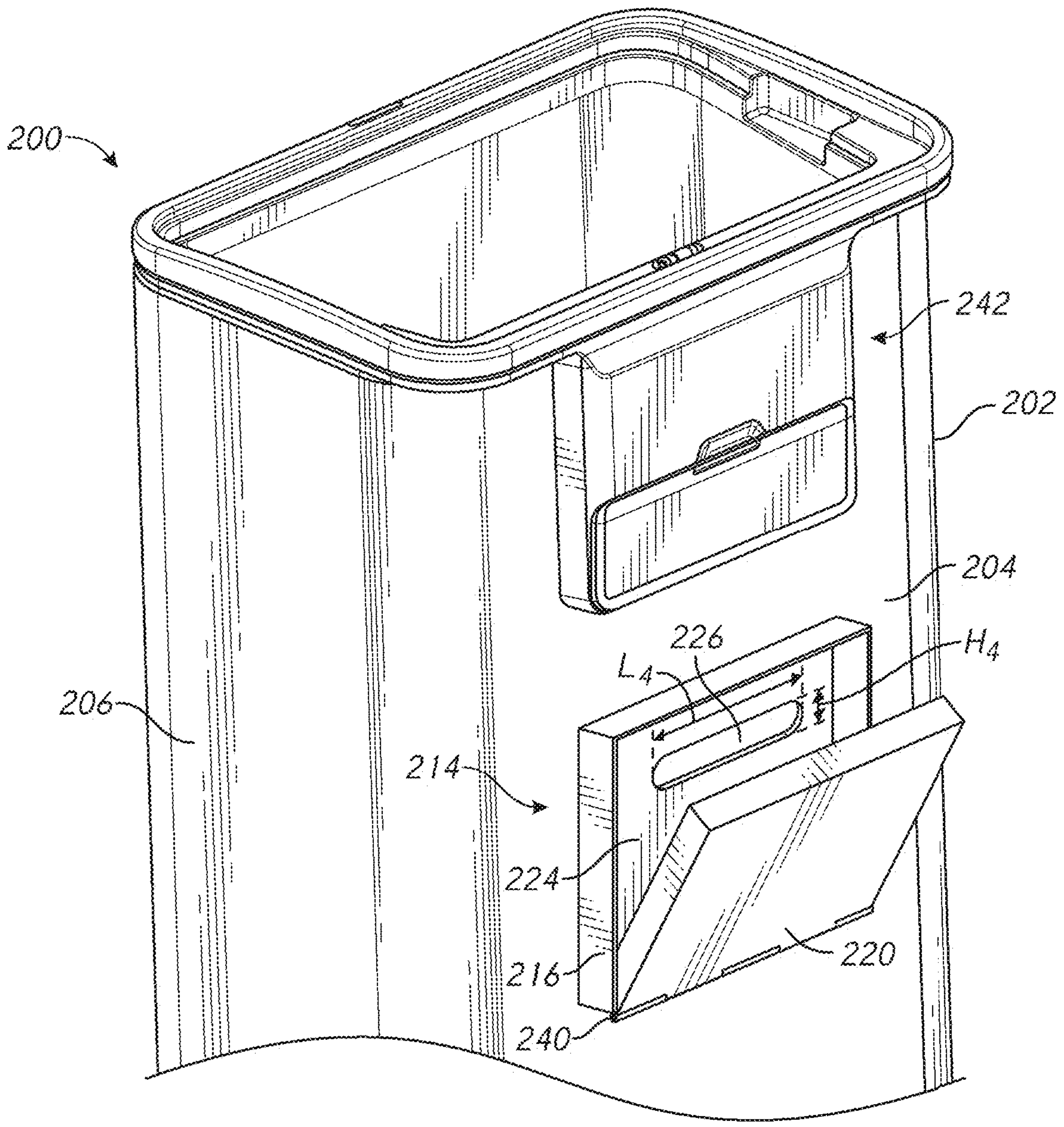
FIG. 2 illustrates a rear perspective view of another example of a receptacle assembly having a liner dispenser.

With reference to FIG. 2, another example of an embodiment of a receptacle assembly 200 having a liner dispenser 214 is shown. The liner dispenser 214 resembles or is identical to the liner dispenser 114 discussed above in many respects and can include any of the same desirable features or components as the liner dispenser 114. Accordingly, numerals used to identify features of the liner dispenser 114 are incremented by a factor of one hundred (100) to identify like features of the liner dispenser 214. This numbering convention generally applies to the remainder of the figures. Any structure, component, or step disclosed in any embodiment in this specification can be used in any other embodiments within the scope of this disclosure.

FIG. 2 illustrates a receptacle assembly 200 having a backside enclosure 242 that can house a power source for the receptacle assembly 200. The liner dispenser 214 can be positioned below the backside enclosure 242 on (e.g., secured to) the rear wall 204 of the receptacle assembly 200. The liner dispenser 214 can include dimensions that are the same as or similar to the liner dispenser 114. The proportions between the liner dispenser 214 and the body 202 can be the same as or similar to the liner dispenser 114 and the body 102.

The liner dispenser 214 can include a housing 216 with an interior volume 224 in which one or more liners (not shown) can be disposed. Additionally, the liner dispenser 214 can include a dispenser lid 220 movably (e.g., rotatably, hingedly, or otherwise) connected to the housing 216. For example, as shown in FIG. 2, the dispenser lid 220 can rotate about a pivot member 240. In some embodiments, the dispenser lid 220 can be biased to a closed position, such as by a spring. When the dispenser lid 220 is in the closed position, the dispenser lid 220 can engage or interface with the housing 216.

As shown in FIG. 2, an opening 226 can be located in the rear wall 204 of the body 202. The opening 226 can provide access from an interior volume 224 of the liner dispenser 214 to an interior space of the body 202. In some embodiments, the opening 226 can be generally oblong. A length $L_4$ of the opening 226 can be greater than a height $H_4$ of the opening 226, such as at least two times greater or at least three times greater than the height $H_4$ of the opening 226. In certain variants, the length $L_4$ of the opening 226 is less than or equal to the height $H_4$ of the opening.

Figure 3A:
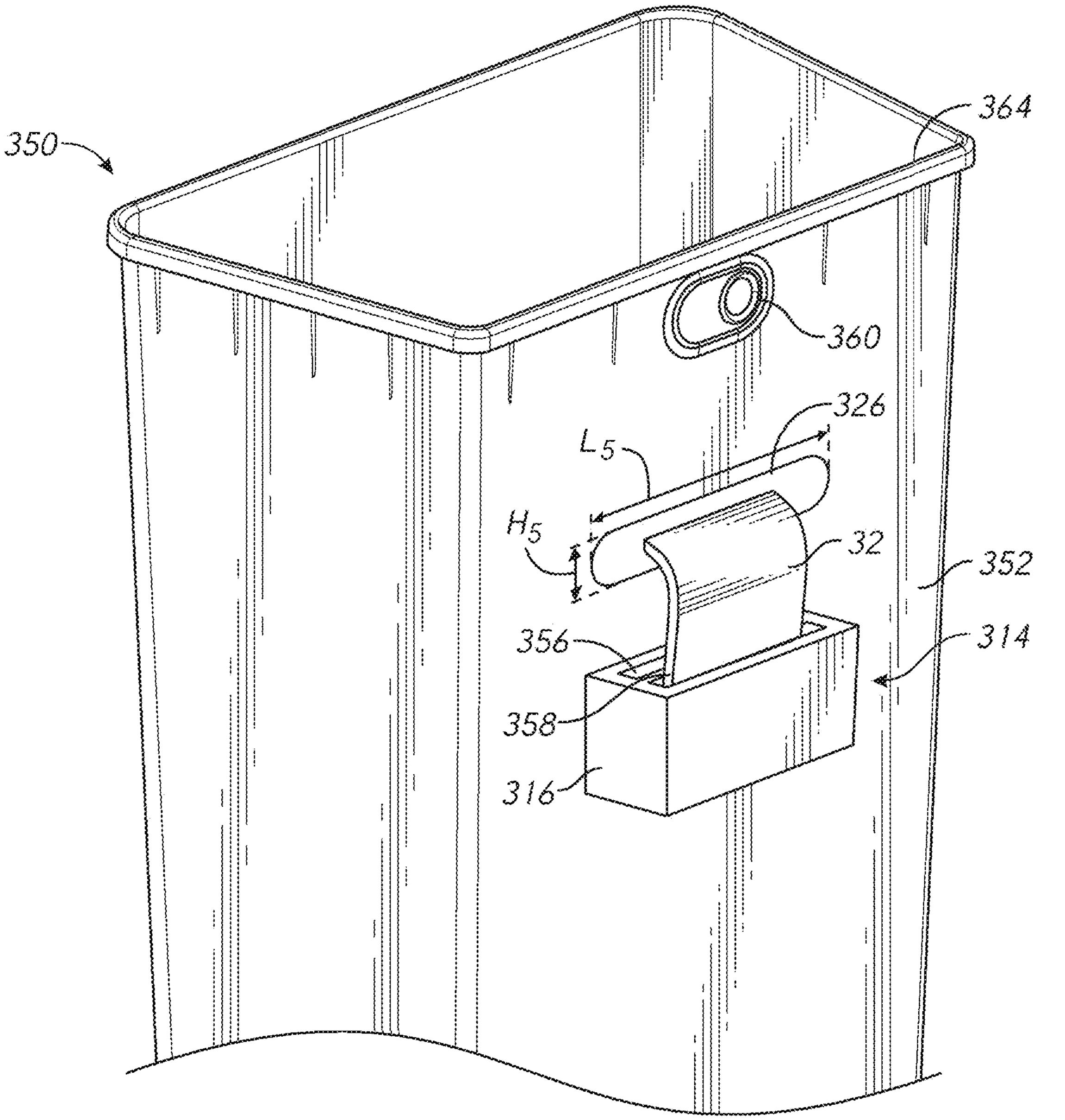
FIG. 3A illustrates a rear perspective view of an interior container having a liner dispenser.
Figure 3B:
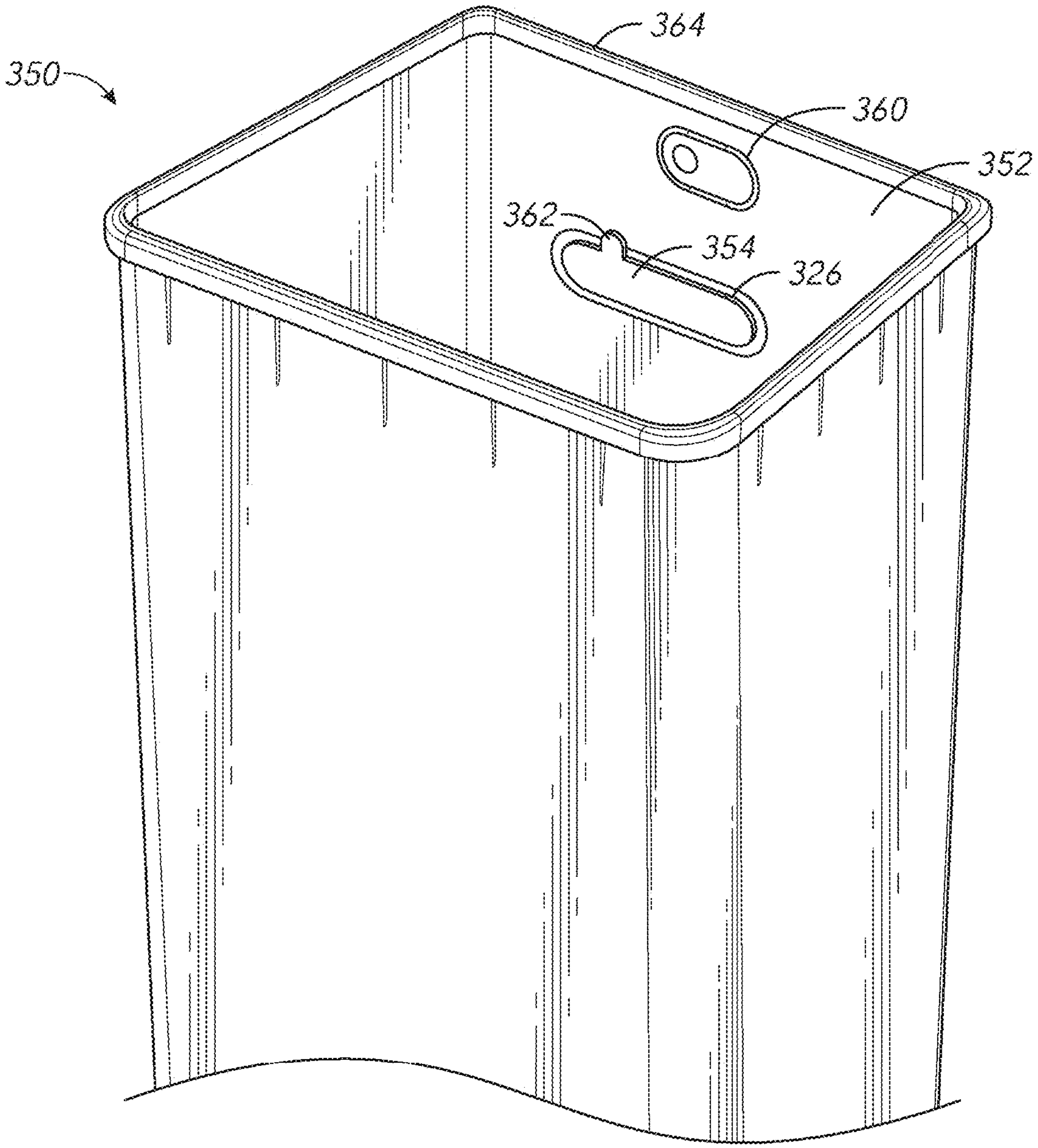
FIG. 3B illustrates a front perspective view of the interior container shown in FIG. 3A.

As mentioned above, some receptacles can include an interior metal or plastic liner that fits within the receptacle, which can be removed and washed. FIGS. 3A and 3B illustrate an illustrative interior container 350. As shown, the interior container 350 can have a bag-securing member 360. For example, a user can secure a liner in the bag-securing member 360 by pushing an upper portion of a liner into a portion of the bag-securing member 360 that can be configured to removably secure the bag, requiring greater force to remove the received portion of the bag from the bag-securing member 360 than would normally be exerted on the bag by the accumulation of waste therein.

In some embodiments, a liner dispenser 314 can be positioned between the interior container 350 and the body of a receptacle assembly (not shown) when the interior container 350 is positioned in the interior space of the body. For example, the liner dispenser 314 can be positioned on (e.g., secured to) the rear wall 352 of the interior container 350 (see FIG. 3A). In some embodiments, the dispenser 314 is positioned on an interior rear wall of the receptacle assembly and the interior container 350 has a recess configured to receive the dispenser 314 (not shown). The liner dispenser 314 can include dimensions similar to the liner dispenser 114. The proportions between the liner dispenser 314 and the interior container 350 can be the same as or similar to the liner dispenser 114 and the body 102.

The liner dispenser 314 can include a housing 316 having an opening 356 for receiving a plurality of liners (not shown). The liner dispenser 314 can also include a biasing member 372 (e.g., a leaf spring, torsion spring, tension spring, compression spring, or otherwise). The biasing member 372 can be positioned in an opening 358 of the housing 316 or otherwise secured to the housing 316 (e.g., fixed to an outer surface of the housing 316). At least a portion of the plurality of liners can be positioned between the rear wall 352 of the interior container 350 and the biasing member 372. The biasing member 372 can be biased toward the rear wall 352 to maintain the position of the liners relative to the rear wall 352. In some embodiments, the biasing member 372 can be configured to bias packaging (e.g., a box) in which the liners are disposed.

As shown in FIG. 3A, an opening 326 can be positioned in the rear wall 352 of the interior container 350. The opening 326 can provide access from the liner dispenser 314 to an interior space of the interior container 350. In certain implementations, the opening 326 can be positioned closer to an upper edge 364 of the interior container 350 than a lower edge of the interior container 350. In some embodiments, the opening 326 can be generally oblong. A length $L_5$ of the opening 326 can be greater than a height $H_5$ of the opening 326, such as at least two times greater or at least three times greater than the height $H_5$ of the opening 326. FIG. 3B illustrates an interior view of the opening 326 with a tabbed portion 362 of the liner 354 extending through the opening 326. The tabbed portion 362 can be integrally formed with and include the same material as the remaining portion of the liner 354. The tabbed portion 362 of a liner 354 can be configured to extend outside of a package of one or more liners while the rest of the liner remains generally inside of the package. In certain variants, the tabbed portion 362 can be separately formed and attached to the remaining portion of the liner 354. The tabbed portion 362 can be configured to facilitate accessing a liner 354 from the liner dispenser 314. As with all features, structures, components, or steps disclosed in this specification, the tabbed portion 362 can be used with any embodiment in this specification.

Figure 4:
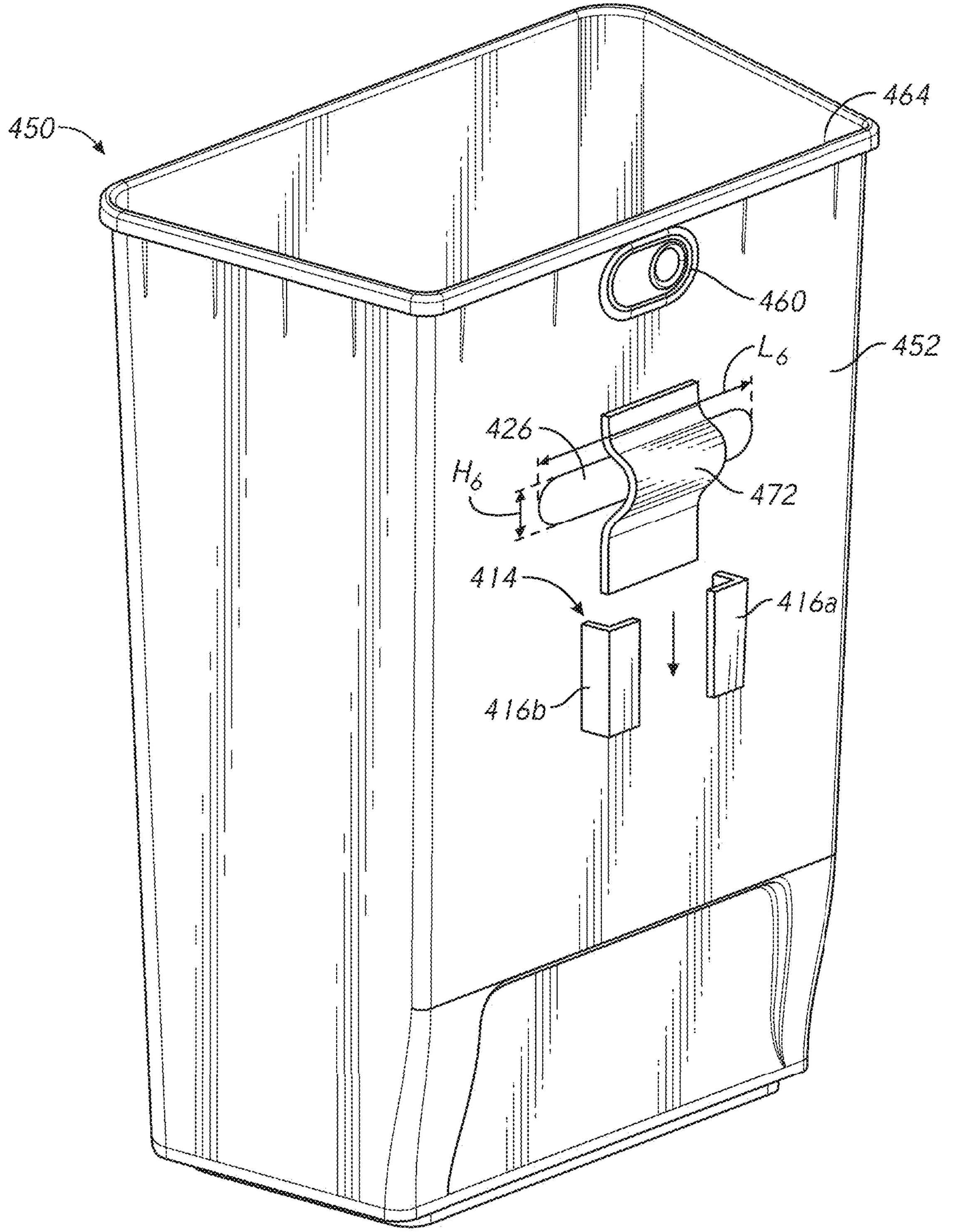
FIG. 4 illustrates a rear perspective view of another interior container having a liner dispenser with a biasing element.

FIG. 4 illustrates another example of an interior container 450 having a bag-securing member 460. The liner dispenser 414 can be positioned below the bag securing member 460 and secured to the rear wall 452 of the interior container 450, such that the liner dispenser 414 is positioned between the interior container 450 and the body of a receptacle assembly when the interior container 450 is positioned in the interior space of the body. The liner dispenser 414 can include dimensions that are the same as or similar to the liner dispenser 114. The proportions between the liner dispenser 414 and the interior container 450 can be the same as or similar to the liner dispenser 114 and the body 102.

Unlike the liner dispenser 314, the liner dispenser 414 can include spaced apart housing portions 416*a*, 416*b* in which a biasing member 472 (e.g., a leaf spring, torsion spring, tension spring, compression spring, or otherwise) can be positioned. For example, as shown, the biasing member 412 can be slidably received in the housing portions 416*a*, 416*b*. A plurality of liners can be positioned between the rear wall 452 and the biasing member 472 and/or within the housing portions 416*a*, 416*b*. The biasing member 472 can be biased toward the rear wall 452 to maintain the position of the liners relative to the rear wall 452. In some embodiments, the biasing member 472 can be configured to bias packaging (e.g., a box) in which the liners are disposed.

As shown in FIG. 4, an opening 426 can be formed in the rear wall 452 of the interior container 450. The opening 426 can provide access from the liner dispenser 414 to an interior space of the interior container 450. The opening 426 can be positioned closer to an upper edge 464 of the interior container 450 than a lower edge 466 of the interior container. In some embodiments, the opening 426 can be generally oblong. A length $L_6$ of the opening 426 can be greater than a height $H_6$ of the opening 426, such as at least two times greater or at least three times greater than the height $H_6$ of the opening 426.

Figure 5:
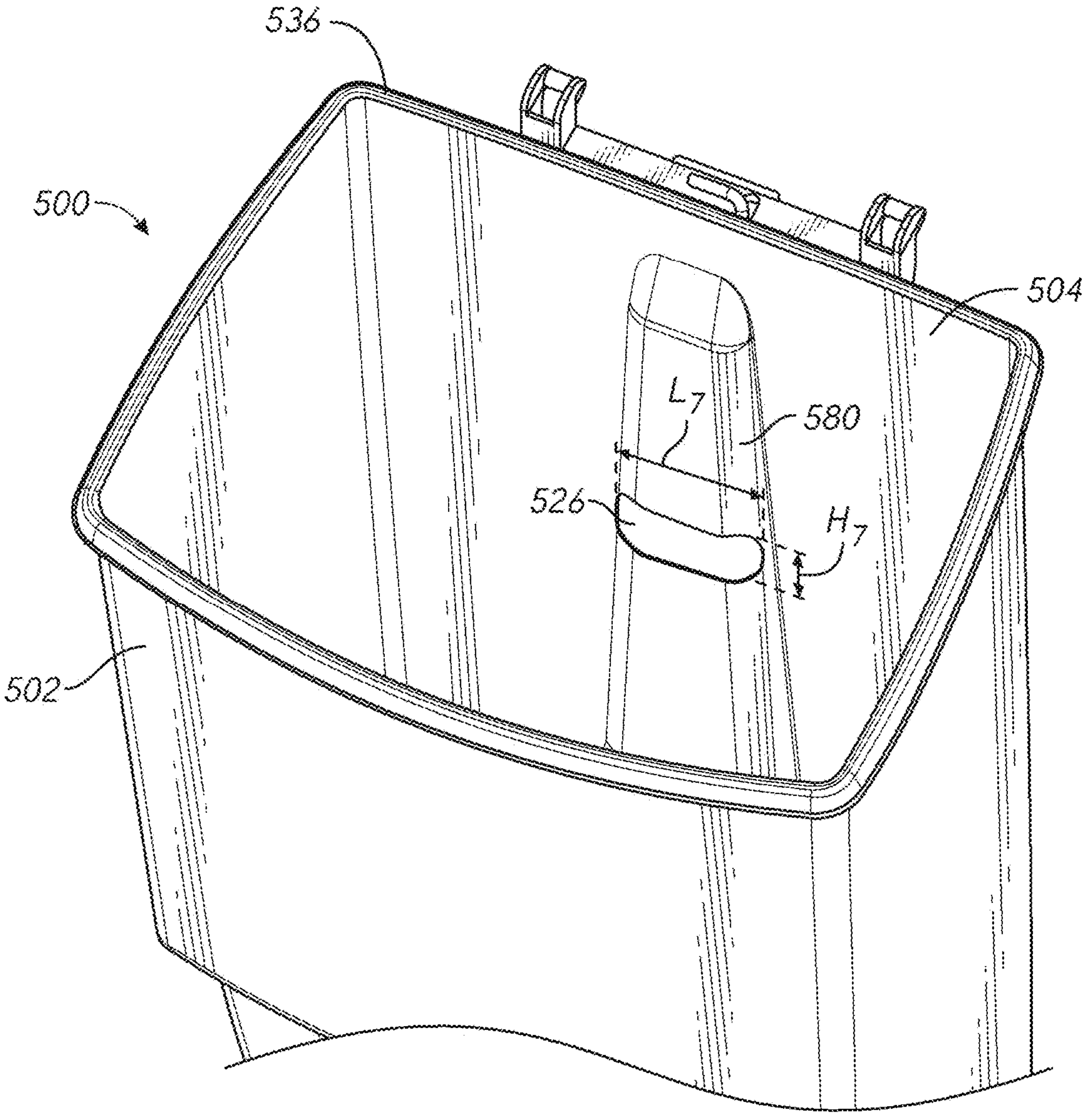
FIG. 5 illustrates a front perspective view of another example of a receptacle assembly with a lid not shown for presentation purposes.

FIG. 5 illustrates an interior view of a receptacle assembly 500 that can be used with any of the dispenser assemblies described herein. The rear wall 504 of the receptacle assembly 500 can include an inward protrusion 580 extending into the interior space of the receptacle assembly 500. The inward protrusion 580 can form a recessed channel on an exterior surface of the receptacle assembly 500. In some embodiments, the dispenser assembly is attached to an outer surface of the inward protrusion 580, or the inward protrusion 580 generally encloses or constitutes the dispenser assembly (e.g., the dispenser assembly can be positioned in the recessed channel). An opening 526 can be positioned along the inward protrusion 580. The opening 526 can be closer to the upper edge 536 of the body 502 than a lower edge of the body 502. The opening 526 can provide access from the liner dispenser to an interior space of the receptacle assembly 500. In some embodiments, the opening 526 can be generally oblong. A length $L_7$ of the opening 526 can be greater than a height $H_7$ of the opening 526, such as at least two times greater or at least three times greater than the height $H_7$ of the opening 526.

Figure 6:
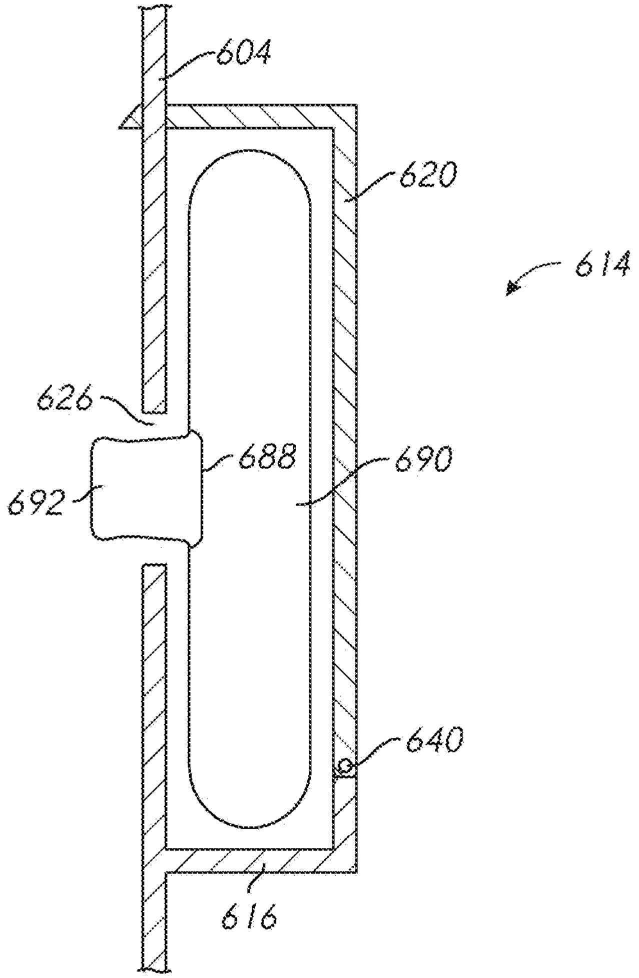
FIG. 6 illustrates a cross-section of an example of a liner dispenser with a package of liners disposed within the liner dispenser.

FIG. 6 illustrates an embodiment of a liner dispenser 614 that can be used in connection with any of the receptacle assemblies and/or interior containers discussed herein. Similar to the liner dispenser 214, the liner dispenser 614 can include a housing 616 with an interior volume in which a package 690 of liners 692 can be disposed. The liner dispenser 614 can include a dispenser lid 620 movably (e.g., rotatably, hingedly, or otherwise) connected to the housing 616. For example, as shown in FIG. 6, the dispenser lid 620 can rotate about a pivot member 640. In some embodiments, the dispenser lid 620 can be biased to a closed position. When the dispenser lid 620 is in the closed position, the dispenser lid 620 can engage or interface with the rear wall 604 of the body.

A plurality of liners 692 can be folded, stacked, and/or rolled into the packaging 690. The plurality of liners 692 can be detached from each other, or the plurality of liners 692 can be connected in series and torn apart (e.g., along a perforation line between each of liners). As shown in FIG. 6, the packaging 690 can include an opening 688 through which a single liner 692 can be pulled. The opening 688 of the packaging 690 can be generally shaped, sized, and positioned such that the opening 688 generally aligns with the receptacle assembly opening 626. Similar to the liner 354, each of the liners 692 can include a tabbed portion to facilitate removal of each liner 692 from the packaging 690. In some embodiments, the last bag of the plurality of bags can include an indicator to signal that the package 690 of liners 692 should be replaced. For example, the last bag can be colored, include a message, or otherwise indicate that the liners 692 should be replaced. In some embodiments, an opening in a package of liners can be positioned to generally face and/or generally align with a corresponding opening in the body of a receptacle assembly and/or in the interior container.

In some methods of providing liners, a supplier may provide a package of multiple liners to a user of a waste receptacle, along with instructions to the user to insert the package of multiple liners into a liner dispenser on a wall (interior or exterior) of the waste receptacle such that an opening in the package can be oriented to generally align with the liner-access opening in the wall of the waste receptacle and/or to generally align with a liner-access opening in a wall of an interior container of the waste receptacle, to facilitate access to the bags liners within the package from inside of the waste receptacle.

Figure 7A:
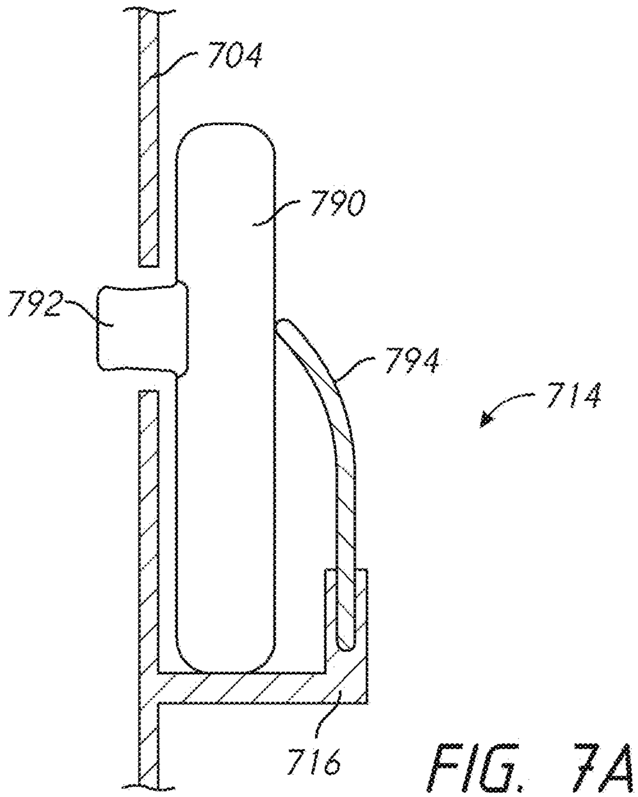
FIG. 7A illustrates a cross-section of another liner dispenser having a biasing member and a package of liners disposed within the liner dispenser.
Figure 7B:
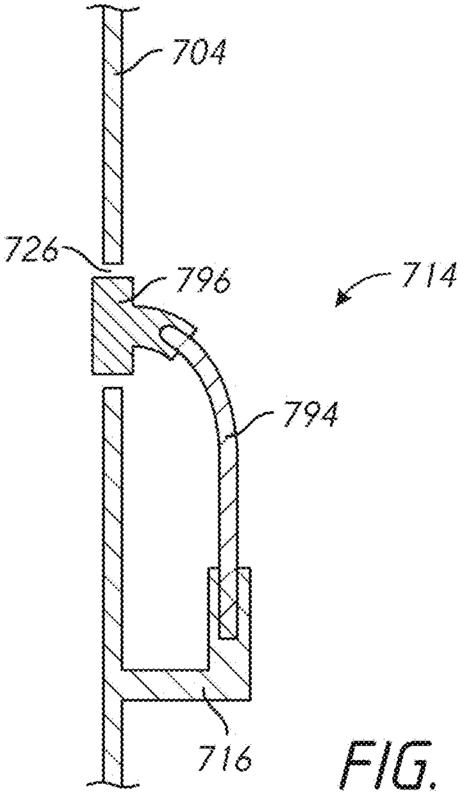
FIG. 7B illustrates a cross-section of another example of a liner dispenser having a biasing member.
Figure 7C:
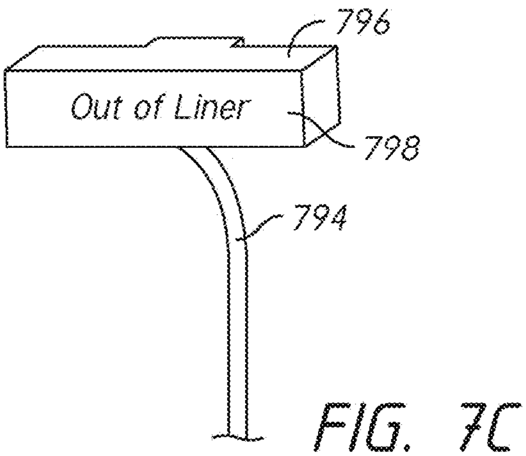
FIG. 7C illustrates a front perspective view of the biasing member shown in FIG. 7B.

FIGS. 7A-7C illustrate another example of an embodiment of a liner dispenser 714 that can be used in connection with any of the receptacle assemblies and/or interior containers discussed herein. The liner dispenser 714 can include a housing portion 716 with an interior volume in which a package 790 of liners 792 can be disposed. The liner dispenser 714 can include a biasing member 794 (e.g., a leaf spring, torsion spring, tension spring, compression spring, or otherwise) secured to the housing portion 716. A package 790 of liners 792 can be positioned between the rear wall 704 of the receptacle assembly and the biasing member 794 and/or within the housing portion 716. The biasing member 794 can be biased toward the rear wall 704 to maintain the position of the liners 792 relative to the rear wall 704. For example, the biasing member 794 can encourage the liners to move generally toward the rear wall 704.

In some embodiments, as shown in FIGS. 7B and 7C, the biasing member 794 can include an end portion 796. The end portion 762 can be generally sized to fit within the opening 726 of the rear wall 704. A front face 798 of the end portion 796 can include a message, such as "out of liner," or other indicator to indicate when the package 790 of liners 792 should be replaced. The package 790 of liners 792 can include any of the features of the package 690 of liners 692.

Interior Liner Dispensers

FIGS. 8-19 illustrate an example of a receptacle assembly 1000 with an interior liner dispenser 1100. The receptacle assembly 1000 can include any of the components, features, and other details of the receptacle assemblies described above or illustrated in the associated FIGS. 1-7C. For example, the liner dispenser 1100 can include any components, features, or other details of any of the liner dispensers 114, 214, 314, 414, 614, 714.

Figure 8:
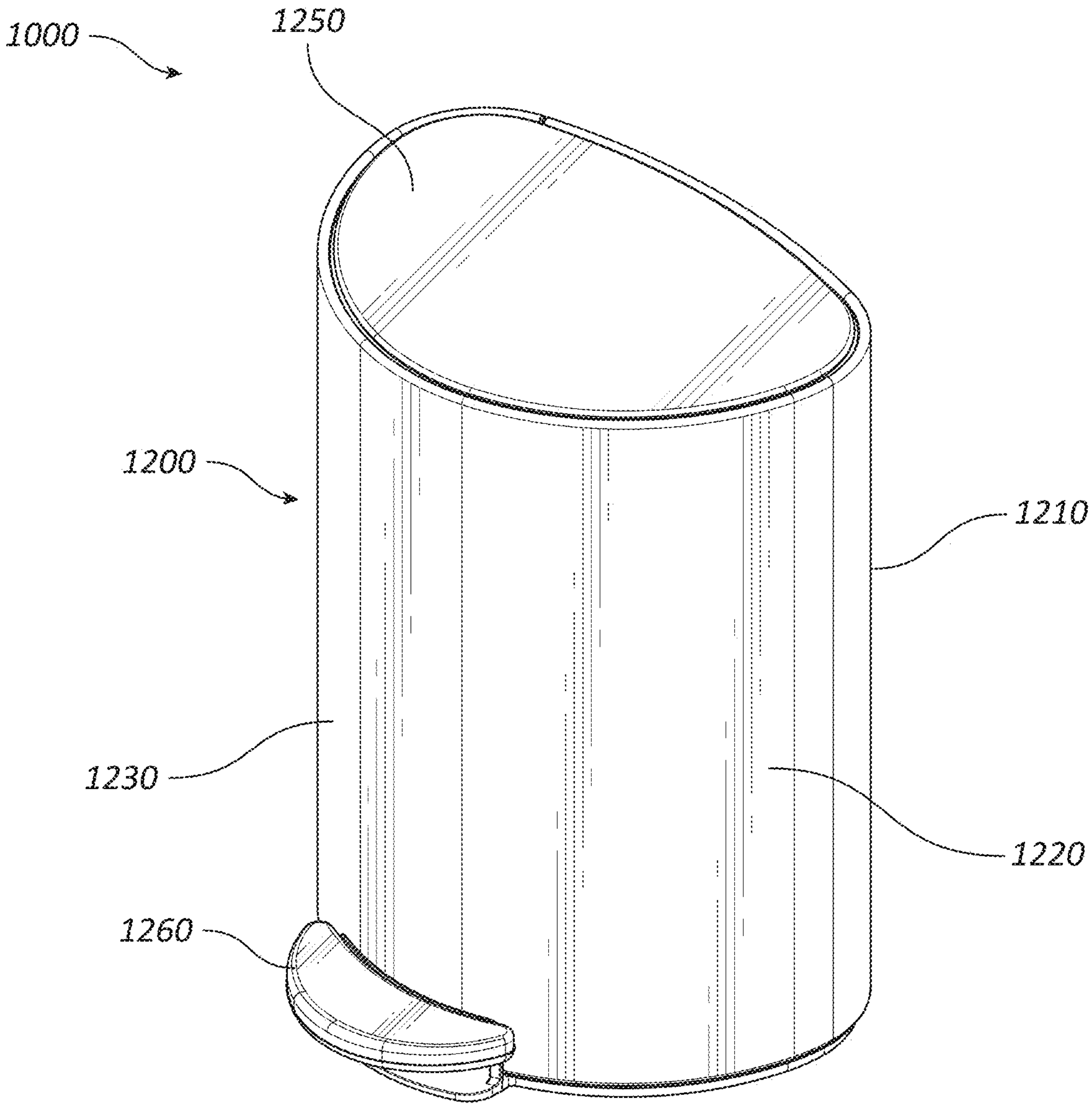
FIG. 8 illustrates a perspective view of an example of a receptacle assembly having an internal liner dispenser.

As illustrated in FIG. 8, the receptacle assembly 1000 can have a body 1200, a lid 1250, and an actuation device such as a pedal 1260. The receptacle assembly 1000 can have an upper opening that is selectively covered or revealed by the lid 1250 being closed and opened, respectively.

Figure 9:
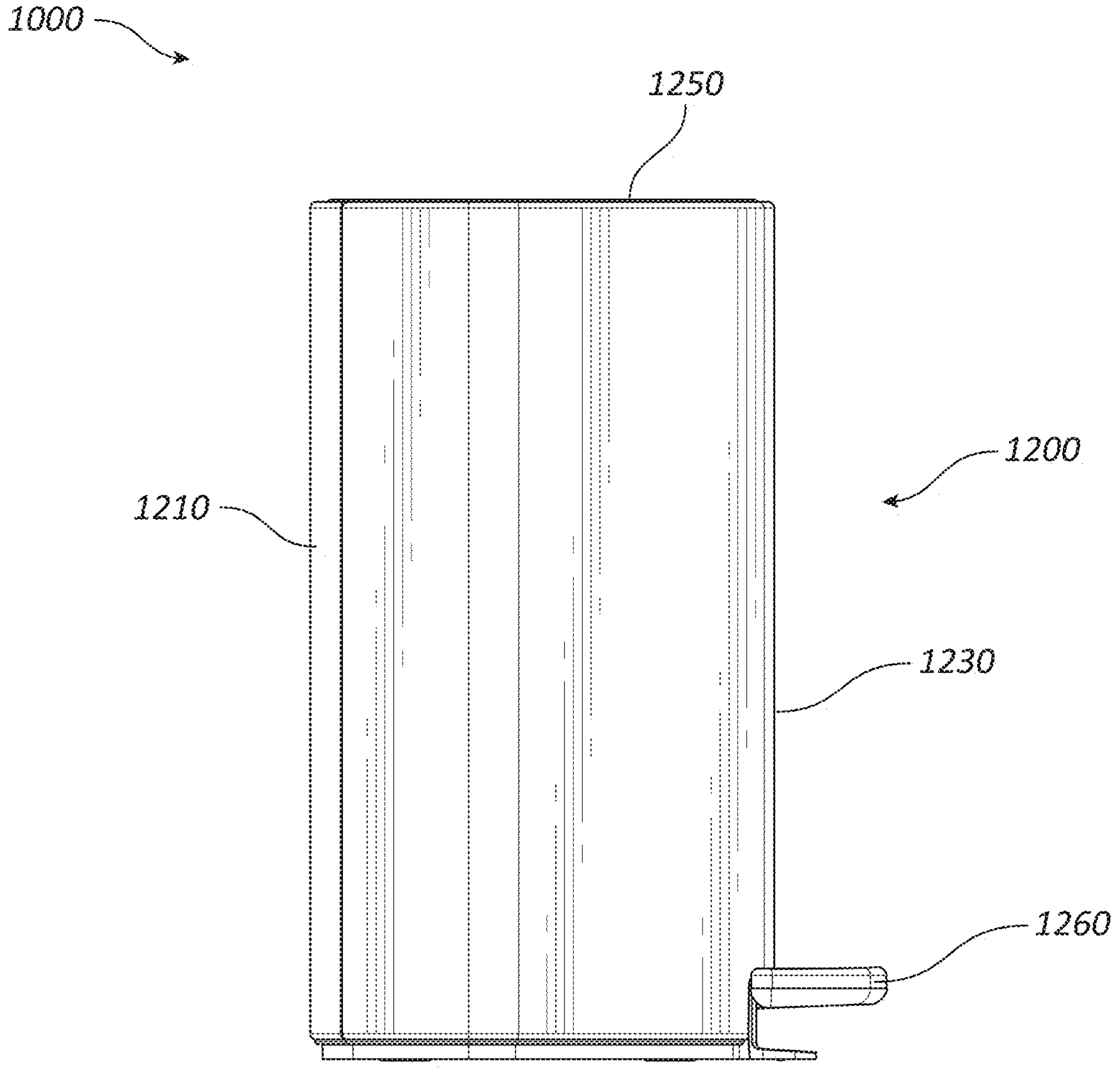
FIG. 9 illustrates a side view of the receptacle assembly of FIG. 8.
Figure 10:
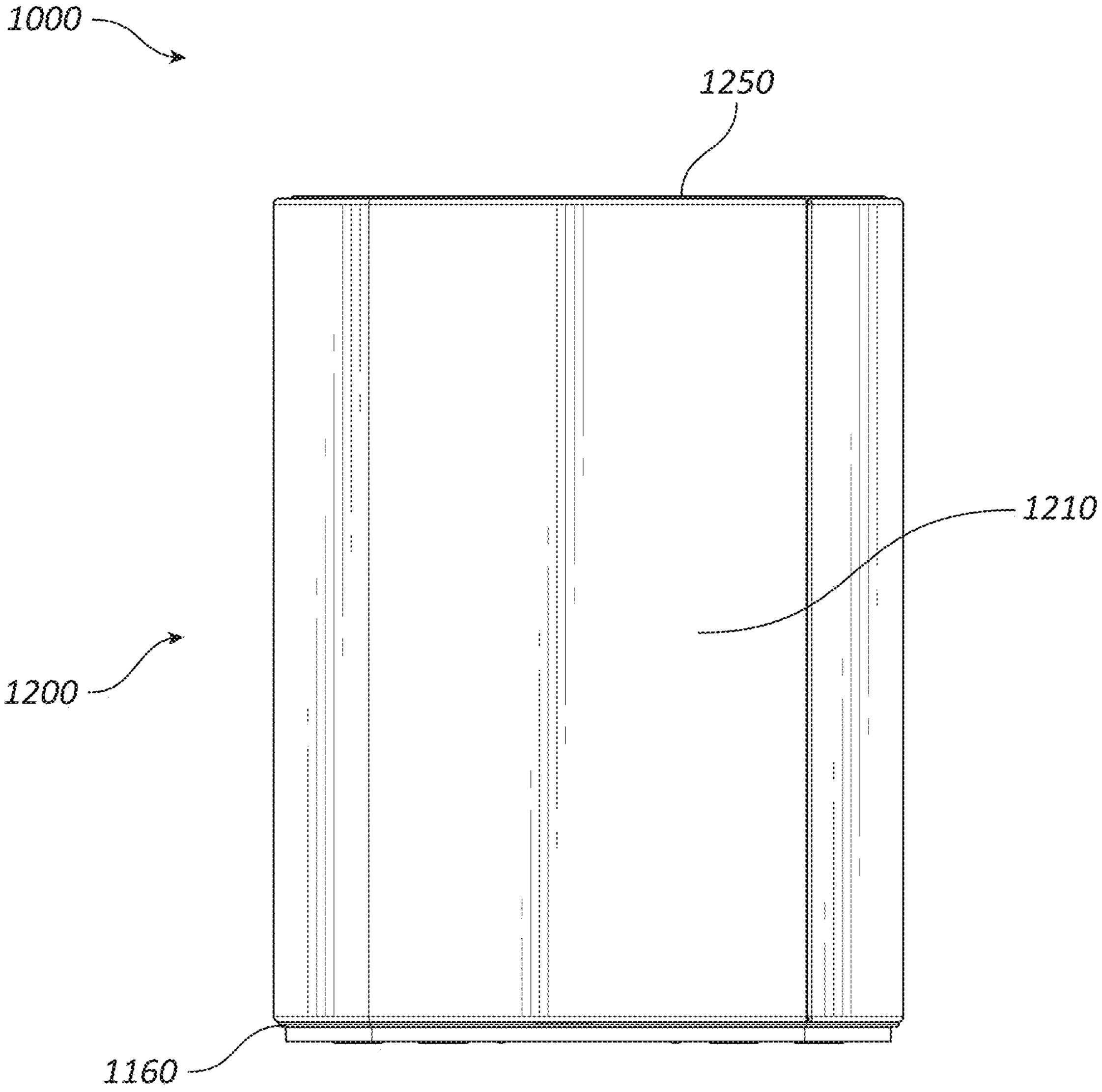
FIG. 10 illustrates a rear view the receptacle assembly of FIG. 8.

The body 1200 can include an outer shell. In some embodiments, the outer shell of the body 1200 can include a rear wall 1210, a front wall 1230, and lateral side walls 1220 (e.g., right and left) that connect the rear wall 1210 to the front wall 1230. The body 1200 can form a generally round container, oval container, rectangular (e.g., square) container, or other shapes. The rear wall 1210 can be generally flat. For example, as shown in FIGS. 9 and 10, the rear wall can be generally planar, continuous, and/or without a protrusion, offset, or displacement that can inhibit the user from positioning the receptacle assembly 1000 flushly against a vertical wall. In some embodiments, the rear wall 1210 can include a generally flat surface and/or can have a curved or generally curved surface without any protrusion that extends beyond the footprint of the body 1200. The lateral side walls 1220 can include a planar or curved surface and can connect the front wall 1230 with the rear wall 1210. In some embodiments, the rear wall 1210 does not have a box-like structure to house a package of liners, and the package of liners are housed in the liner dispenser that is positioned in the interior space of the body 1200.

The body 1200 can provide an exterior enclosure for the receptacle assembly 1000 and can be manufactured from a variety of different materials. Any of the receptacle assembly 1000 components can be formed from one or more materials such as sheet metals (e.g., sheet stainless steel or aluminum), other metals, plastics, and/or other materials or a combination of two or more materials. For example, the body 1200 can include a 23 to 26 gauge (i.e., a thickness from about 0.0179 inches to about 0.0269 inches) stainless sheet. In some embodiments, the stainless-steel material can have one or more coatings (such as silver-ion coating) that can resist fingerprints on the surface of the stainless-steel material. The rear wall 1210 can be generally flat and/or without any significant protrusion or area that is displaced from the body 1200 and would inhibit the receptacle assembly 1000 from being flushly positioned against a vertical surface. In some embodiments, the rear wall 1210 and the front wall 1230 can be configured to extend in a generally vertical orientation.

In some embodiments, a user can initiate the lid 1250 to move from an open position to a closed position by applying a force to the pedal 1260, for example, by placing their foot on the pedal 1260 and applying a force in a downward direction. In certain variants, the lid is moved by a motor, such as in response to a sensor (e.g., proximity sensor) detecting the presence of a user in the vicinity of the receptacle assembly 1000. In some embodiments, the liner dispenser is not visible when the lid 1250 is closed, such as from the vantage point of a user outside the receptacle assembly 1000. The liner dispenser 1100 can be covered and/or concealed so that it is not visible with the lid 1250 closed, as can be seen in FIGS. 8-11. In some embodiments, the package of liners cannot be inserted in the receptacle assembly 1000 when the lid 1250 is in a closed position and/or when a basin 1300 (discussed below) is positioned in the receptacle assembly 1000.

Figure 11:
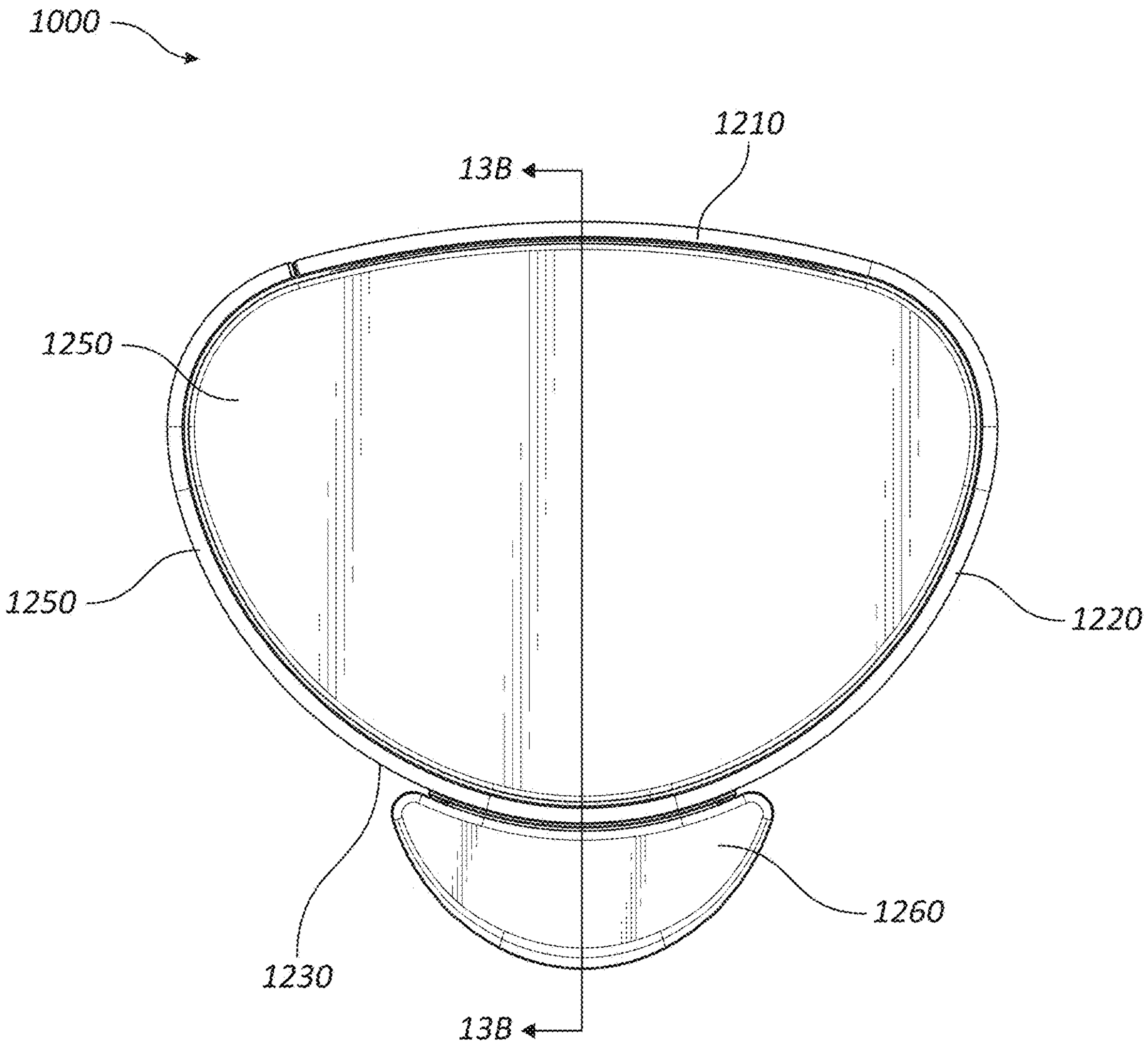
FIG. 11 illustrates a top view of the receptacle assembly of FIG. 8.

As noted earlier, and as can be seen in FIGS. 10 and 11, the rear wall 1210 can be continuous, flat, and/or without a protrusion. For example, as illustrated, the receptacle assembly 1000 may not need or have a cabinet or box (for storing a roll or package of liners) that protrudes from the rear wall and/or extends past the footprint of a base 1160 of the body 1200. The liner dispenser 1100 can be covered from sight by the body 1200 and the lid 1250. As illustrated in FIG. 11, when the lid 1250 is in a closed position, the user may not see the liner dispenser 1100 in the receptacle assembly 1000. As shown in FIG. 10, the rear wall 1210 can be substantially continuous and uninterrupted. For example, in some variants, the rear wall 1210 does not include an opening that permits access to the interior of the liner dispenser 1100 and/or an exterior door that covers the liner dispenser 1100. As shown in FIG. 10, the rear wall 1210 can include a single vertical seam (e.g., a seam from ends of sheet metal used to form the body 1200), yet the rear wall 1210 can still be considered to be substantially continuous and uninterrupted.

Figure 12:
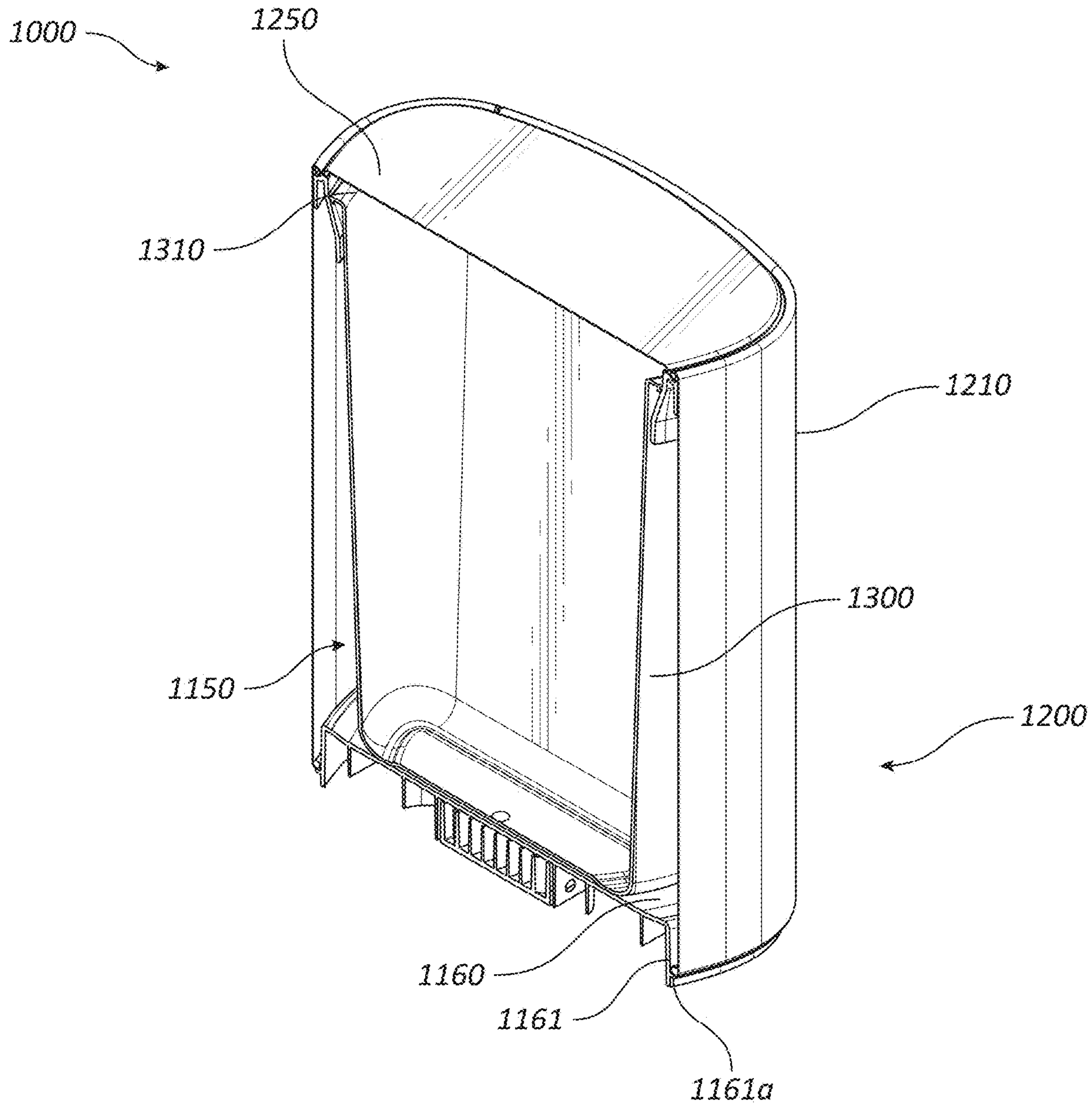
FIG. 12 illustrates a front perspective cross-sectional view of the receptacle assembly of FIG. 8.

FIG. 12 shows a cross-section through the receptacle assembly 1000. As illustrated, the receptacle assembly 1000 can include the basin 1300. The basin 1300 can be an inner bucket and can be similar or identical to the interior container 450. The basin 1300 can include a plastic or metal bucket and can be configured to receive a liner (that receives and contains trash or other materials) and/or can directly receive and contain trash or other materials. The basin 1300 can have an upper lip that provides a support surface for a liner, such as an elastic upper edge of the liner. The basin 1300 can partly bound an interior surface inside the receptacle assembly 1000.

In certain implementations, when the lid 1250 is open the basin 1300 can be separated and/or removed from (e.g., lifted out of) the receptacle assembly 1000. The basin 1300 can be carried to a trash bin or dumpster and the contents dumped and/or can be set aside for tasks, such as changing the liner. The basin 1300 can be inserted back into the receptacle assembly 1000 with the lid 1250 opened. In various implementations, when the lid 1250 is closed, the basin 1300 can be partially or completely received in the receptacle assembly 1000 (as shown in FIGS. 13A and 13B).

As mentioned above, the receptacle assembly 1000 can include the base 1160. The base 1160 can support the receptacle assembly 1000 in a stable, resting position when the receptacle assembly 1000 rests on a surface such as a floor. The body 1200 can extend upward from the base 1160 in a generally vertical orientation. The base 1160 can have a downwardly extending portion 1161. In some embodiments, the downwardly extending portion 1161 can have an outwardly extending trim edge 1161*a* that can provide support for the body 1200. In some embodiments, the body 1200 can rest at least partially on the outwardly extending trim edge 1161*a*. In some embodiments, the body 1200 is oriented generally vertically when the body 1200 rests on the base 1160. In some embodiments, the base 1160 can at least partially bound a footprint for the body 1200 such that the body 1200 does not offset beyond the footprint set by the base 1160. In some embodiments, the rear wall 1210 of the receptacle assembly 1000 can be flat (with or without a curved surface) such that there is no protrusion on the rear wall 1210 that generally extends beyond the footprint set by the base 1160.

As shown in FIGS. 12 and 13, the receptacle assembly 1000 can include a wall cavity 1150 in an interior space between the basin 1300 and the body 1200. In some embodiments, the width of the wall cavity 1150 can be at least: about 0.25 inch, or about 0.5 inch, or about 0.75 inch, or about 1 inch, or about 1.5 inches, or about 2 inches, or about 4 inches, or about any number between 0.25 inch or 4 inches, or about any number smaller than about 0.25 inch or larger than about 4 inches. In some embodiments, the liner dispenser 1100 is positioned in the wall cavity 1150, such as between the basin 1300 and the rear wall 1210. The receptacle assembly 1000 can be configured so that with the basin 1300 installed, the liner dispenser 1100 is not visible even when the lid 1250 of the receptacle assembly 1000 is in an open position. For example, as shown in FIG. 12, the liner dispenser 1100 can be positioned behind the basin 1300, and thus not visible and/or accessible even with the lid 1250 open. When the user opens the lid 1250, with the basin 1300 installed, the liner dispenser 1100 can be shielded from view and/or from trash thrown into the receptacle assembly 1000 by the basin 1300. In several embodiments, the liner dispenser 1100 is not connected directly to and/or is spaced apart from the rear wall 1210, the front wall 1230, and/or the lateral side walls 1220. For example, the receptacle assembly 1000 can have a gap between the liner dispenser 1100 and the rear wall 1210 or the front wall 1230 of the body 1200. In several embodiments, the liner dispenser 1100 is not mounted on and/or supported by the walls 1210, 1220, 1230 of the body.

Figure 13A:
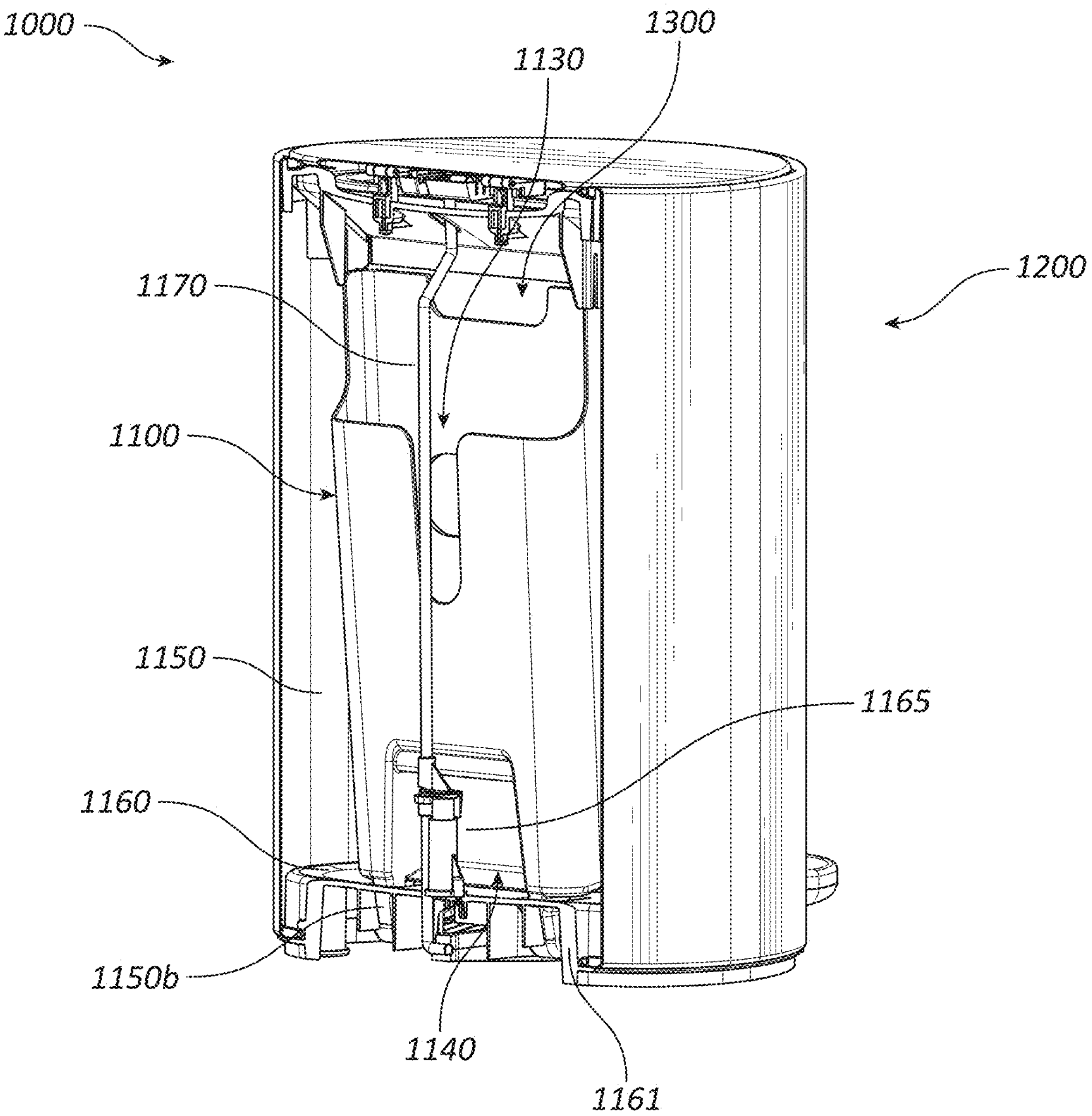
FIGS. 13A and 13B illustrate rear perspective and side cross-sectional views of the receptacle assembly of FIG. 8.
Figure 13B:
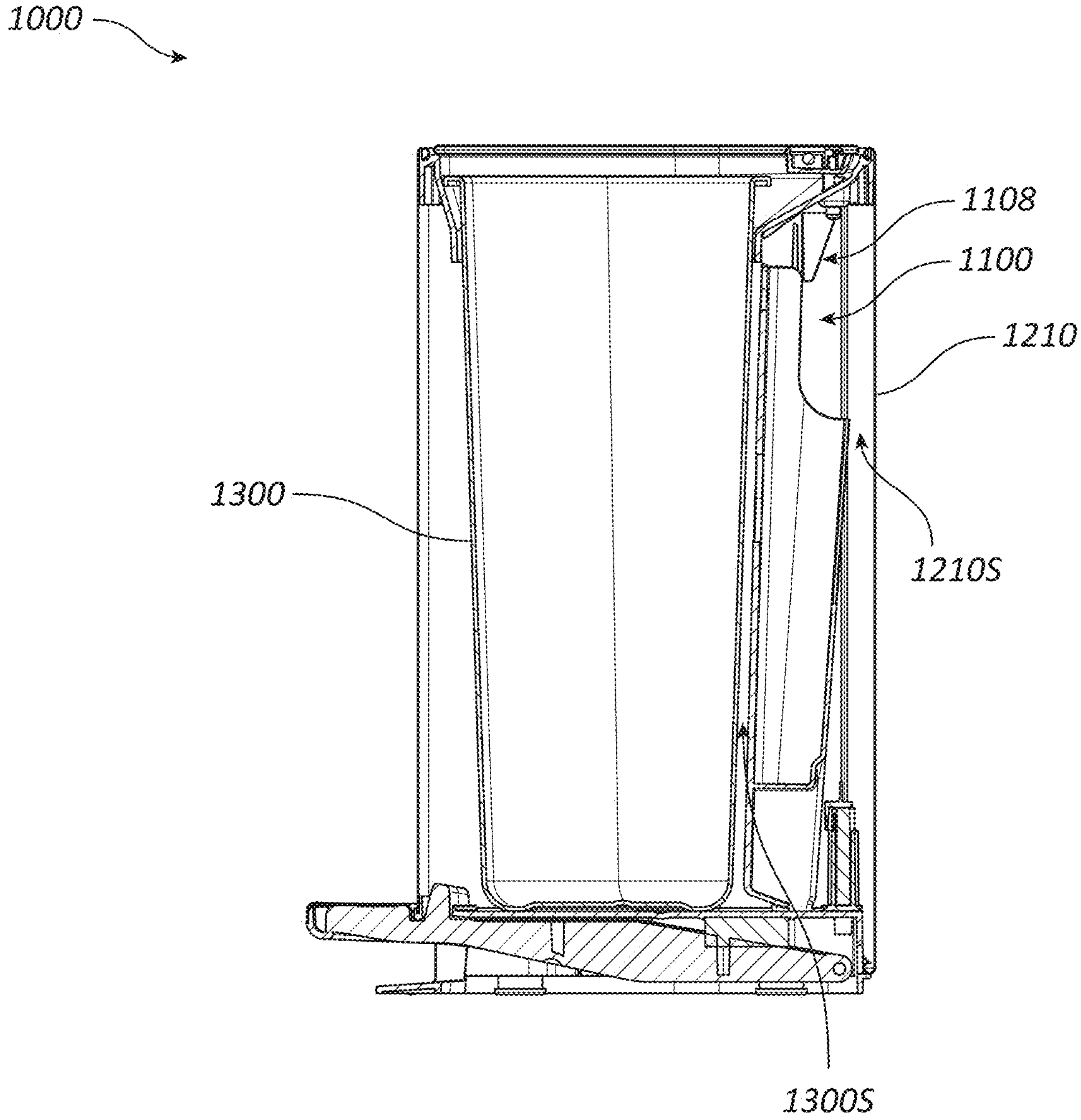

Referring to FIGS. 13A and 13B, the liner dispenser 1100 can be seen positioned within the wall cavity 1150, such as between the body 1200 and the basin 1300. In several implementations, the liner dispenser is positioned between the rear and front walls 1210, 1230 of the body 1200 and/or in the interior space of the body 1200. In some embodiments, the liner dispenser 1100 can be positioned near the rear wall 1210. For example, the liner dispenser 1100 can be positioned such that it is closer to the rear wall 1210 than it is to the front wall 1230. In certain variants, the liner dispenser 1100 is positioned on the front wall or one of the sidewalls. In some embodiments, there is a gap (or a space) between the liner dispenser 1100 and the body 1200 such that the liner dispenser 1100 is spaced apart from the front and/or rear walls and does not directly contact the body 1200. For example, as illustrated in FIG. 13B, the receptacle assembly 1000 can include a rear wall-dispenser space 1210S. The rear wall-dispenser space 1210S can correspond to the space or gap between the rear wall 1210 and the liner dispenser 1100.

The liner dispenser 1100 can be positioned on the base 1160. The liner dispenser 1100 can be secured (e.g., directly) to the base 1160. For example, the liner dispenser 1100 can be secured with a bottom receiver 1150*b*, as will be discussed in more detail below. In some embodiments, the liner dispenser 1100 can be secured to the base 1160 directly and/or independent of the body 1200. For example, the liner dispenser 1100 can be configured such that it is directly connected to the top support 1108 on top, directly to the base 1160 at the bottom, and/or without any direct connection to the outer shell or between the liner dispenser 1100 and the front wall 1230, rear wall 1210, or the lateral side walls 1220 of the body 1200. In some embodiments, the liner dispenser 1100 does not need to be mounted on (e.g., connect to or hang from) the front wall 1230, rear wall 1210, lateral side walls 1220, and/or the interior surface of the body 1200. In some embodiments, the body 1200 can be manufactured without the need to account for a counterweight in the body 1200 to counter the effect of the weight of the liner dispenser.

The receptacle assembly can include a damper 1165. In some embodiments, the base 1160 can support the damper 1165. In some embodiments, the damper 1165 can be a fluid damper and can be configured to dampen a movement of the lid 1250. For example, the damper 1165 can dampen the movement of the lid 1250 during closing to inhibit banging. As illustrated in FIGS. 13A and 13B, the liner dispenser 1100 can have a recess 1140. In some embodiments, the damper 1165 can be positioned near or in front of the recess 1140. In some embodiments, the damper 1165 can be positioned within the recess 1140. The recess can be bounded on the top by a top or step 1141.

The receptacle assembly 1000 can include a linkage 1170, which can mechanically connect the lid 1250 and pedal 1260. The damper 1165 can be operably connected to the linkage 1170. In some embodiments, the linkage 1170 and the pedal 1260 form an actuation system that transfers force exerted on the pedal 1260 to the lid 1250 to open the lid 1250. In some embodiments, the linkage 1170 includes a generally cylindrical rod.

In some embodiments, the linkage 1170 can pass through a linkage opening 1130 of the liner dispenser 1100. The linkage opening 1130 can provide a path for the linkage 1170 to pass through the liner dispenser 1100. In some embodiments, such as the embodiment illustrated in FIGS. 13A and 13B, the linkage opening 1130 can be a generally U-shaped opening. The U-shaped opening can have a round bottom, a narrow middle portion, and/or an open top. The U-shaped opening can have a width of various sizes. For example, the width of the opening (or the U-shaped opening) can be at least: about 0.25 inch or about 0.50 inch or about 0.75 inch or about 1 inch or about any number smaller than 0.25 inch or larger than 1 inch or any number in between. In some embodiments, the liner dispenser 1100 is positioned between the linkage 1170 and the basin 1300 and/or liner. This can inhibit or prevent rubbing between the linkage 1170 and the basin 1300 and/or liner.

Figure 14A:
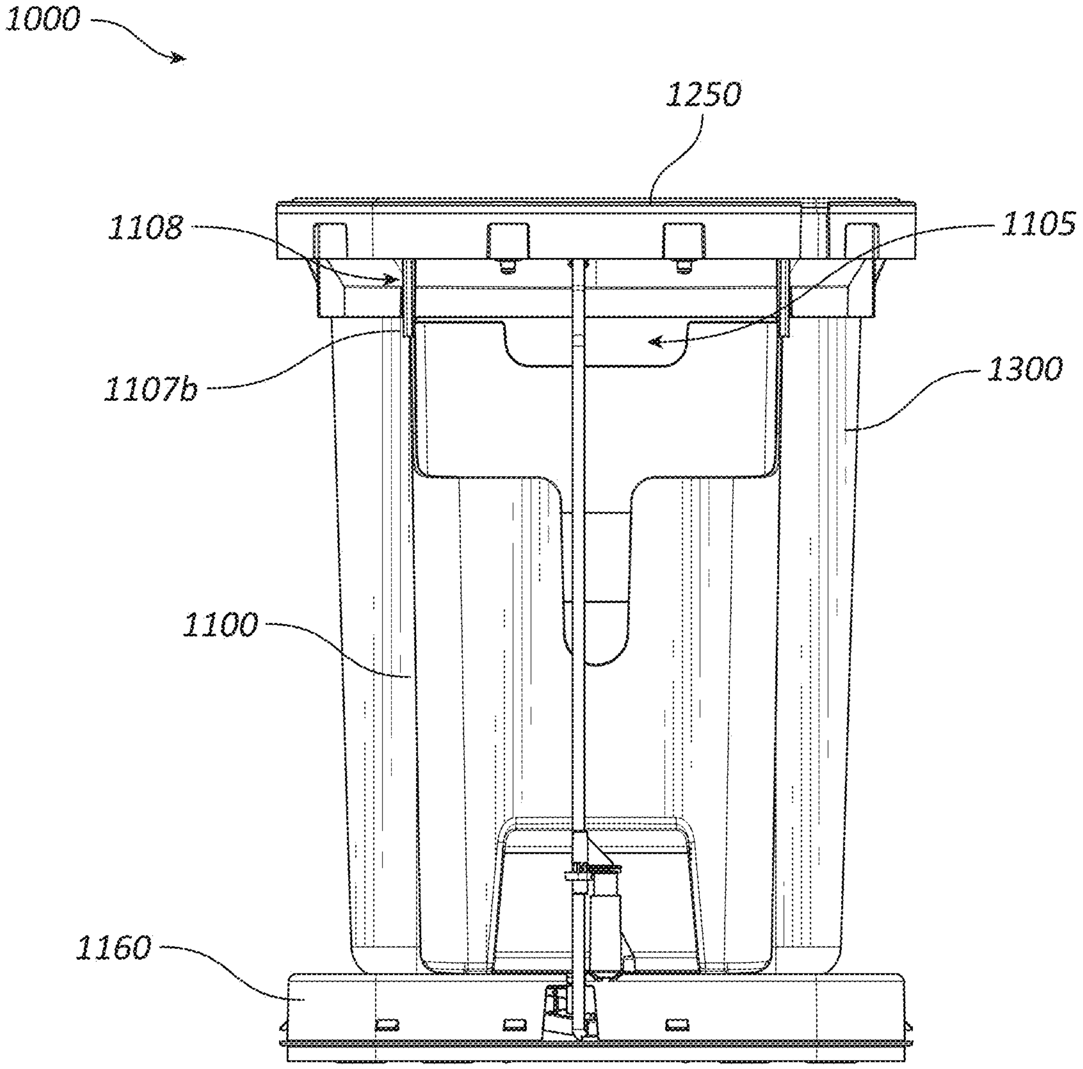
FIG. 14A illustrates a rear view.
Figure 14B:
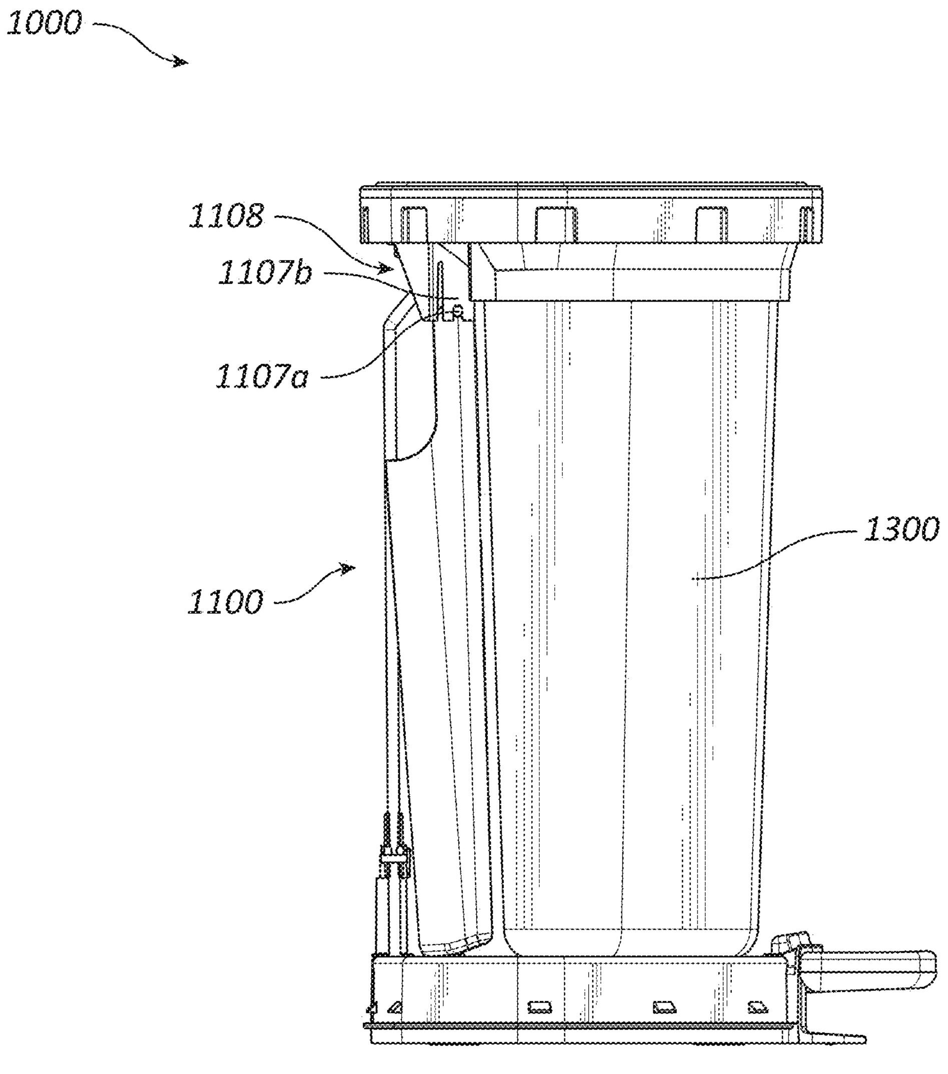
FIG. 14B illustrates a side view, of the receptacle assembly of FIG. 8, with the outer shell not shown for illustration purposes.

Referring to FIG. 14A and FIG. 14B, the receptacle assembly 1000 can be seen from a rear-view angle. For illustration purposes, an outer shell of the body 1200 is not shown. The liner dispenser 1100 can be supported on the base 1160 at the bottom and can be secured to a top support 1108 on top. In some embodiments, the liner dispenser 1100 can have a height that is at least about: 50%, 75%, 80%, or 90% of the height of the body 1200 or the basin 1300. In some embodiments, the liner dispenser 1100 can have a height that is substantially equal to height of the basin 1300. In some embodiments, the liner dispenser 1100 has an elongate shape, is greater in height than in width and thickness, and/or extends along at least a majority of the height of the body 1200 or basin 1300. The liner dispenser 1100 can be configured to have the opening 1105 closer to the lid 1250 than to the base 1160, such as while the bottom of the liner dispenser 1100 is secured to the base 1160. In certain implementations, the liner dispenser 1100 and basin 1300 rest on and/or are supported by the base of the body 1200. In several embodiments, the height of the liner dispenser 1100 is substantially greater than the height of the package of liners. In some embodiments, the height of the liner dispenser 1100 is at least about: 1.25, 1.5, 1.75, or 2 times of the height of the package of liners.

In some embodiments, the liner dispenser 1100 can be secured in the top support 1108 by a top receiver 1107*b*. The top receiver 1107*b* can provide lateral stability for the liner dispenser 1100. The top support 1108 can be connected to the lid 1250 and/or to an upper end of the body 1200. In some embodiments, the top support 1108 can be connected to the lid 1250 through a manufacturing process or be co-extruded with the rest of the lid assembly. In some embodiments, the top support 1108 can be manufactured or procured separately. In some embodiments, the top support 1108 can receive the lid 1250. In some embodiments, the top support 1108 can include a trim element, such as a trim ring. In some embodiments, the trim ring can include an angled or beveled inner surface, such as the bevel inner surface 1109, which can aid in directing refuse and/or the basin 1300 into the receptacle assembly 1000 (see FIGS. 16 and 17).

The top support 1108 can have one or more recesses or receiving mechanisms, such as the top receiver 1107*b*. One or more recesses or receiving mechanisms in the top support 1108 can allow the liner dispenser 1100 to be secured to the top support 1108 through a wide range of mechanisms. In some embodiments, the top connector 1107*a* (illustrated in FIG. 15) can snap or otherwise connect into the recess area of the top receiver 1107*b* to secure and/or stabilize the liner dispenser 1100 in the receptacle assembly 1000. The top receiver 1107*b* can be configured to position the liner dispenser 1100 away from the basin 1300 towards the rear wall 1210. In some embodiments, this can result in a space or gap, such as a basin-dispenser space 1300S between the outer surface of the basin 1300 and a first side 1110 of the liner dispenser 1100 (see FIG. 13B).

Figure 15:
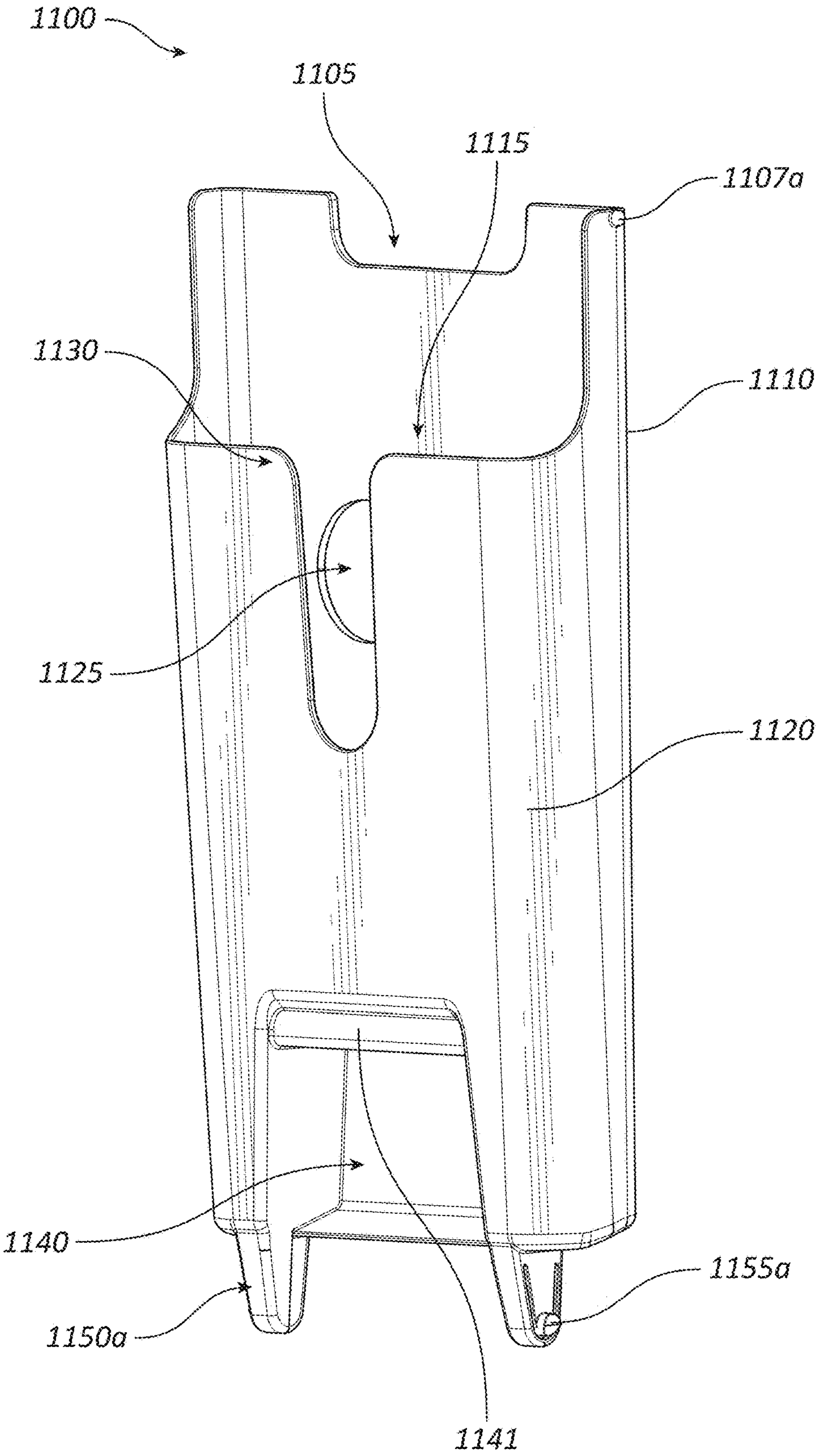
FIG. 15 illustrates a perspective view of a liner dispenser of the receptacle assembly of FIG. 8.

Referring to FIG. 15, the liner dispenser 1100 can be seen from a perspective view. For illustration purposes, FIG. 15 illustrates only some components of the liner dispenser 1100 and not the complete receptacle assembly 1000. The liner dispenser 1100 can have one or more (e.g., two, three, four, or more) support bases, such as the support base 1150*a*. The support base 1150*a* can provide a mechanism for the liner dispenser 1100 to be secured to the base 1160. In some embodiments, the support base 1150*a* can include one or more downwardly-extending projections from the bottom of the liner dispenser 1100.

The support base 1150*a* can be configured to couple to a corresponding bottom receiver 1150*b*. In some embodiments, the bottom receiver 1150*b* can be a recess configured to receive the support base 1150*a*. For example, a bottom connector 1155*a* of the support base 1150*a* can snap into a corresponding recess in the bottom receiver 1150*b* (illustrated in FIG. 13A) and form a cantilever snap-fit connection. In some embodiments, different mechanisms such as pin(s), pivot(s), ball joint(s), bolts, screw(s), weld(s), or other types of fixed or flexible joints can be used to couple the support base 1150*a* to the bottom receiver 1150*b*.

As previously noted, the liner dispenser 1100 can have a recess 1140, which can be at the bottom of the liner dispenser 1100. The recess 1140 can, for example, provide a space to accommodate the damper 1165 as illustrated at least in FIG. 12, FIG. 13A, and FIG. 13B. In some embodiments, the damper 1165 can be positioned in front of, adjacent to, and/or outside of the recess 1140. In some embodiments, the damper 1165 can be positioned partially or fully inside the recess 1140.

Still referring to FIG. 15, the liner dispenser 1100 can have a first side 1110 and a second side 1120. The first side 1110 can be a side that is closer to the basin 1300 when the liner dispenser 1100 is positioned in the receptacle assembly 1000. The first side 1110 can be called a front side. The second side 1120 can be a side that is closer to the rear wall 1210 and can be called a rear side. In some embodiments, the first side 1110 can generally include a vertical plane positioned in the wall cavity 1150 and be bounded in a vertical direction between the lid 1250 and the base 1160. In some embodiments, the second side 1120 can be parallel with the first side 1110. In some embodiments, the second side 1120 is not parallel with the first side 1110. For example, the second side 1120 can be oriented in a plane that is diagonal such that the cross-sectional area of the interior liner dispenser space 1115 is variable at different depths. In some embodiments, the cross-sectional area of the interior liner dispenser space 1115 can be smaller towards the bottom of the interior space and can generally increase as it is closer to the top of the second side 1120. As shown, the liner dispenser 1100 can taper along the longitudinal length. For example, the liner dispenser 1100 can taper from a wider upper end to a narrower lower end. This can allow the user to insert a package of liners in the wider upper end (which can be convenient due to the extra width) and the package can slide by gravity toward the narrower lower end (which can secure the package in position between the sides 1110, 1120).

The first side 1110 can have a first opening 1105. The first opening 1105 can be configured to receive the package of liners. In some embodiments, the first opening 1105 can be partially open (for example the opening 1105 can have an open top, as illustrated), which can allow the user to insert the package of liners more easily. In some variants, the first opening 1105 is a closed loop. The first opening 1105 can be an elongate slot, circular hole, or otherwise. The first opening 1105 can also be called an installation slot. A package of liners (such as the package 1400 illustrated in FIG. 18) can be introduced into the liner dispenser 1100 through the installation slot. In some implementations, the receptacle assembly 1000 is configured such that the package of liners can be installed through the installation slot only when the lid 1250 is in the open position and/or when the basin 1300 is removed from the receptacle assembly 1000.

The first side 1110 can have a second opening 1125. The second opening 1125 can be located below the first opening 1105. The second opening 1125 can be configured to dispense (e.g., serially) the liners from the package into the interior of the receptacle assembly 1000. The second opening 1125 can include different shapes. For example, the second opening 1125 can generally include a rectangular opening, a circular opening, a cylindrical opening, an oval opening etc. The second opening 1125 can be positioned to accommodate the package of the liners and can be generally aligned with the corresponding dispensing opening in the package of liners. The second opening 1125 can also be called a removal slot. In some embodiments, liners may be withdrawn serially (e.g., one at a time) from the package of liners through the removal slot. In some embodiments, a biasing member (e.g., the biasing member 794) biases the package of liners, such as toward the second opening.

Still referring to FIG. 15, the second side 1120 can have the linkage opening 1130. As discussed above, the linkage opening 1130 can be sized and shaped to accommodate the linkage 1170 or otherwise as needed to accommodate the user's need. In some embodiments, the linkage opening 1130 can be a generally U-shaped opening. In some embodiments, the linkage opening 1130 can be positioned so that it is located approximately in the middle of the second side 1120 horizontally.

The first side 1110 and the second side 1120 can be connected to form an interior liner dispenser space 1115. The interior liner dispenser space 1115 can have a width between the first side 1110 and the second side 1120. The interior liner dispenser space 1115 can have a length corresponding to the length of the first side 1110 or the second side 1120. The interior liner dispenser space 1115 can have a depth. The depth of the interior liner dispenser space 1115 can vary, such as based on the position and/or location of the step 1141. The step 1141 (and the corresponding surface on the opposite side located inside the interior liner dispenser space 1115) can provide a bottom support for the package of liners. In some embodiments, the step 1141 can help align the opening of the package of liners with the second opening 1125.

As mentioned above, in some embodiments, the top connector 1107*a* can snap or otherwise couple to the recess area of the top receiver 1107*b* to secure and stabilize the liner dispenser 1100 in the receptacle assembly 1000. Other mechanisms can also be used to connect or secure the top connector 1107*a* with the top receiver 1107*b*. For example, different mechanisms such as pins, pivots, ball joints, bolts, screws, welds or other types of fixed or flexible joints can be used to connect and/or secure the top connector 1107*a* with the top receiver 1107*b*.

Referring to the operation of the receptacle assembly 1000 generally, a user can utilize the receptacle assembly 1000 for a variety of reasons to hold one or more objects in an enclosed container. In some embodiments, receptacle assembly 1000 is a trashcan that can hold waste and/or other materials that the user may wish to keep in a closed container and/or dispose of eventually. In some implementations, the receptacle assembly 1000 is a recycling bin, pet food storage container, or other type of container.

The user can open the lid 1250 by applying a mechanical force to the pedal 1260. The mechanical force can be a force exerted by a user's foot, a user's hand, a separate object, or any other means that can provide the force required to move the pedal 1260 in a generally downwardly direction. This force can then be operably transferred from the pedal 1260 to the lid 1250 through a series connections and components, including the linkage 1170 to open the lid 1250.

In certain embodiments, the lid 1250 is opened without the pedal 1260. For example, the user can manually lift open the lid 1250 without the use of the pedal 1260. In some other embodiments, the pedal 1260 can be activated automatically. For example, pedal 1260 can be designed with sensors such as proximity sensors or motion detection sensors to automatically apply the required force to open the lid 1250 once the sensor is activated. Some implementations include an electric motor that drives the lid 1250. Certain embodiments of the receptacle assembly 1000 do not include the pedal 1260.

The lid 1250 can be moved from a first position (where the lid 1250 is generally parallel with the ground surface and/or horizontal) to a second position (where the lid 1250 is generally perpendicular with the ground surface and/or vertical). In some embodiments, in the open position the lid is at an angle between horizontal and vertical (see FIGS. 16 and 17). In some embodiments, the user can access the interior of the basin 1300 at any point during the rotation from the first position to the second position.

The user can close the lid 1250 by, for example, removing the force that is applied to pedal 1260, such as by stepping-off the pedal. The weight of the lid 1250 can naturally return the lid 1250 to the closed position by gravity. In some embodiments, the receptacle assembly 1000 can be designed with an appropriate sensor, such as a proximity sensor or motion detection sensor, to initiate the closing process automatically. The damper 1165 can control the speed at which the lid 1250 closes and thus can prevent banging the lid 1250 against the body of the receptacle assembly 1000.

The user can have access to the interior of the receptacle assembly 1000 when the lid 1250 opens or at any point between the movement of the lid 1250 from the first position to the second position. Once the user has access to the interior of the receptacle assembly 1000, the user can remove the basin 1300 by, for example, grabbing the upper edge 1310 and lifting the basin 1300 out of the receptacle assembly 1000.

Figure 16:
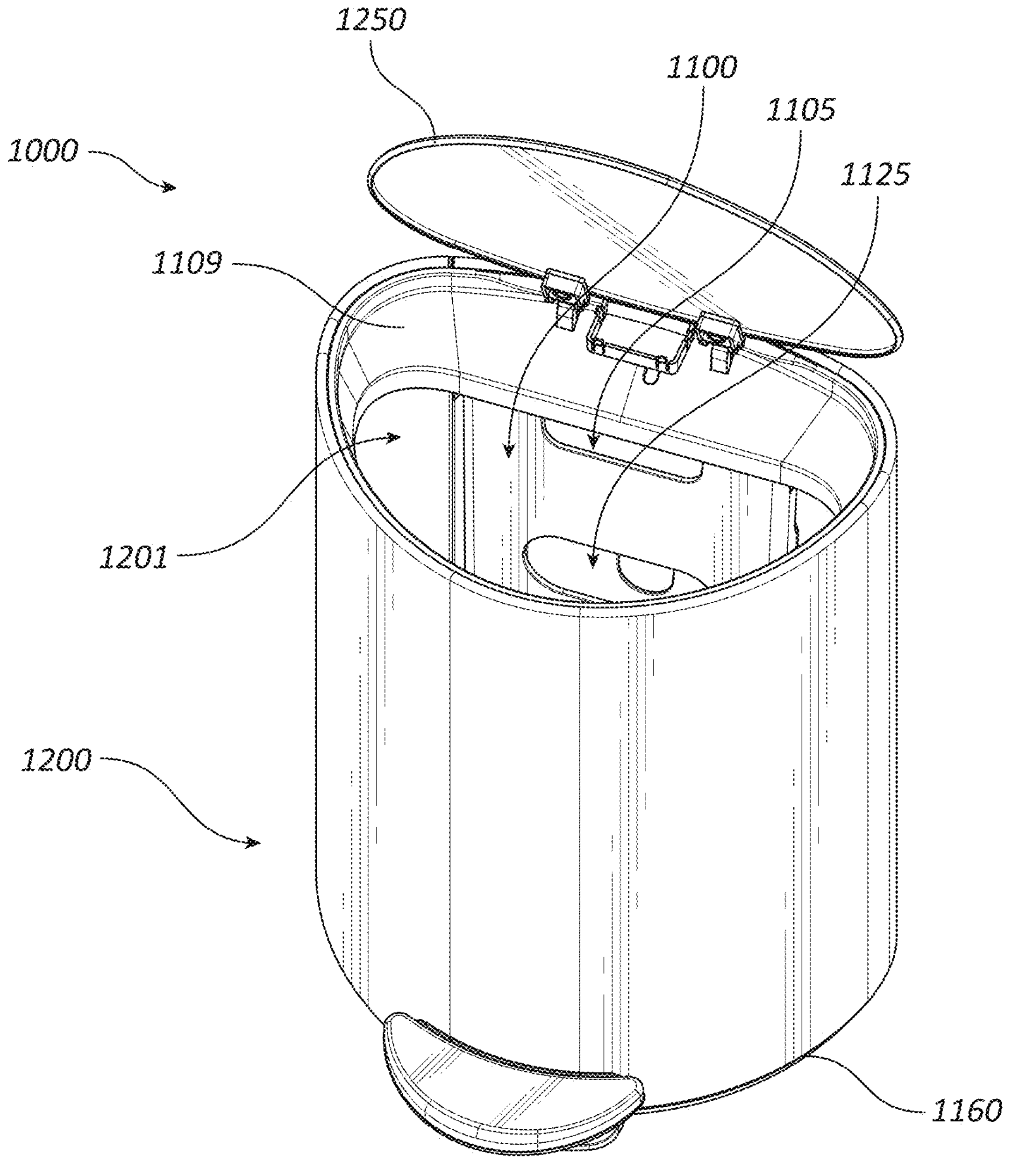
FIG. 16 illustrates a perspective view of the receptacle assembly of FIG. 8 with the lid in an open position, the basin removed, and without a package of liner inserted.

An example of the receptacle assembly 1000 with the lid 1250 open and the basin 1300 removed is shown in FIG. 16. As shown, in such a state, the user can have access to the liner dispenser 1100. The user can access the first opening 1105 by reaching and extending their hand through the interior container space 1201, where the interior container space 1201 can correspond to the space that is surrounded by the body 1200 within the footprint defined by the base 1160.

Figure 17:
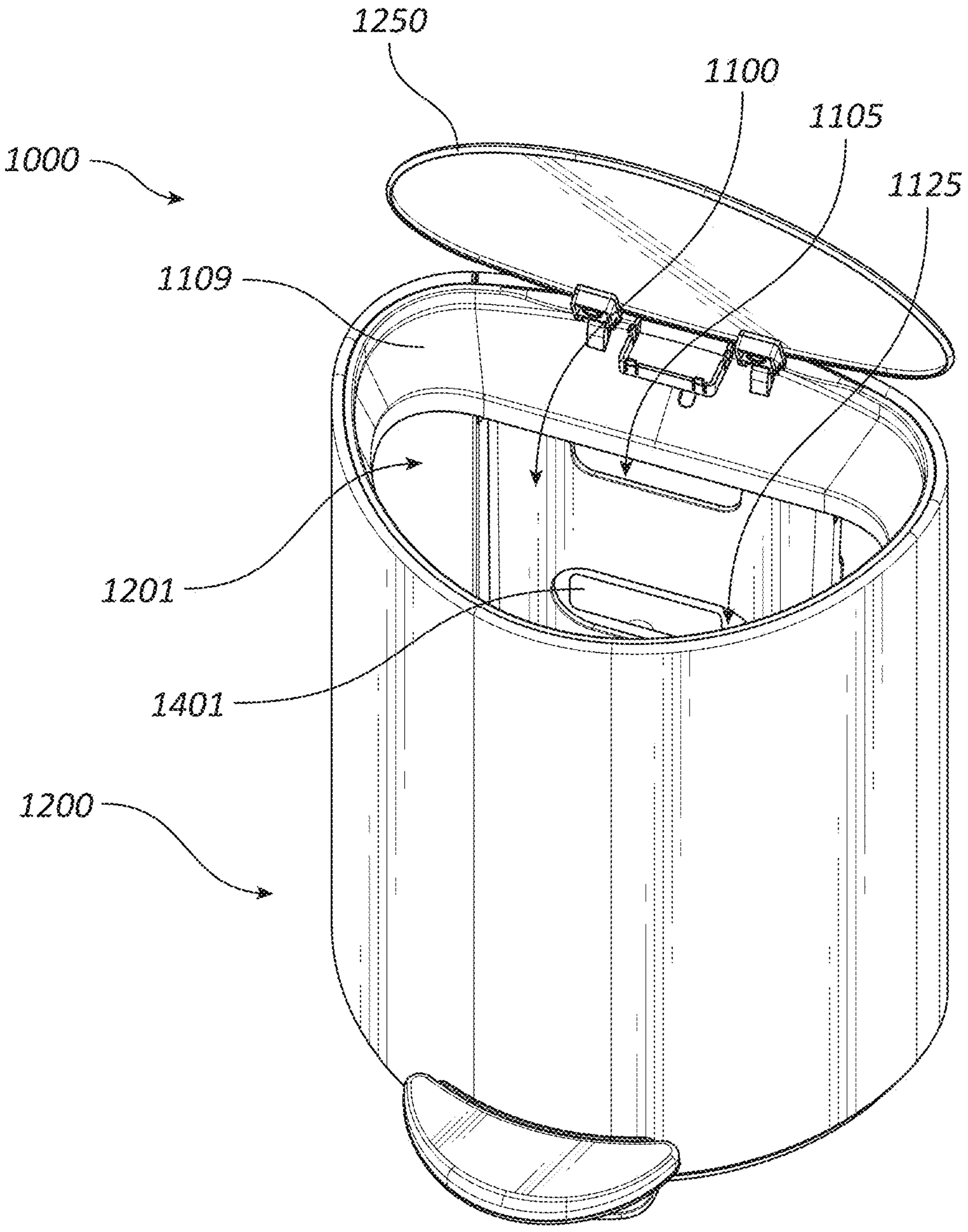
FIG. 17 illustrates a perspective view of the receptacle assembly of FIG. 8 with the lid in the open position, the basin removed, and with the package of liner inserted.

Once the user has access to the liner dispenser 1100, the user can place the package of liners in the liner dispenser 1100 through the first opening 1105. The package of liners can be passed through the interior container space 1201 and/or through the upper opening of the receptacle assembly 1000 before being inserted into the first opening 1105 of the liner dispenser 1100. The package of liners can fall by gravity to the bottom of the interior liner dispenser space 1115, as shown in FIG. 17.

The bottom of the interior liner dispenser space 1115 can correspond to the location of the step 1141. As such, the package of liners can come to rest on and/or be supported by the step 1141. The step 1141 can provide the interior liner dispenser space 1115 with a certain depth corresponding to the size of a desired package of liners.

The package of the liners can have an opening configured to dispense a liner. Once the user drops the package of the liner, the second opening can align (or approximately align)

with a corresponding opening in the package of liners. The user can remove a closure (e.g., an adhered or perforated tab) on the package and/or retrieve a liner from the package through the second opening 1125. A portion of a first one of the liners in the package can be routed through the second opening 1125, as shown in FIG. 18.

Figure 18:
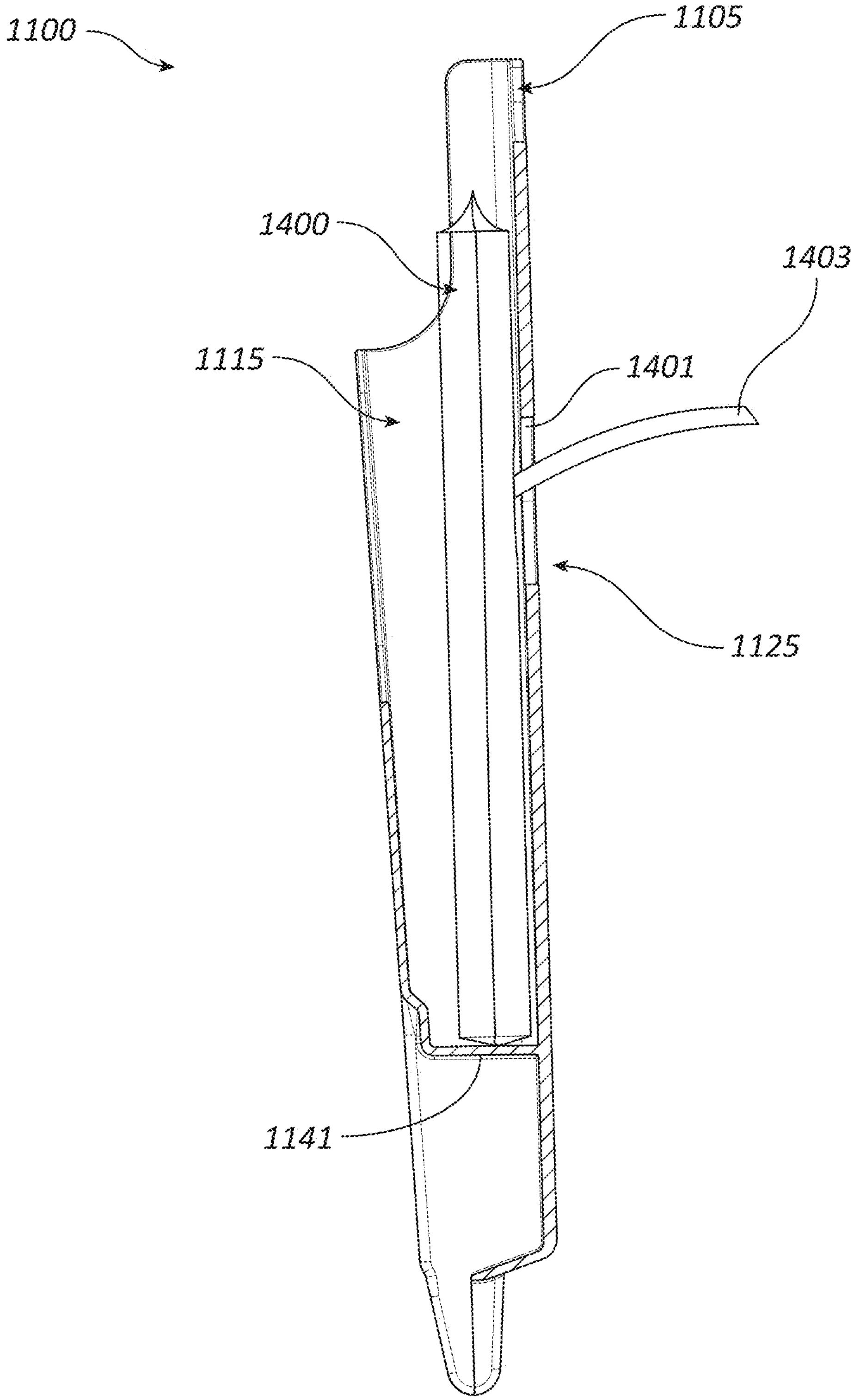
FIG. 18 illustrates a side cross-sectional view of the liner dispenser of FIG. 15 with a package of liners installed and a liner being withdrawn.

As is evident from FIG. 18, the package 1400 can be inserted into the interior liner dispenser space 1115 through the first opening 1105. The liner can travel, such as by force of gravity, from the first opening 1105 toward a dispensing position. In the dispensing position, the package can rest on and/or be supported in place by the step 1141. The liner dispenser 1100 and/or package 1400 can be configured such that once the package 1400 is positioned in the dispensing position, the opening 1401 of the package 1400 can be aligned with the second opening 1125. This can enable one or a plurality of liners, such as liner 1403, to be extracted through the opening 1401 and the second opening 1125. For example, as shown in FIG. 18, a portion of the liner 1403 is illustrated as being extended out of the package 1400.

The package 1400 can include an opening 1401, such as a tear away tab. In some embodiments, the package 1400 can include a plurality of perforations along the opening 1401. The perforations can allow the user to open, access, or break the package 1400 and create the opening 1401. In some embodiments, the opening 1401 is created during the manufacturing process such that the package 1400 is manufactured with the opening 1401 already created in the package 1400.

The package 1400 can be configured to facilitate easy removal of the next liner. For example, in some embodiments, once the user pulls the entire portion of the liner 1403 out of the package 1400, a portion of another liner 1403 is pulled to extend partially out of the package 1400 to make it more convenient for the user to replace a liner. In certain embodiments, such pulling is achieved by a frictional engagement between sequential liners. In some embodiments, the liners are connected end-to-end. In some implementations, the liners are disconnected from each other (e.g., not connected end-to-end). In some embodiments, a plurality of liners 1403 are included in the package 1400 and are disconnected from each other in the manufacturing process so that once the user pulls an adequate length of the liner 1403 out of the package 1400, the liner 1403 separates from the package 1400.

The user can retrieve the liner by pulling the liner through the second opening 1125 from the package of liners. In some embodiments, the liners are disconnected and/or detached from each other, for example, not attached to each other in an end-to-end manner, and can include a plurality of detached liners. In some other embodiments, the liners are connected to each other. Once the user retrieves the liner, the user can place the liner in the basin 1300 and places the basin 1300 back into the receptacle assembly 1000. The receptacle assembly 1000 is then ready for use in containing refuse, recycling, or other materials, etc.

Figure 19:
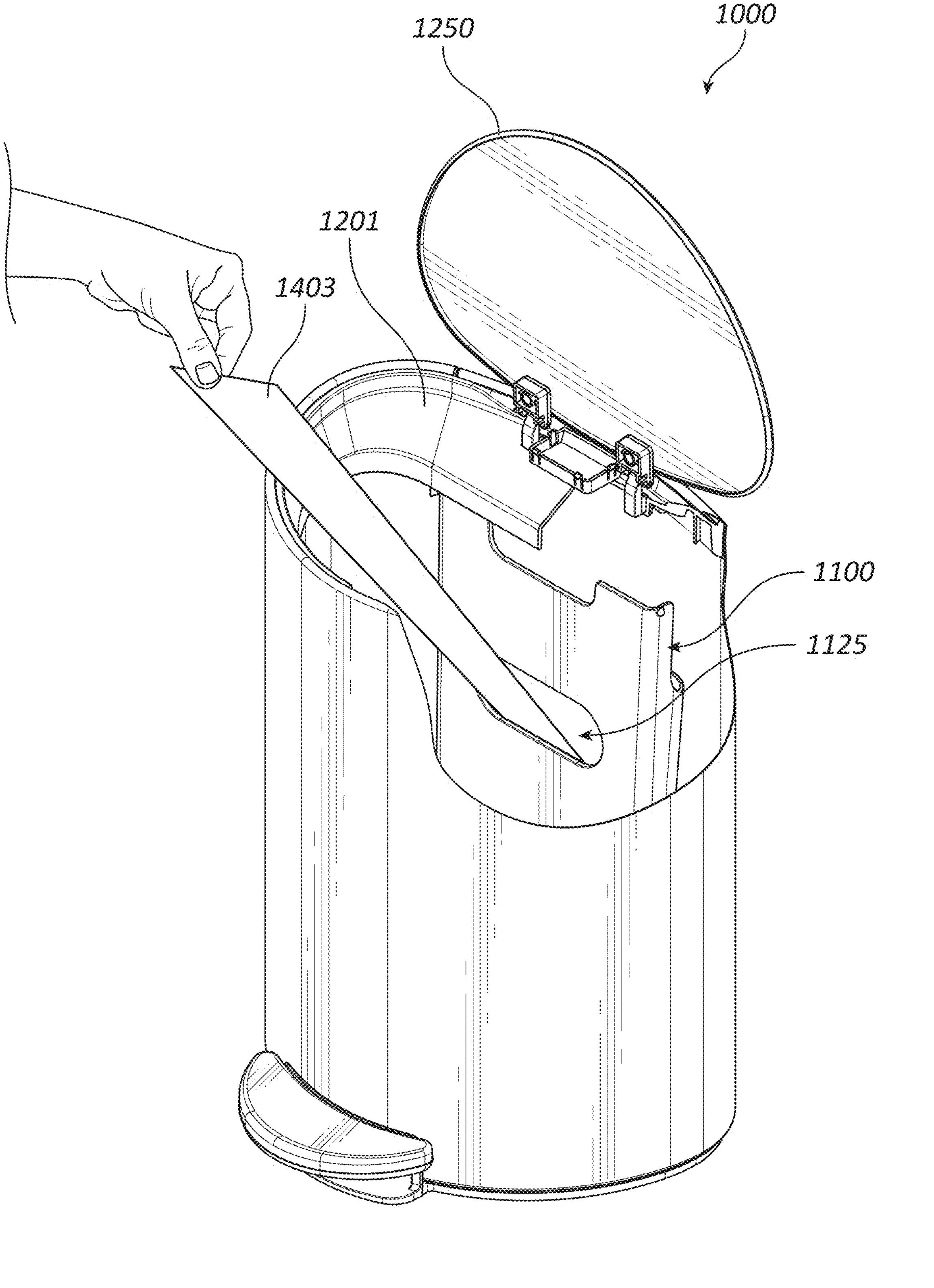
FIG. 19 illustrates a perspective view of the receptacle assembly of FIG. 8 with a portion of the outer shell not shown for illustration purposes and a liner being withdrawn from the liner dispenser by a user.

FIG. 19 illustrates an example of the liner being withdrawn from the liner dispenser 1100. As shown, the lid 1250 is open and the basin 1300 is removed from the interior container space 1201. A liner 1403 is being withdrawn through the second opening 1125. As illustrated, the liner 1403 can be pulled directly upward out of the receptacle assembly 1000. The liner 1403 can be pulled out from the liner dispenser 1100 such that the liner 1403 does not first travel downwardly and/or toward a bottom of the receptacle assembly 1000 (which can increase the required pull force to move the liner, can be inconvenient, can reduce efficiency, and/or may require the use of special liners that are connected end-to-end). In some embodiments, the liner 1403 is ready to use once the user pulls the liner 1403 out of the package 1400 through the interior container space 1201. For example, the user can place the liner 1403 in the basin 1300. The user can do so either when the basin is out of the receptacle assembly 1000 or when the basin 1300 is placed back in its original location as discussed above. At this stage, the receptacle assembly 1000 is ready for use in containing refuse, recycling, or other materials, etc.

When the user desires to change the liner, for example, when the liner is full, the user can utilize the same process (such as by opening the lid 1250, removing the basin 1300 and/or the liner to be changed, retrieving a new liner through the second opening 1125, placing the new liner in the basin 1300, placing the basin 1300 back in the receptacle assembly 1000, and allowing the lid 1250 to close). If the package of liners is exhausted, the user can insert the new package of the liners through the first opening 1105. These steps can be done in any sequence that allows the user to achieve the intended result.

Certain Terminology

Terms of orientation used herein, such as "top," "bottom," "horizontal," "vertical," "longitudinal," "lateral," and "end" are used in the context of the illustrated embodiment. However, the present disclosure should not be limited to the illustrated orientation. Indeed, other orientations are possible and are within the scope of this disclosure. Terms relating to circular shapes as used herein, such as diameter or radius, should be understood not to require perfect circular structures, but rather should be applied to any suitable structure with a cross-sectional region that can be measured from side-to-side. Terms relating to shapes generally, such as "circular" or "cylindrical" or "semi-circular" or "semi-cylindrical" or any related or similar terms, are not required to conform strictly to the mathematical definitions of circles or cylinders or other structures, but can encompass structures that are reasonably close approximations.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language, such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

The terms "approximately," "about," and "substantially" as used herein represent an amount close to the stated amount that still performs a desired function or achieves a desired result. For example, in some embodiments, as the context may dictate, the terms "approximately", "about", and "substantially" may refer to an amount that is within less than or equal to 10% of the stated amount. The term "generally" as used herein represents a value, amount, or characteristic that predominantly includes or tends toward a particular value, amount, or characteristic. As an example, in certain embodiments, as the context may dictate, the term "generally parallel" can refer to something that departs from exactly parallel by less than or equal to 20 degrees.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

The terms "comprising," "including," "having," and the like are synonymous and are used inclusively, in an open-ended fashion, and do not exclude additional elements, features, acts, operations, and so forth. Likewise, the terms "some," "certain," and the like are synonymous and are used in an open-ended fashion. Also, the term "or" is used in its inclusive sense (and not in its exclusive sense) so that when used, for example, to connect a list of elements, the term "or" means one, some, or all of the elements in the list.

Overall, the language of the claims is to be interpreted broadly based on the language employed in the claims. The language of the claims is not to be limited to the non-exclusive embodiments and examples that are illustrated and described in this disclosure, or that are discussed during the prosecution of the application.

Summary

Although the receptacle assemblies have been disclosed in the context of certain embodiments and examples, the receptacle assemblies extend beyond the specifically disclosed embodiments to other alternative embodiments and/or uses of the embodiments and certain modifications and equivalents thereof. For example, although certain embodiments with a foot pedal are described above, some embodiments include a handle, lever, button, or other actuator that is configured to be actuated by a user to open and close the lid. As another example, in some variants, the user can have access to the liner dispenser 1100 without the need to open the lid, such as via a removable piece on the rear wall 1210 of the body 1200 that can provide access to the liner dispenser 1100. As another example, in some embodiments, the receptacle assembly 1000 can include a wall (not shown) between the liner dispenser 1100 and the interior container space 1201, which wall can protect the liner dispenser 1100. The wall can allow a user to utilize the receptacle assembly 1000 without the basin 1300. For example, a user can place the liner 1403 directly in the interior container space 1201 without the use of the basin 1300. Various features and aspects of the disclosed embodiments can be combined with or substituted for one another in order to form varying modes of the invention. The scope of this disclosure should not be limited by the particular disclosed embodiments described herein.

Certain features that are described in this disclosure in the context of separate implementations can also be implemented in combination in a single implementation. Conversely, various features that are described in the context of a single implementation can also be implemented in multiple implementations separately or in any suitable subcombination. Although features may be described above as acting in certain combinations, one or more features from a claimed combination can, in some cases, be excised from the combination, and the combination may be claimed as any subcombination or variation of any subcombination. Any two or more of the components of the receptacle assembly can be made from a single monolithic piece or from separate pieces connected together.

Moreover, while operations may be depicted in the drawings or described in the specification in a particular order, such operations need not be performed in the particular order shown or in sequential order, and all operations need not be performed, to achieve the desirable results. Other operations that are not depicted or described can be incorporated in the example methods and processes. For example, one or more additional operations can be performed before, after, simultaneously, or between any of the described operations. Further, the operations may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

Some embodiments have been described in connection with the accompanying drawings. The figures are drawn to scale, but such scale should not be limiting, since dimensions and proportions other than what are shown are contemplated and are within the scope of the disclosed invention. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, any methods described herein may be practiced using any device suitable for performing the recited steps.

In summary, various embodiments and examples of receptacle assemblies have been disclosed. Although the receptacle assemblies have been disclosed in the context of those embodiments and examples, this disclosure extends beyond the specifically disclosed embodiments to other alternative embodiments and/or other uses of the embodiments, as well as to certain modifications and equivalents thereof. This disclosure expressly contemplates that various features and aspects of the disclosed embodiments can be combined with, or substituted for, one another. Thus, the scope of this disclosure should not be limited by the particular disclosed embodiments described above, but should be determined only by a fair reading of the claims that follow.

The following is claimed:

1. A receptacle assembly comprising:

a body having a front wall, a rear wall, an interior space, and a base, wherein the base forms a footprint of the body;

a lid coupled to the body, the lid being movable between a closed position and an open position;

a basin that is receivable in and removable from the interior space of the body when the lid is in the open position, the basin comprising an upper lip configured to retain a liner; and an interior liner dispenser in the interior space and within the footprint, the interior liner dispenser comprising a first opening and a second opening, the first opening and the second opening positioned closer to the lid than to the base;

wherein, with the lid in the open position and the basin removed from the interior space, the interior liner dispenser is configured to receive a package of liners through the first opening and to dispense one of the liners of the package into the interior space through the second opening.

2. The receptacle assembly of claim 1, wherein, with the basin received in the interior space, the interior liner dispenser is positioned between a rear wall of the basin and the rear wall of the body.

3. The receptacle assembly of claim 1, wherein, with the lid in the closed position, the interior liner dispenser is not visible to a user.

4. The receptacle assembly of claim 1, wherein, with the basin received in the interior space and the lid in the open position, the interior liner dispenser is not visible to a user.

5. The receptacle assembly of claim 1, wherein the rear wall of the body does not include an aperture configured to receive the package of liners.

6. The receptacle assembly of claim 1, wherein the interior liner dispenser further comprises a rear side, the rear side comprising a linkage opening.

7. The receptacle assembly of claim 1, wherein the second opening is larger than the first opening.

8. The receptacle assembly of claim 1, wherein the interior liner dispenser is secured directly to the base.

9. The receptacle assembly of claim 1, wherein a front side and a rear side of the interior liner dispenser are generally planar.

10. The receptacle assembly of claim 1, wherein the rear wall is a generally flat surface without an exterior protrusion.

11. A combination of the receptacle assembly of claim 1 and the package of liners.

12. The receptacle assembly of claim 1, wherein the receptacle assembly comprises a foot pedal.

13. The receptacle assembly of claim 12, wherein the receptacle assembly comprises a linkage configured to transmit power between the foot pedal and the lid.

14. The receptacle assembly of claim 1, wherein the interior liner dispenser comprises a front side, and the first and second openings are positioned on the front side.

15. A receptacle assembly comprising:

a body comprising an upper end, a front wall, a rear wall, a base, and an interior space;

a lid coupled to the body, the lid being movable between a closed position and an open position;

a basin that is receivable in and removable from the interior space of the body when the lid is in the open position, the basin comprising an upper lip configured to retain a liner; and an interior liner dispenser in the interior space, the interior liner dispenser comprising a first opening and a second opening, the first and second openings being spaced apart from each other, the first and second openings positioned closer to the upper end than the base, the interior liner dispenser configured to receive a package of liners from the interior space through the first opening and to dispense one of the liners of the package into the interior space through the second opening;

wherein, with the lid in the closed position, the interior liner dispenser is not visible to a user.

16. The receptacle assembly of claim 15, wherein the interior liner dispenser is positioned between the front wall and the rear wall.

17. The receptacle assembly of claim 15, wherein the first opening is above the second opening.

18. The receptacle assembly of claim 15, wherein the interior liner dispenser is attached to the base of the body and to the upper end of the body.

19. The receptacle assembly of claim 15, wherein the interior liner dispenser is not mounted to the front wall or rear wall of the body.

20. A receptacle assembly comprising:

a body comprising a top portion, a front wall, a rear wall, a bottom portion, and an interior space;

a lid coupled to the body, the lid being movable between a closed position and an open position; and an interior liner dispenser in the interior space and spaced apart from the front and rear walls of the body, the interior liner dispenser comprising a first opening and a second opening, the first and second openings being spaced apart from each other, the first opening and the second opening positioned above a midpoint of the rear wall between the top portion and the bottom portion;

the interior liner dispenser configured to receive a package of liners from the interior space through the first opening and to dispense one of the liners of the package into the interior space through the second opening.

21. The receptacle assembly of claim 20, wherein the body further comprises a right sidewall and a left sidewall that each connect the front and rear walls, wherein the interior liner dispenser is spaced apart from the right and left sidewalls.

22. The receptacle assembly of claim 20, wherein the interior liner dispenser is attached to a base of the body and to an upper end of the body.

* * * * *